(12) United States Patent
Kishigami et al.

(10) Patent No.: US 8,842,588 B2
(45) Date of Patent: Sep. 23, 2014

(54) WIRELESS COMMUNICATION DEVICE AND WIRELESS COMMUNICATION METHOD

(75) Inventors: Takaaki Kishigami, Tokyo (JP); Isamu Yoshii, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 147 days.

(21) Appl. No.: 13/521,859

(22) PCT Filed: Jan. 26, 2011

(86) PCT No.: PCT/JP2011/000427
§ 371 (c)(1),
(2), (4) Date: Jul. 12, 2012

(87) PCT Pub. No.: WO2011/093074
PCT Pub. Date: Aug. 4, 2011

(65) Prior Publication Data
US 2012/0287855 A1    Nov. 15, 2012

(30) Foreign Application Priority Data
Jan. 29, 2010    (JP) ................ 2010-019232

(51) Int. Cl.
*H04B 7/00*    (2006.01)
*H04L 1/00*    (2006.01)

(52) U.S. Cl.
CPC .............. *H04L 1/0071* (2013.01); *H04L 1/007* (2013.01)
USPC .......................................... 370/310; 375/295

(58) Field of Classification Search
CPC . H04L 1/0071; H03M 13/27; H03M 13/2789
USPC ............ 370/310, 316, 317, 328, 329; 375/295
See application file for complete search history.

(56) References Cited

U.S. PATENT DOCUMENTS 6,791,955 B1 *    9/2004    Kikuchi et al. ............... 370/320
7,773,708 B2 *    8/2010    Parantainen .................. 375/354
(Continued)

FOREIGN PATENT DOCUMENTS

JP    2002-084253 A    3/2002
JP    2004-320434 A    11/2004
(Continued)

OTHER PUBLICATIONS

Sachs, et al, "A Generic Link Layer in a Beyond 3G Multi-Radio Access Architecture", Communications, Circuits and Systems, 2004, Jun. 27-29, 2004 pp. 447-451 vol. 1.
(Continued)

*Primary Examiner* — Kerri Rose
(74) *Attorney, Agent, or Firm* — Pearne & Gordon LLP

(57) ABSTRACT

A high error correction capability is kept while reducing a processing delay in application of the ECC in a multi-radio. A wireless communication device for performing data transmission by using a plurality of radio systems RAT1 and RAT2 includes, in a GLL 100 that absorbs a difference in physical layer and MAC layer among RATs, an encoder 301 that encodes transmission data, a multiplexer 302 that distributes encoded data in correspondence with the RAT1 and the RAT2, interleavers 303 and 304 that interleave a plurality of coded data that has been encoded and multiplexed, and a resource controller 305 that sets an interleaving size for each interleaving processing in the interleavers 303 and 304 based on a transmission delay difference between the RAT1 and the RAT2.

13 Claims, 39 Drawing Sheets

(56) References Cited

U.S. PATENT DOCUMENTS

| | | | |
|---|---|---|---|
| 7,835,263 B2 | 11/2010 | Ochiai | |
| 7,835,264 B2 | 11/2010 | Ochiai | |
| 8,458,576 B2* | 6/2013 | Park et al. | 714/784 |
| 2005/0138524 A1* | 6/2005 | Cioffi | 714/758 |
| 2005/0190766 A1 | 9/2005 | Ochiai | |
| 2005/0283706 A1* | 12/2005 | Heise | 714/755 |
| 2006/0256846 A1* | 11/2006 | Oksman et al. | 375/222 |
| 2007/0274318 A1 | 11/2007 | Ochiai | |
| 2009/0125778 A1 | 5/2009 | Uchida et al. | |
| 2012/0204076 A1* | 8/2012 | Rainish et al. | 714/752 |

FOREIGN PATENT DOCUMENTS

| | | | |
|---|---|---|---|
| JP | 2008-124613 A | 5/2008 | |
| WO | 2007/069406 A1 | 6/2007 | |

OTHER PUBLICATIONS

Qiang, et al., "Joint Radio Resource Scheduling based on Generic Link Layer", Communications and Networking in China, 2006, ChinaCom '06, Oct. 25-27, 2006 pp. 1-4.

Wataru Matsumoto, et al., IEEEE 802.16 Broadband Wireless Access Working Group, IEEE C802.16m-08__1108, "MBS outer coding", Sep. 5, 2008.

International Search Report for PCT/JP2011/000427 dated May 10, 2011.

* cited by examiner

WIRELESS COMMUNICATION DEVICE AND WIRELESS COMMUNICATION METHOD

TECHNICAL FIELD

The present invention relates to a wireless communication device and a wireless communication method for performing data transmission by using a plurality of radio systems.

BACKGROUND ART

In a wireless communication field, resource management (RM) using a plurality of radio systems (Multi-Radio) has been studied. As one technique thereof, the introduction of a GLL (Generic Link Layer, or shared link layer) that absorbs differences in physical layer and MAC layer among the multi-radios has been studied (for example, refer to Non Patent Literature 1). FIG. 36 is a conceptual diagram illustrating a functional configuration of the GLL. The GLL is shared by base stations (or access points) and terminals (or clients) among the multi-radios to enable the selection among the multi-radios or resource management (MRRM: Multi-Radio Resource Management, or Joint RM) over the multi-radios to be realized. Also, as one configuration of the MRRM, the use of the different radio systems to transmit each hierarchical data has been studied (for example, refer to Non Patent Literature 2). FIG. 37 is a diagram illustrating an example in which the GLL is applied to hierarchized data transmission.

On the other hand, in order to enhance reception quality during data transmission unsuitable for retransmission control such as streaming delivery in an MBS (Multicast and broadcast service), there has been proposed a technique in which in addition to the application of an error correction code (ECC: Error correction code) to the physical layer (PHY Layer) generally used, the ECC is further applied to an upper layer thereof. As the ECC, an FEC (Forward Error Correction) can be applied by using a block code or a convolutional code, or an erasure correction can be also applied if an error position can be discriminated. Aside from the application to the MBS, even in unicast streaming data transmission, the application of the ECC has been studied when a delay caused by the retransmission control is critical to a request delay.

Also, the application of the ECC using the erasure correction to an application layer and a transport layer has been studied, and DVB-H, 3GPP 26.346 MBMS, and DVB-IPI (IPTV) have been already standardized. Also, in recent years, for the purpose of reducing the amount of information and the transmission delay when the ECC is applied to the upper layer such as the application layer and the transport layer, the application of the ECC to a data link layer (including upper sublayer or lower sublayer (MAC layer) has started to be studied. For example, in IEEE 802.16m E-MBS, DVB-H, and DVB-RCS, the introduction of the ECC into the data link layer has been proposed (refer to Non Patent Literature 3, Patent Literature 1, and Patent Literature 2).

The ECC using the erasure correction is an error correction method that can correct data more than that in the normal FEC by setting the position of an error in advance. This results from a fact that there is a need to obtain the position and size of the position in the normal FEC whereas there is a need to obtain nothing other than the size of the error in the erasure correction.

CITATION LIST

Patent Literatures

Patent Literature 1: WO2007/069406
Patent Literature 2: JP-A-2008-124613

Non Patent Literatures

Non Patent Literature 1: Sachs, J., Wiemann, H., Magnusson, P., Wallentin, P., Lundsjo, J., "A generic link layer in a beyond 3G multi-radio access architecture," Communications, Circuits and Systems, 2004, 27-29 Jun. 2004, p.p. 447-451 Vol. 1
Non Patent Literature 2: Luo Qiang, Zhang Ping, "Joint Radio Resource Scheduling based on Generic Link Layer," Communications and Networking in China, 2006, ChinaCom '06, 25-27 Oct. 2006 p.p. 1-4
Non Patent Literature 3: Wataru Matsumoto, Toshiyuki Kuze, Shigeru Uchida, "MBS outer coding," IEEE C802.16m-08/1108, 2008 Sep. 5

SUMMARY OF INVENTION

Technical Problem

Even in the data transmission using the multi-radio, as with the above-mentioned MBS, in addition to the application of the ECC to the physical layer, the ECC can be further applied to an upper layer thereof. FIG. 38 is a block diagram illustrating a configuration example of a wireless communication device on a transmitter side when the ECC is applied in the GLL in the multi-radio. The GLL corresponds to a logical link control (LLC: Logical Link Control) that is the data link layer in an OSI reference model, or the upper sublayer of the data link layer.

In a GLL 5000, an encoder 5001 codes a plurality of IP packets (PDUs: Protocol Data Units) input to the GLL 5000 as one coding unit. FIG. 38 illustrates an example in which three IP packets are coded as one unit. It is assumed that the PI packets are MBS packets, real-time streaming packets by a unicast (strict delay request), and so on. In the MBS packet, packet loss may occur due to shadowing because no retransmission frequency is assumed.

The encoder 5001 outputs coded data (Coded PDUs) with the addition of redundant bits (parity bits, Parity). An interleaver 5002 performs interleaving (IL) on the coded data of a given size including data of the plurality of IP packets as a unit. If there is a mass of errors within the coded block, because an error correction capability is not sufficiently obtained, the interleaver randomizes the data by interleaving processing. A multiplexer (or MRRM) 5003 separates the interleave data (ILed PDU) into packets each having a given size, and adds a header to each separate data (Sep PDU) to generate data packets (MAC SDU (Service Data Unit)) of the MAC layer. The multiplexer 5003 then distributes the data to a plurality of radio systems (RAT: Radio Access Technology). In this example, the data is distributed to two radio systems (RAT1, RAT2).

Thus, even if the packet is lost in the physical layer by the ECC performed over the plurality of IP packets and the interleaving, the error can be randomized among the plurality of IP packet data, and the error correction capability of error correction decoding processing on the ECC can be enhanced. As a result, the quality of the data transmission can be enhanced by the multi-radio.

However, when the ECC is applied to the GLL, the interleaving processing is performed over the plurality of packets. For that reason, another delay occurs due to the application of interleaving. FIG. 39 is a diagram illustrating a processing delay when the ECC is applied to the GLL. Referring to FIG. 39, input data (Inputted PDU), coded data (Coded PDU), and interleaved data (ILed PDU) are represented on a time axis. In this example, a randomizing effect becomes higher as an interleaving size (hereinafter referred to as "IL size") is larger as a result of which the error correction capability is enhanced. However, the processing delay is increased by the introduction of the GLL coding. In this example, the interleaving processing is included even in the physical layer. However, when the ECC is applied to the GLL, because the interleaving processing is performed over the plurality of packets, the IL size is generally larger than the IL size of the physical layer, and an influence of the processing delay is large.

The present invention has been made in view of the above circumstances, and therefore an object of the present invention is to provide a wireless communication device and a wireless communication method which can keep a high error correction capability while reducing the processing delay when the ECC is applied to a layer upper than the physical layer in the multi-layer.

Solution to Problem

According to a first aspect of the present invention, there is provided a wireless communication device for performing data transmission using a plurality of radio systems, the device including: a coding and multiplexing unit configured to encode and multiplex transmission data in correspondence with each of the plurality of radio systems; an interleaves configured to interleave a plurality of encoded data that has been coded and multiplexed; and a controller configured to set an interleaving size of each interleaving processing in the interleaves based on a transmission delay difference between the plurality of radio systems.

With the above configuration, since the interleaving size is set based on the transmission delay difference between the plurality of radio systems, the high error correction capability can be kept while reducing the processing delay.

Also, according to a second aspect of the present invention, in the wireless communication device, the coding and multiplexing unit includes an encoder configured to encode the transmission data and a multiplexer configured to distribute the encoded data that has been coded to the plurality of radio systems, and the controller sets the interleaving size of data corresponding to the radio system having a larger transmission delay to be smaller, and sets the interleaving size of data corresponding to the radio system having a smaller transmission delay to be larger, based on the transmission delay difference.

With the above configuration, the interleaving size of data corresponding to the radio system having a larger transmission delay is set to be smaller, as a result of which the processing delay can be reduced while the same randomizing effect as that in the conventional art is obtained to keep the correction capability.

Also, according to a third aspect of the present invention, in the wireless communication device, the controller defines specific data or an amount of data which can be decoded in the transmission data on a receiver side in a single radio system when setting the interleaving size, and the controller sets the interleaving size of each data corresponding to the plurality of radio systems based on the transmission delay difference for a portion beyond the specific data or a portion exceeding the amount of data.

With the above configuration, since the reception processing can start by using only data in the single radio system on the receiver side, an average transmission delay can be reduced.

Also, according to a fourth aspect of the present invention, in the wireless communication device, the coding and multiplexing unit includes a multiplexer configured to distribute the transmission data to the plurality of radio systems, and an encoder configured to encode the respective distributed transmission data, and the controller sets the interleaving size of data corresponding to the radio system having a larger transmission delay to be smaller, and sets the interleaving size of data corresponding to the radio system having a smaller transmission delay to be larger, based on the transmission delay difference.

With the above configuration, the interleaving size of data corresponding to the radio system having a larger transmission delay is set to be smaller, as a result of which the processing delay can be reduced while the same randomizing effect as that in the conventional art is obtained to keep the correction capability. Also, since the respective transmission data are encoded after having been multiplexed, the size of the encoded data and the interleaving size can be appropriately varied according to the transmission delay difference.

Also, according to a fifth aspect of the present invention, in the wireless communication device, the multiplexer distributes first hierarchical data and second hierarchical data of hierarchized data to the radio systems for each hierarchy as data to be distributed to the plurality of radio systems. In the wireless communication device, the encoder includes a first encoder configured to encode the first hierarchical data, and a second encoder configured to encode data in which a given amount of the first hierarchical data is mixed with the second hierarchical data. The wireless communication device further includes a mixer configured to mix the given amount of the first hierarchical data with the second hierarchical data, and a data selector configured to select only the second hierarchical data from the coded data by the second encoder. The interleaver includes a first interleaver configured to interleave an output of the first encoder corresponding to the first hierarchical data, and a second interleaver configured to interleave an output of the data selector corresponding to the second hierarchical data.

With the above configuration, the second hierarchical data is encoded with the inclusion of the first hierarchical data, and even if the interleaving size is equivalent to that in the conventional art, the higher randomizing effect is obtained, and the error correction capability is enhanced.

Also, according to a sixth aspect of the present invention, in the wireless communication device, the mixer inserts by distributing the first hierarchical data to the second hierarchical data at given intervals.

With the above configuration, the second hierarchical data is coded with the inclusion of the first hierarchical data, and the first hierarchical data is also distributed in the second hierarchical data. As a result, the higher randomizing effect is obtained, and the error correction capability is enhanced.

Also, according to a seventh aspect of the present invention, in the wireless communication device, the multiplexer distributes the first hierarchical data having a larger amount of data and the second hierarchical data having a smaller amount of data to the radio systems, respectively as the hierarchized data.

With the above configuration, the second hierarchical data having a smaller amount of data is encoded with the inclusion of the first hierarchical data, as a result of which the higher randomizing effect is obtained, and the error correction capability is enhanced.

Also, according to an eighth aspect of the present invention, the wireless communication device further includes an output switching unit configured to switch an output of the interleaver. In the wireless communication device, the multiplexer distributes the first hierarchical data having a higher importance and the second hierarchical data other than the first hierarchical data to the radio systems, respectively as the hierarchized data. The output switching unit switches the output of the interleaver so as to output an output of the first interleaver corresponding to the first hierarchical data to a first radio system having a higher channel quality, and to output an output of the second interleaver corresponding to the second hierarchical data to a second radio system different from the first radio system, respectively, based on channel quality information on the plurality of radio systems.

With the above configuration, the first hierarchical data having a higher importance is transmitted with the use of the first radio system having a higher channel quality, thereby enabling the reception quality to be enhanced even if the interleaving size is smaller. Also, because the second hierarchical data is encoded with the inclusion of the first hierarchical data, the higher randomizing effect is obtained, and the error correction capability is enhanced.

Also, according to a ninth aspect of the present invention, the wireless communication device further includes an output switching unit configured to switch an output of the interleaver based on transmission delay information on the plurality of radio systems so as to output an output of the first interleaver corresponding to the first hierarchical data to a first radio system having a larger transmission delay, and to output an output of the second interleaver corresponding to the second hierarchical data to a second radio system having a smaller transmission delay, respectively.

With the above configuration, the output of the first interleaver in which the plurality of hierarchical data is not mixed with each other is output to the first radio system having a larger transmission delay, as a result of which the transmission delay difference can be absorbed, and the delay of the data transmission using the plurality of radio systems can be reduced.

Also, according to a tenth aspect of the present invention, the wireless communication device further includes an output distributing unit configured to output by distributing an output of the first interleaver and an output of the second interleaver. In the wireless communication device, the multiplexer distributes first hierarchical data having a higher importance and the second hierarchical data other than the first hierarchical data to the radio systems, respectively as the hierarchized data. The output distributing unit outputs by distributing the output of the first interleaver and the output of the second interleaver so that the output of the first interleaver corresponding to the first hierarchical data is largely included into the output to the first radio system having the higher the channel quality according to the channel qualities of the plurality of radio systems, when the transmission delay difference between the plurality of radio systems fall within a given value, based on channel quality information and transmission delay information on the plurality of radio systems.

With the above configuration, because the plurality of hierarchical data is distributed and transmitted according to the channel qualities of the plurality of radio systems, the reception quality can be improved by a transmission diversity effect. Also, the first hierarchical data having a higher importance is largely included in the first radio system having a higher channel quality, thereby enabling the reception quality of data higher in the degree of importance to be enhanced.

According to an eleventh aspect of the present invention, there is provided wireless communication device for performing data transmission using a plurality of radio systems, the device including: a receiver configured to receive data interleaved based on a transmission delay difference between the plurality of radio systems on a transmitter side by the plurality of radio systems; a deinterleaver configured to deinterleave reception data received by the plurality of radio systems on the basis of interleaving size information on the interleaving on the transmitter side; a combining and decoding processor configured to combine and decode the deinterleaved data; and a reception controller configured to extract decoding information necessary for decoding from the reception data, and controls the deinterleaving processing and the combining and decoding processing.

With the above configuration, when the data having the interleaving size set based on the transmission delay difference between the plurality of radio systems is received, the higher error correction capability can be kept while reducing the processing delay, and appropriately decoding processing can be performed.

According to a twelfth aspect of the present invention, there is provided a wireless communication method in a wireless communication device for performing data transmission using a plurality of radio systems, the method including: encoding and multiplexing transmission data in correspondence with the plurality of radio systems; setting interleaving sizes of respective interleaving processing to be performed on a plurality of encoded data that has been encoded and multiplexed; and interleaving the plurality of encoded data that has been encoded and multiplexed, on the basis of the set interleaving sizes.

According to a thirteenth aspect of the present invention, there is provided a wireless communication method in a wireless communication device for performing data transmission using a plurality of radio systems, the method including: receiving data interleaved based on a transmission delay difference among the plurality of radio systems on a transmitter side by the plurality of radio systems; deinterleaving reception data received by the plurality of radio systems on the basis of interleaving size information on the interleaving on the transmitter side, which is extracted from the reception data; and combining and decoding the deinterleaved data.

Advantageous Effects of the Invention

According to the present invention, there can be provided the wireless communication device and the wireless communication method which can keep the high error correction capability while reducing the processing delay when the ECC is applied to the multi-radio.

MODES FOR CARRYING OUT THE INVENTION

Present embodiments show configuration examples in which two radio systems are used as a plurality of radio systems in a multi-radio. It is assumed, as the radio systems, a wireless communication system compatible with LTE-Advanced (Long Term Evolution Advanced), and a wireless communication system (WiMAX 2.0) compatible with IEEE 802.16m, which have been studied in 3GPP (3rd Generation Partnership Project).

Figure 1:
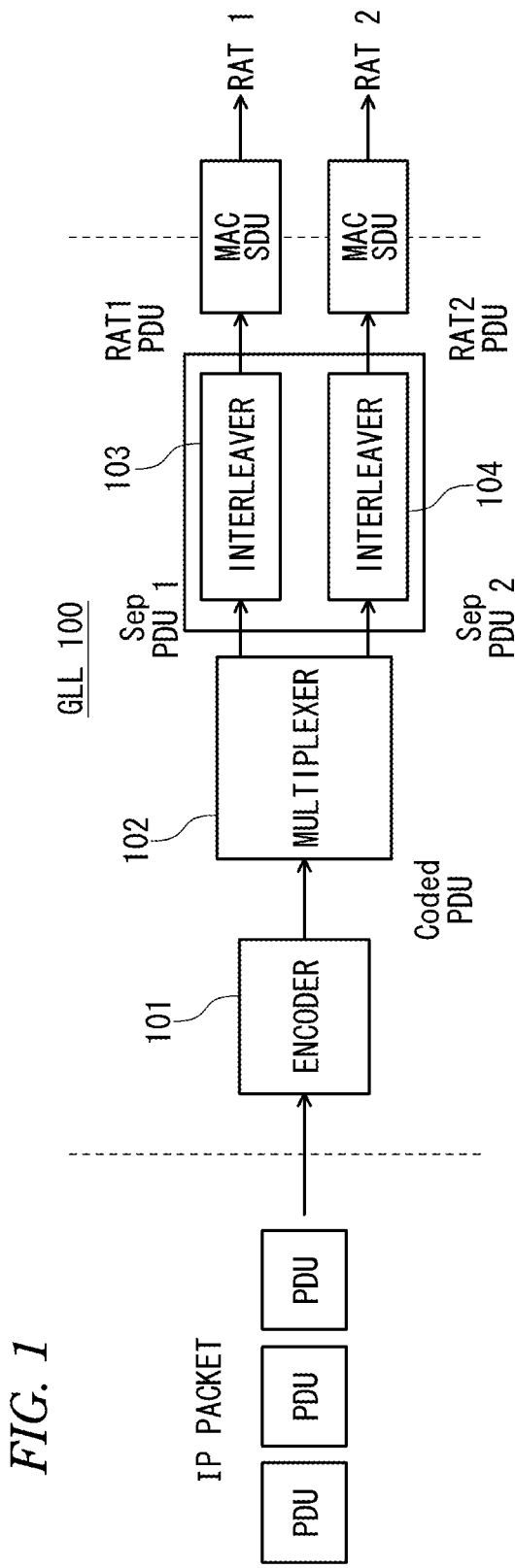
FIG. 1 is a block diagram illustrating a configuration example of a wireless communication device on a transmitter side when an ECC is applied to a GLL in a multi-radio, which illustrates a configuration that serves as a premise of the present invention.

FIG. 1 is a block diagram illustrating a configuration example of a wireless communication device on a transmitter side when an ECC is applied to a GLL in a multi-radio, which illustrates a configuration that serves as a premise of the present invention. A GLL 100 that absorbs differences in physical layer and MAC layer among a plurality of radio systems (RAT1, RAT2) includes an encoder 101, a multiplexer (or MRRM) 102, and two interleavers 103, 104.

Figure 2:
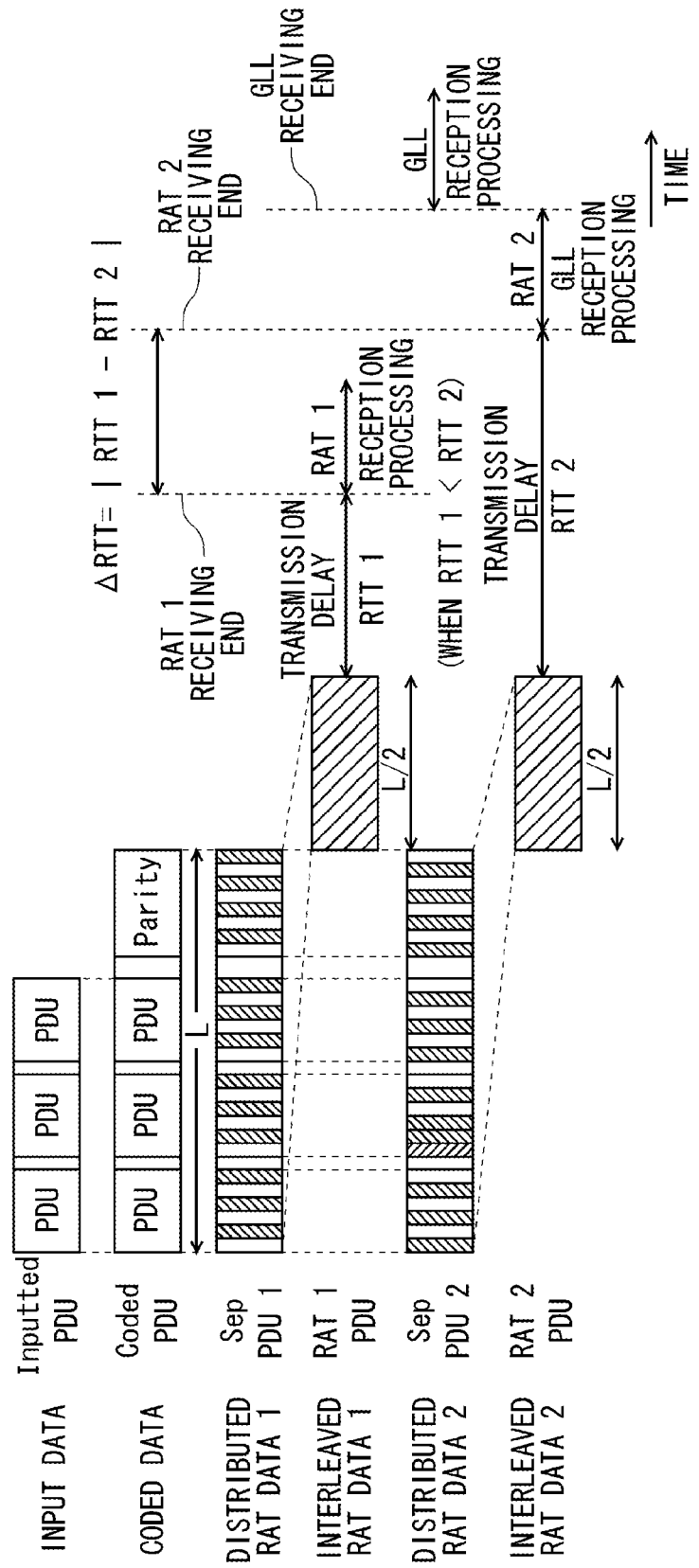
FIG. 2 is a diagram illustrating processing of the GLL in the configuration example of FIG. 1.

FIG. 2 is a diagram illustrating processing of the GLL in the configuration example of FIG. 1. In FIG. 2, input data (Inputted PDU), coded data (Coded PDU), RAT data (Sep PDU1, Sep PDU2) that have been coded and distributed, and RAT data (RAT1 PDU, RAT2 PDU) that has been interleaved are illustrated on a time axis.

The encoder 101 receives the input data (Inputted PDU), and outputs the coded data (Coded PDU) with the addition of a redundant bit (parity bit, Parity). The multiplexer 102 separates the coded data into packets each having a given size, gathers the packets of the given size together for a plurality of RATs, and alternately distributes those packets to the RATs. The interleavers 103 and 104 interleave the RAT data (Sep PDU1, Sep PDU2) distributed to the respective RATs in units of the coded data of the given size including the data of the plural IP packets. The interleavers 103 and 104 add headers to the distributed and interleaved RAT data (RAT1 PDU, RAT2 PDU) to generate the RAT packets (MAC SDU) which are data packets of the MAC layer, and output the RAT packets to the respective RATs (RAT1, RAT2). In the respective RAT1 and RAT2, data is transmitted by the respective radio systems.

Figure 38:
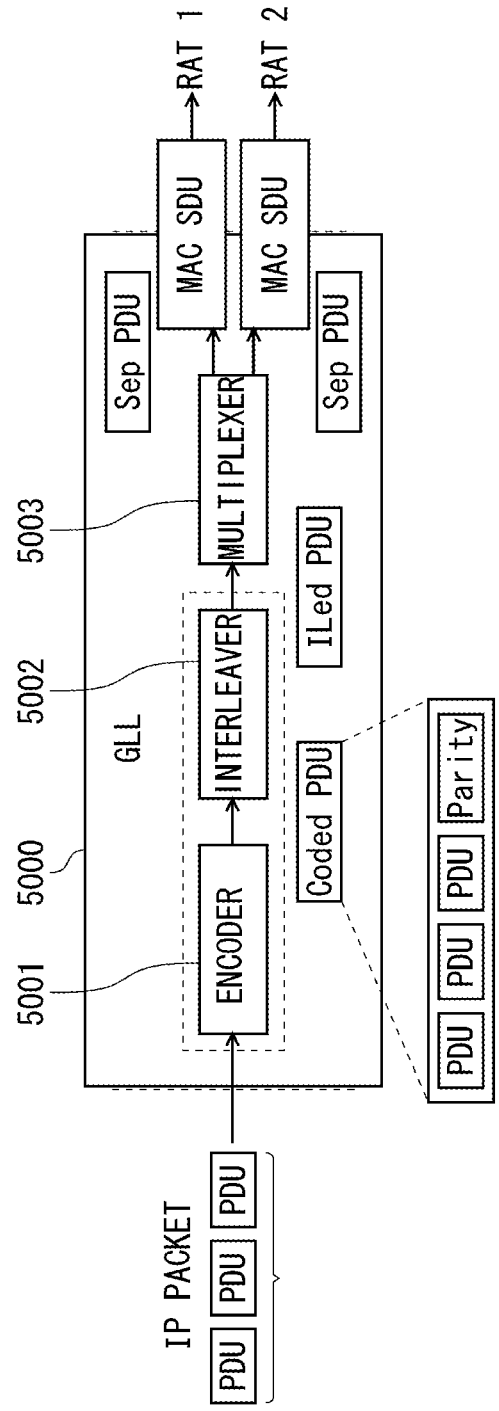
FIG. 38 is a block diagram illustrating a configuration example of a wireless communication device on a transmitter side when the ECC is applied to the GLL in the multi-radio.
Figure 39:
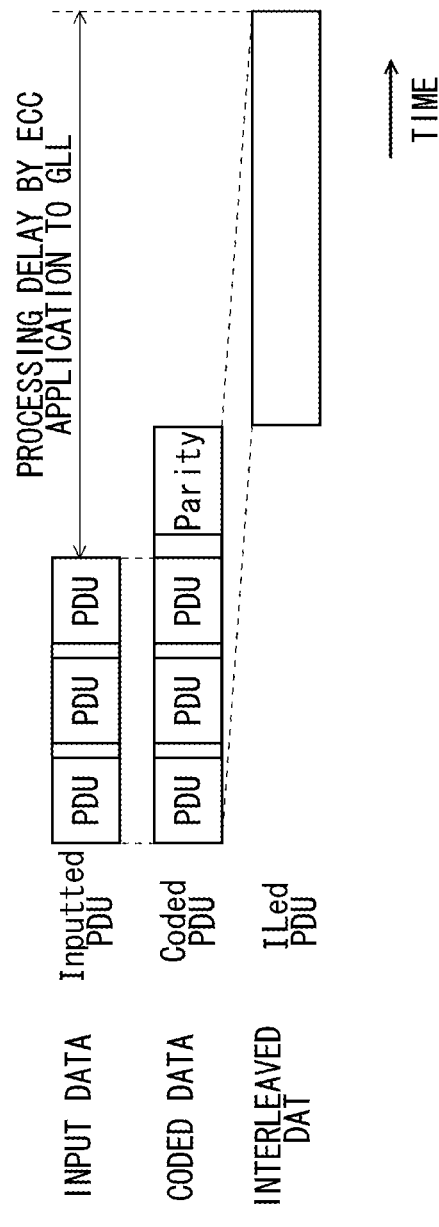
FIG. 39 is a diagram illustrating a processing delay when the ECC is applied to the GLL.

Thus, when the ECC is applied to the upper layer (in this example, GLL) by the physical layer in a multi-radio, the coded data is distributed for each of the RATs before being interleaved, and therefore the interleaving processing includes the distribution of the RAT data in the multiplexer. For that reason, even if interleaving sizes (IL size) are reduced in the interleavers 103 and 104, sufficient randomizing effect is obtained. FIG. 2 illustrates an example in which a coded data size L is alternately and evenly distributed and output to the RAT1 and the RAT2 for each given size by the multiplexer 102. In this case, an IL size in units of the RAT data is L/2, and the IL size can be halved as compared with the configuration example illustrated in FIG. 38. Accordingly, a processing delay by the interleaving can be halved, and the same randomizing effect as that in the configuration example illustrated in FIG. 38 can be obtained.

However, in the configuration example of FIG. 1, when a transmission delay difference ($\Delta RTT=|RTT1-RTT2|$) between the RAT1 and the RAT2 is large, the processing on receiving device side of the RAT1 and the RAT2 is affected by the RAT larger in the transmission delay, resulting in such a problem that the delay to the GLL reception processing becomes large. That is, a difference occurs in a start time of the reception processing on each of the RAT as large as the transmission delay difference $\Delta RTT$, and the start of the GLL reception processing is delayed. Therefore, the delay becomes larger as the transmission delay difference $\Delta RTT$ is larger. In this example, not only a so-called round trip time, but also information indicative of the size or degree of the transmission delay between the transmitter side and the receiver side in the respective RATs may be used for the RTTs (RTT1, RTT2) representative of the transmission delay of the respective RATs.

Under the circumstances, the following embodiments illustrate examples of a wireless communication device and a wireless communication method, which can keep the high error correction capability while reducing the processing delay when the ECC is applied in the multi-radio even in the assumed various statuses such that there is the transmission delay difference between the RATs.

FIRST EMBODIMENT

Figure 3:
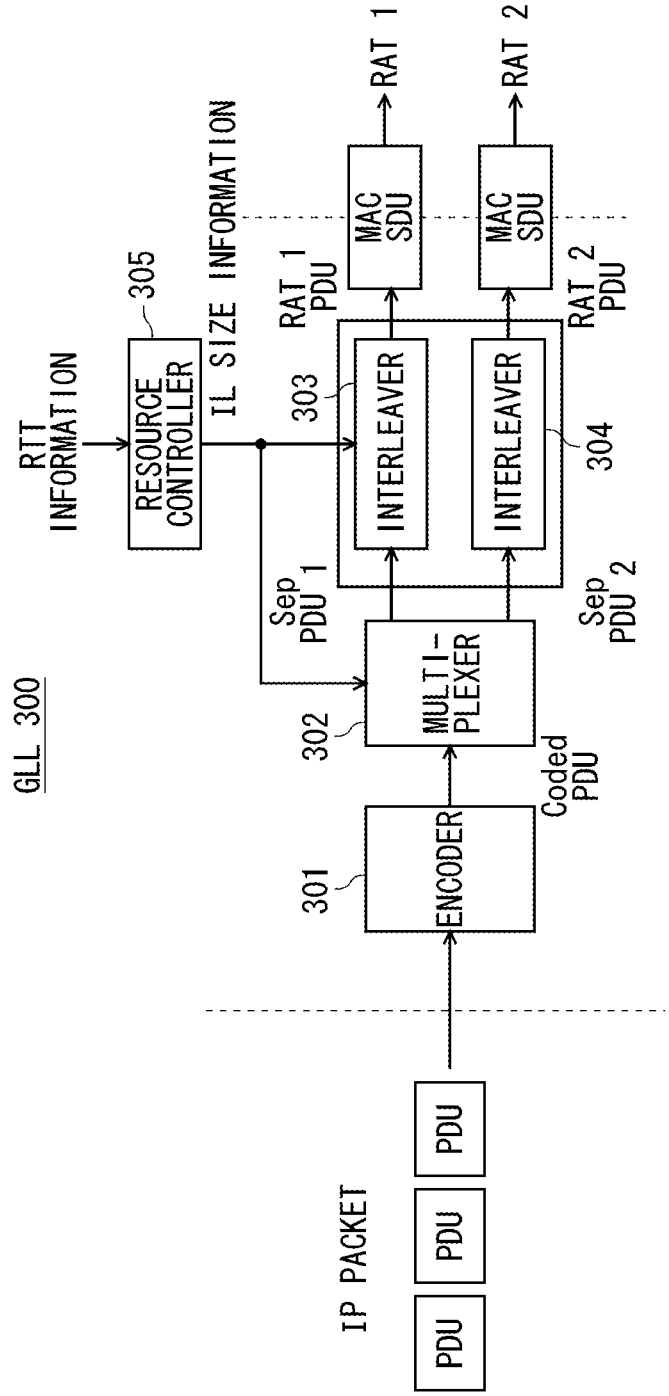
FIG. 3 is a block diagram illustrating a configuration of a wireless communication device according to a first embodiment of the present invention.

FIG. 3 is a block diagram illustrating a configuration of a wireless communication device according to a first embodiment of the present invention, which illustrates a configuration of a transmitter side when the ECC is applied to the GLL in the multi-radio. A GLL 300 includes an encoder 301, a multiplexer 302, two interleavers 303, 304, and a resource controller 305.

In the first embodiment, the RAT data for the plural RATs which have been distributed by the multiplexer 302, are interleaved by the interleavers 303 and 304. In this situation, the resource controller 305 variably sets the IL size on the basis of the transmission delay difference $\Delta RTT=|RTT1-RTT2|$ between the RAT1 and the RAT2 by the aid of the RTT information indicative of the transmission delay of the respective RATs. Specifically, the resource controller 305 sets an IL size ratio $\alpha$ between the plural RATs. The multiplexer 302 and the interleavers 303, 304 perform processing according to the IL size information. The IL size information may be included in packet control information.

Figure 4:
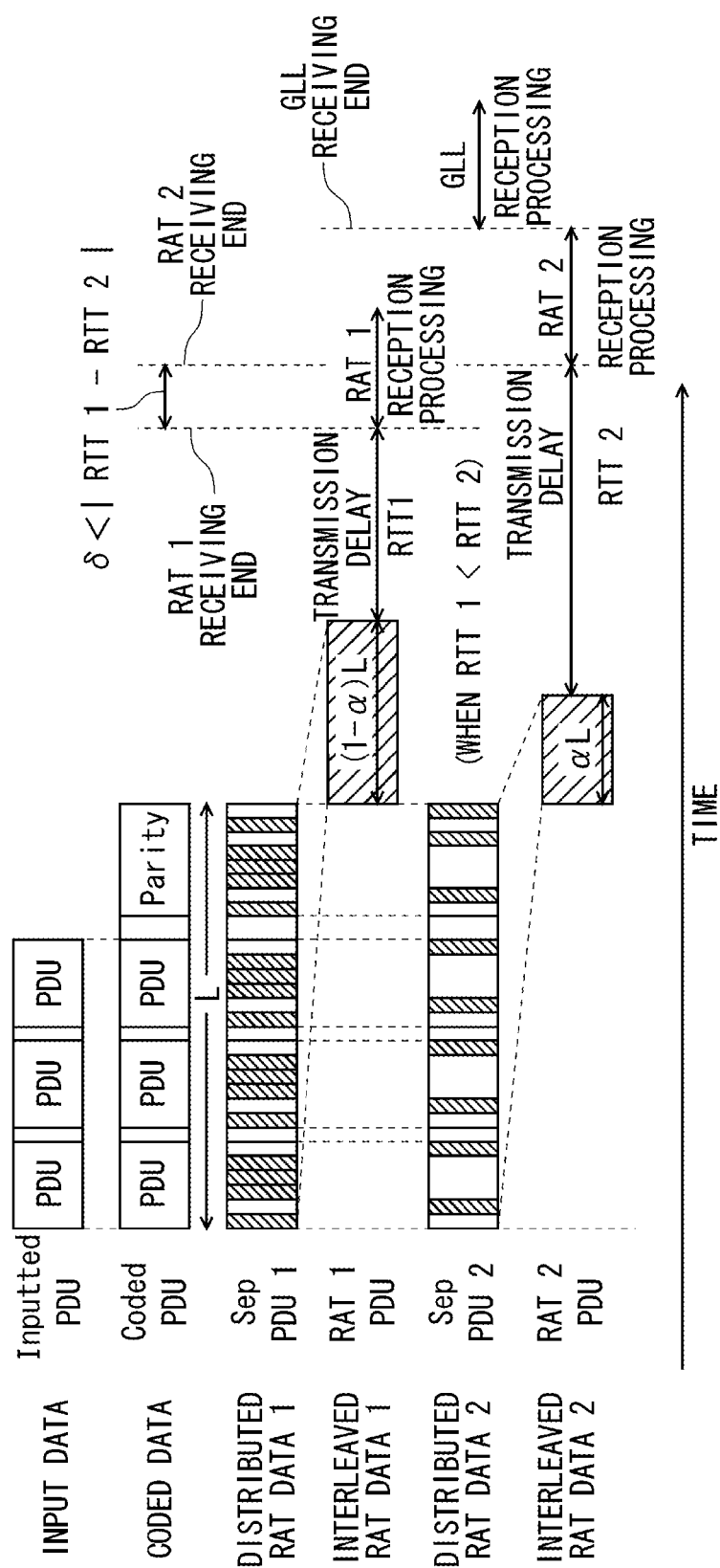
FIG. 4 is a diagram illustrating processing of a GLL according to the first embodiment.

FIG. 4 is a diagram illustrating processing of a GLL according to the first embodiment. In FIG. 4, input data (Inputted PDU), coded data (Coded PDU), RAT data (Sep PDU1, Sep PDU2) that have been coded and distributed, and RAT data (RAT1, PDU, RAT2 PDU) that has been interleaved are illustrated on a time axis.

The encoder (having a function of the encoder) 301 receives the input data (Inputted PDU), and outputs the coded data (Coded PDU) in which a redundant bit (parity bit, parity) is added to the input data (Inputted PDU). The multiplexer 302 separates the coded data into packets each having a given size, gathers the packets of the given size together for a plurality of RATs, and alternately distributes those packets to the RATs. The interleavers 303 and 304 interleave the RAT data (Sep PDU1, Sep PDU2) distributed to the respective RATs in units of the coded data of the given size including the data of the plural IP packets. The interleavers 303 and 304 add headers to the distributed and interleaved RAT data (RAT1, PDU, RAT2, PDU) to generate the RAT packets (MAC SDU) which are data packets of the MAC layer, and output the RAT packets to the respective RATs (RAT1, RAT2). In the respective RAT1 and RAT2, data is transmitted by the respective radio systems.

Thus, as the IL sizes when the interleaving processing is performed in the interleavers 303 and 304, it is assumed that the IL size of the RAT data to the RAT larger in the RTT is $\alpha L$ (where $\alpha<0.5$), and the IL size of the RAT data to the RAT smaller in the RTT is $(1-\alpha)L$, relative to the coded data size L. That is, the IL size of the RAT larger in the RTT is set to be smaller, and the IL size of the RAT smaller in the RTT is set to be larger. FIG. 4 illustrates a case of RTT1<RTT2. Also, the multiplexer 302 distributes the RAT data according to the IL size information (control information indicative of $\alpha$) from the resource controller 305. Also, when the IL size is set, a quantization size of a is restricted (for example, ⅓, ¼, ⅕, etc.) so as to reduce the amount of information for IL size information notice.

Thus, when the IL size is so set as to reduce the IL size of the RAT larger in the transmission delay for processing, the processing delay on a GLL receiving end can be reduced while obtaining the same randomizing effect as that in the configuration example of FIG. 1. In this situation, a difference $\delta$ in a time combining the interleaving processing and the transmission delay in the respective RATs is smaller than the transmission delay difference $|RTT1-RTT2|$ between the RAT1 and the RAT2 to reduce the delay till the GLL reception processing. Accordingly, according to the first embodiment, even if there is the transmission delay time between the RATs, the high error correction capability can be kept while reducing the processing delay.

SECOND EMBODIMENT

A second embodiment is a modified example in which the first embodiment is partially changed, which is a processing example in which duplicated data is included between the plural RATs. The configuration of the wireless communication device is identical with that in the first embodiment shown in FIG. 3, and the operation of the resource controller 305 is different from the operation of the multiplexer 302. In this example, portions different from those in the first embodiment will be mainly described.

In the second embodiment, when the RAT data is distributed by the multiplexer 302, decodable data or the amount $\gamma$ of decodable data in the input data (or transmission data) is defined by a single RAT. Then, the resource controller 305 sets the IL size, which is distributed to the respective RATS, according to the transmission delay difference $\Delta RTT$, with respect to a portion exceeding the amount of data y, and makes a distribution ratio of the IL size between the RATs variable.

Figure 5:
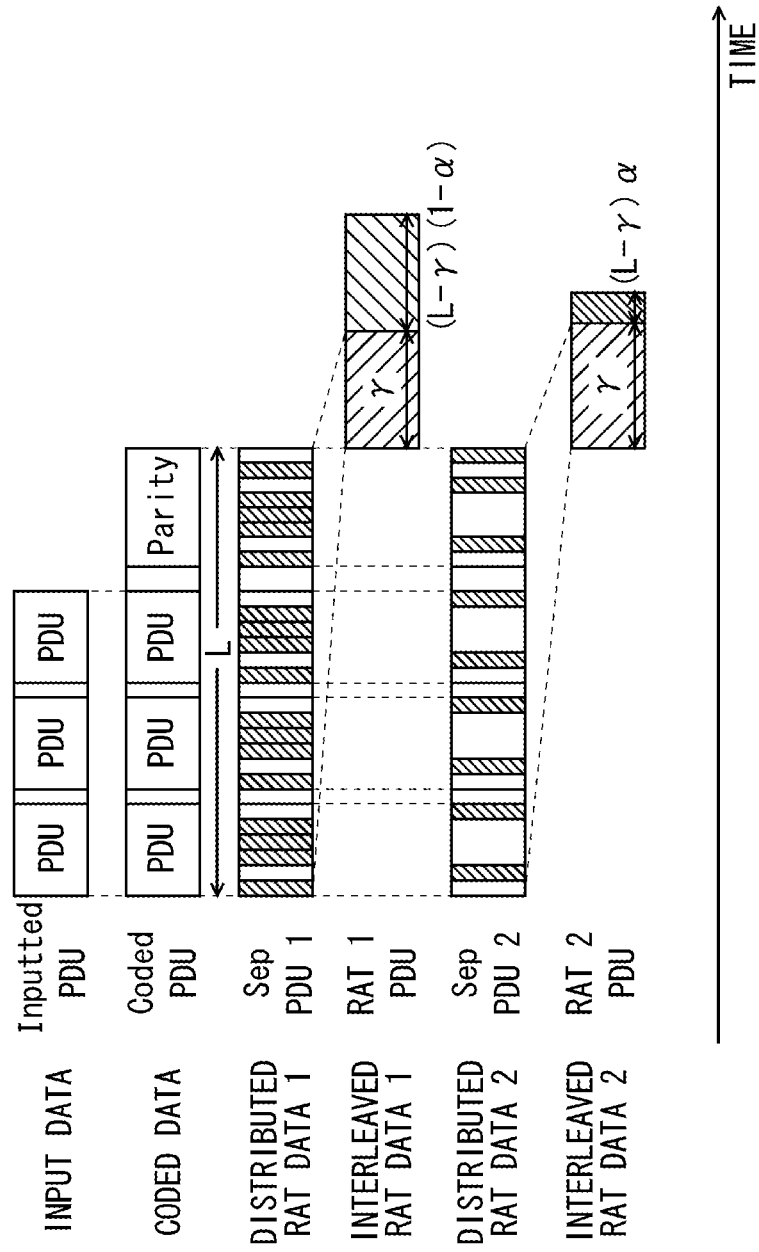
FIG. 5 is a diagram illustrating processing of a GLL according to a second embodiment.

FIG. 5 is a diagram illustrating processing of a GLL according to a second embodiment. Prior to the processing of this embodiment, the RTT information on the respective RATs (RAT1, RAT2) is fed back (RTT1, RTT2) on a transmitter side in advance. When the resource controller 305 distributes the RAT data, the resource controller 305 defines specific data or the amount of data $\gamma$ decodable in all of packets by a single RAT. Further, in addition to $\gamma$, the resource controller 305 determines an IL size ratio (in this example, data redundancy) α on the basis of the transmission delay difference ΔRTT between the RAT1 and the RAT2, and distributes the RAT data.

As an example, a systematic bit (or information bit) in the coded data is set as specific data γ, and it is assumed that the data redundancy α is a coefficient for distributing a parity bit (parity bit, redundant bit) [(L−γ) bit] at a mother code rate (mother coding rate) of the encoder of the coded data size [L bit].

The IL size is set on the basis of the transmission delay difference ΔRTT=|RTT1−RTT2| between the RAT1 and the RAT2. As the IL size, it is assumed that the IL size of the RAT data to the RAT larger in the RTT is γ+(L−γ)α (where α<0.5), and the IL size of the RAT data to the RAT smaller in the RTT is γ+(L−γ)(1−α), relative to the coded data size L. In this case, the transmission packet size of the RAT1 and the RAT2 combining the RAT1 and the RAT2 is larger than the coded data size L. Also, in the multiplexer 302, the RAT data is distributed according to the IL size information (control information indicative of γ and α) from the resource controller 305. Also, when the IL size is set, the quantization size of α is restricted (for example, ⅓, ¼, ⅕, etc.) so as to reduce the amount of information for IL size information notice.

Thus, the specific data or the amount of data decodable in all of packets is defined by a single RAT. As a result, although there is a need to start the ECC reception processing of the GLL after data of the plural RATs has been received in the first embodiment, the ECC reception processing of the GLL can start even by using only data of the single RAT in the first embodiment. For that reason, an ECC coding gain can be enhanced, and an average transmission delay can be reduced. Also, since the IL size between the RATs is determined so as to absorb the transmission delay difference, a delay (transmission delay+processing delay) on the GLL receiving end can be reduced.

THIRD EMBODIMENT

Figure 6:
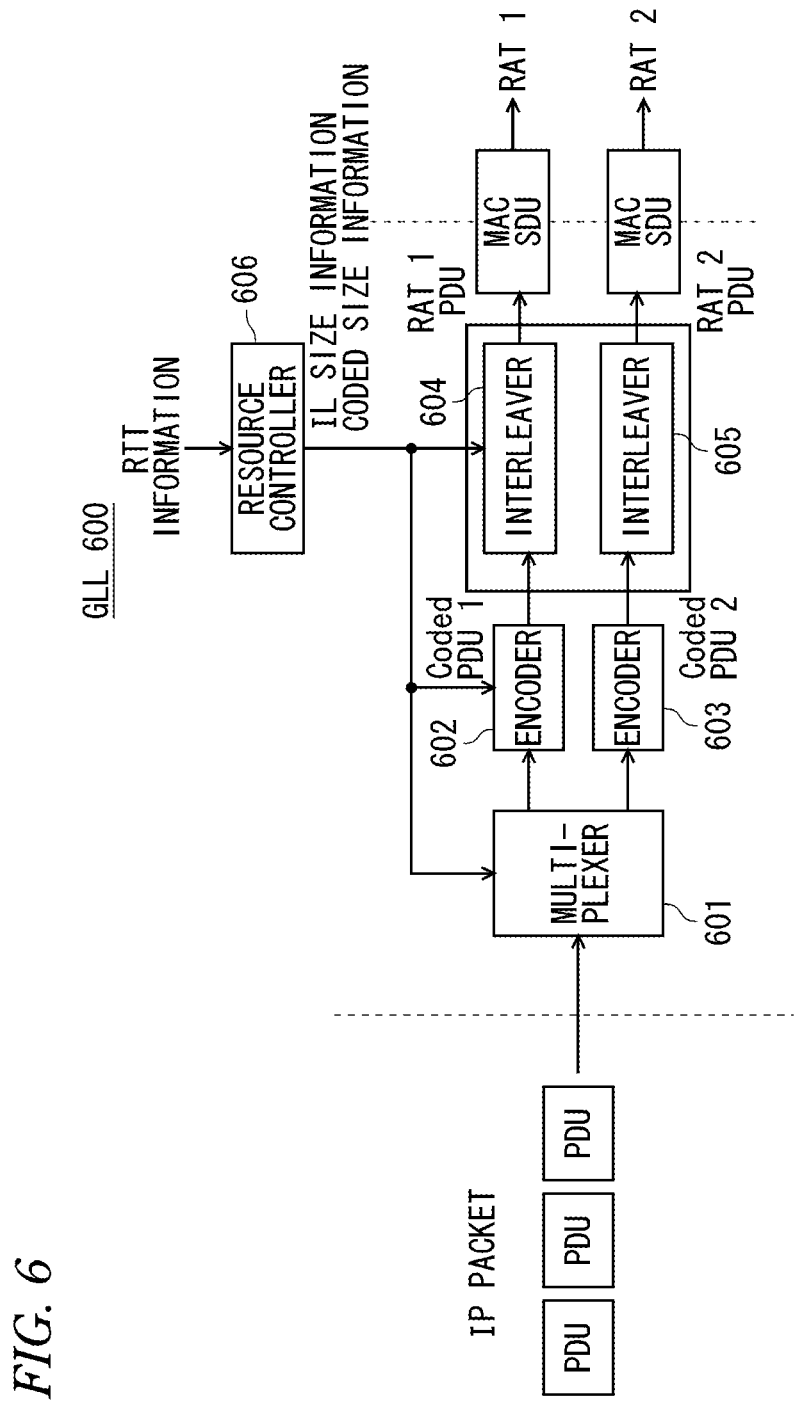
FIG. 6 is a block diagram illustrating a configuration of a wireless communication device according to a third embodiment of the present invention.

FIG. 6 is a block diagram illustrating a configuration of a wireless communication device according to a third embodiment of the present invention, which illustrates a configuration of a transmitter side when the ECC is applied to the GLL in the multi-radio. A GLL 600 includes a multiplexer 601, two encoders 602, 603, two interleavers 604, 605, and a resource controller 606.

In the third embodiment, after input data has been distributed to the RAT data for the plural RATs by the multiplexer 601, the respective RAT data is coded by the encoders 602 and 603 each having the function of an coding unit, and then interleaved by the interleavers 604 and 605. In this situation, the resource controller 606 variably sets the IL size on the basis of the transmission delay difference ΔRTT=|RTT1−RTT2| between the RAT1 and the RAT2 by the aid of the RTT information indicative of the transmission delay of the respective RATs. The multiplexer 601, the encoders 602, 603, and the interleavers 604, 605 perform processing according to the IL size information and the coded size information. The IL size information and the coded size information may be included in the packet control information.

Figure 7:
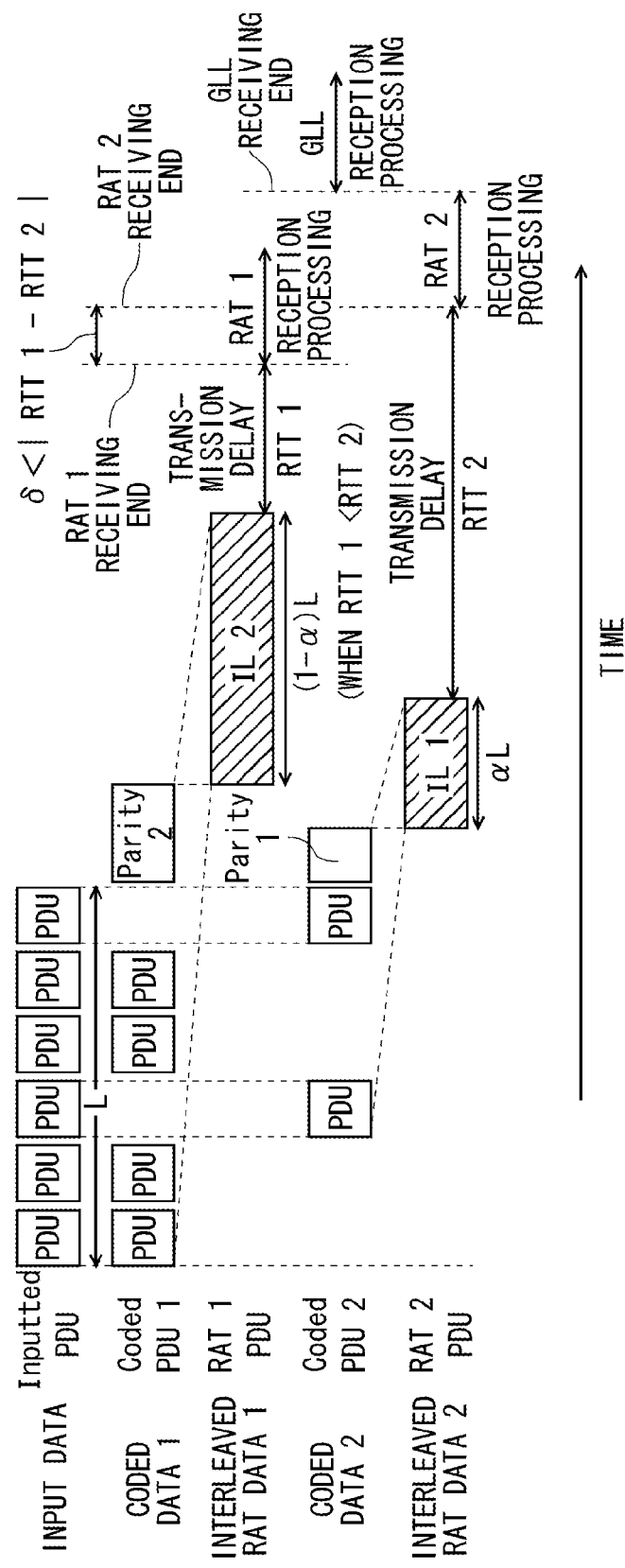
FIG. 7 is a diagram illustrating processing of a GLL according to the third embodiment.

FIG. 7 is a diagram illustrating processing of a GLL according to the third embodiment. In FIG. 7, input data (Inputted PDU), coded data (Coded PDU1, Coded PDU2) that has been coded after distribution, and RAT data (RAT1 PDU, RAT2 PDU) that has been interleaved are illustrated on a time axis.

The multiplexer 601 separates the input data (Inputted PDU) of plural packets, and distributes the separate data for the plural RATs. The encoders 602 and 603 output the coded data (Coded PDU1, Coded PDU2) in which a redundant bit (parity bit, parity) is added to the RAT data distributed to the respective RATs. The interleavers 604 and 605 interleave the coded data including the parity bits distributed to the respective RATs. The interleavers 604 and 605 add headers to the distributed and interleaved RAT data (RAT1 PDU, RAT2 PDU) to generate the RAT packet (MAC SDU) that is a data packet of the MAC layer, and output the generated RAT packet to the respective RATs (RAT1, RAT2). In the respective RAT1 and RAT2, data is transmitted by the respective radio systems.

Prior to the processing of this embodiment, the RTT information on the respective RATs (RAT1, RAT2) is fed back (RTT1, RTT2) on a transmitter side in advance. The resource controller 606 sets the coded size and the IL size of the respective RAT data on the basis of the transmission delay difference ΔRTT between the RAT1 and the RAT2. Specifically, the resource controller 606 sets the IL size ratio α between the plural RATs in the multiplexer 601, the RAT data is distributed according to the IL size information or the coded size information (control information indicative of α) from the resource controller 606. In this example, as the IL size when the interleaving processing is performed in the interleavers 604 and 605, it is assumed that the IL size of the RAT data to the RAT larger in the RTT is αL (where α<0.5), and the IL size of the RAT data to the RAT smaller in the RTT is (1−α)L, relative to the data size L of the plural input IP packets. That is, the IL size of the RAT larger in the RTT is set to be smaller, and the IL size of the RAT smaller in the RTT is set to be larger.

FIG. 7 illustrates a case of RTT1<RTT2. Also, the encoders 602 and 603 encode and output the distributed RAT data at a given coding rate according to the IL size information or the coded size information. Also, when the IL size is set, the quantization size of α is restricted (for example, ⅓, ¼, ⅕, etc.) so as to reduce the amount of information for notice of the IL size information or the coded size information.

Thus, when the IL size is so set as to reduce the IL size of the RAT larger in the transmission delay for processing, the processing delay on the GLL receiving end can be reduced while obtaining the same randomizing effect as that in the configuration example of FIG. 1. In this situation, a difference 8 in a time combining the interleaving processing and the transmission delay in the respective RATs is smaller than the transmission delay difference |RTT1−RTT2| between the RAT1 and the RAT2 to reduce the delay till the GLL reception processing.

In an example of FIG. 7, the multiplexer 601 distributes the data to the respective RATs on the PDU basis. However, the present invention is not limited to this configuration, but the multiplexer 601 may distribute the data to the plural RATs on another given basis such as half of the PDU.

FOURTH EMBODIMENT

Figure 37:
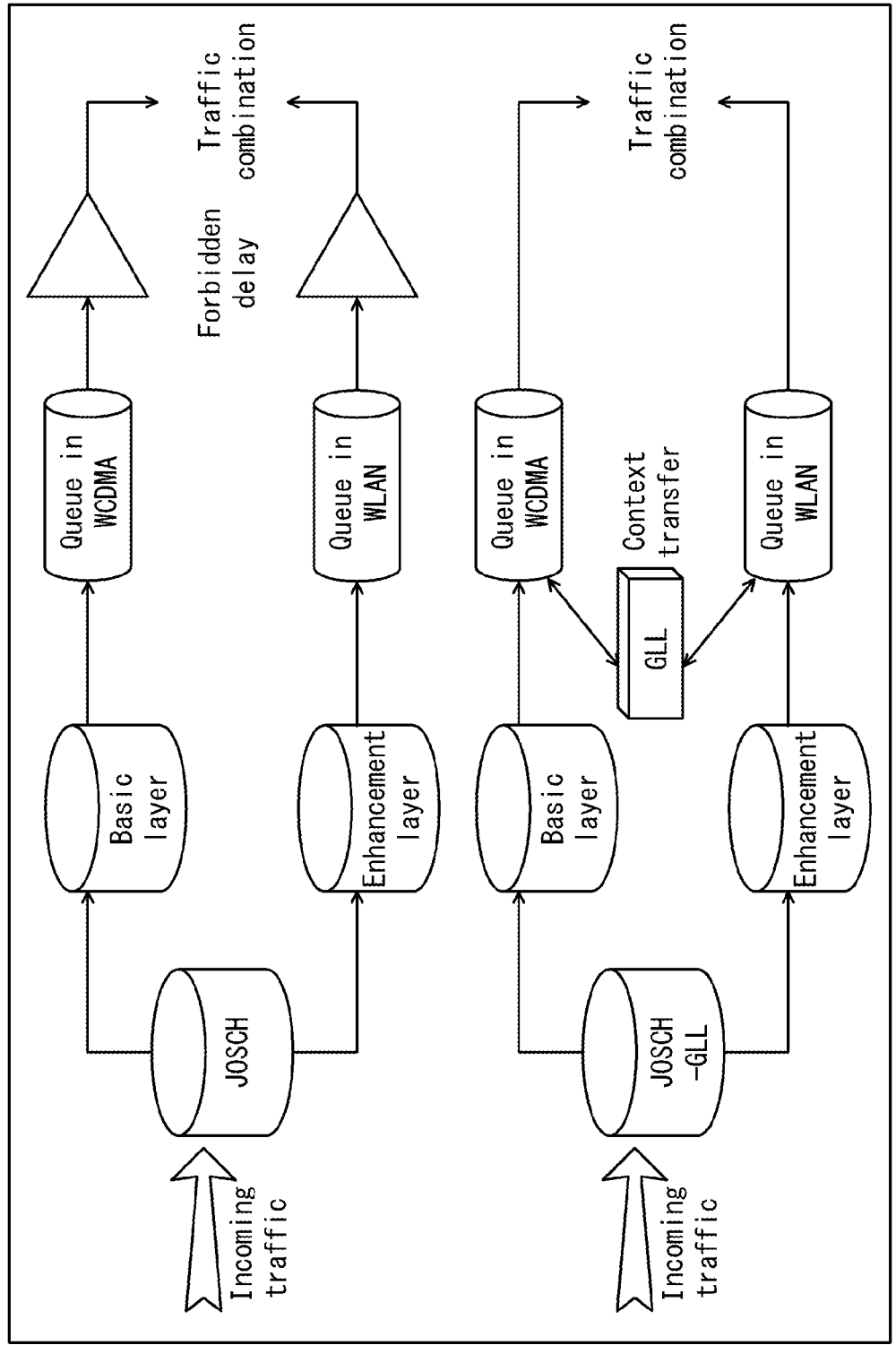
FIG. 37 is a diagram illustrating an example in which the GLL is applied to hierarchized data transmission.

A fourth embodiment is an example related to the configuration of the third embodiment, which shows a processing example to which a hierarchical coding is applied. In this example, as in the conventional art illustrated in FIG. 37, it is assumed that the processing is applied to data transmission hierarchized into a plurality of hierarchies such as a basic layer and an enhancement layer, an important packet and a normal packet, or a standard definition packet and a high-definition packet. When the FEC/ECC coding for each hierarchy and the interleaving processing for each hierarchy are performed, the interleaving processing are performed in parallel. Therefore, the processing delay for the same number of IP packets can be reduced as compared with the configuration example illustrated in FIG. 38. However, a reduction in the coded size and the IL size involves a problem that the error correction capability for a burst error is deteriorated. Under the circumstances, in this embodiment, attention is paid to a fact that the number of bits of the important packets (Basic layer, standard definition packet, etc.) is small, and an influence of deterioration of the important packet is large, in the hierarchically coded data. As the ECC, a method of coding the important packet when using a systematic code is devised to improve an ECC coding gain.

Figure 8:
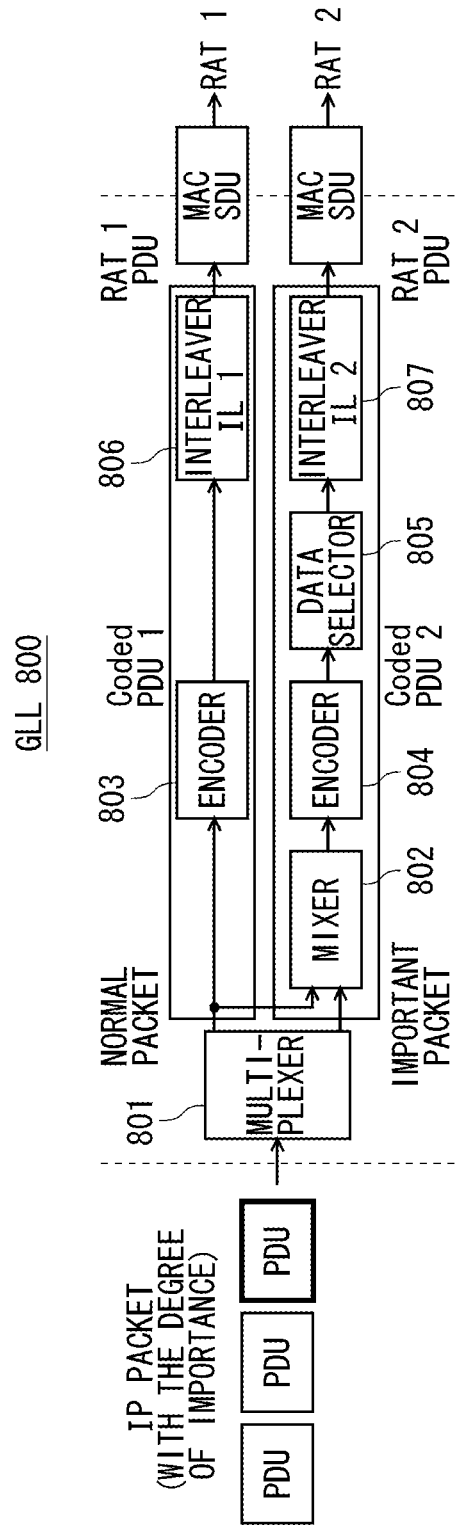
FIG. 8 is a block diagram illustrating a configuration of a wireless communication device according to a fourth embodiment of the present invention.

FIG. 8 is a block diagram illustrating a configuration of a wireless communication device according to a fourth embodiment of the present invention, which illustrates a configuration of a transmitter side when the hierarchical coding is applied to the GLL in the multi-radio. A GLL 800 includes a multiplexer 801, a mixer 802, encoders 803, 804, a data selector 805, and interleavers 806, 807.

Figure 9:
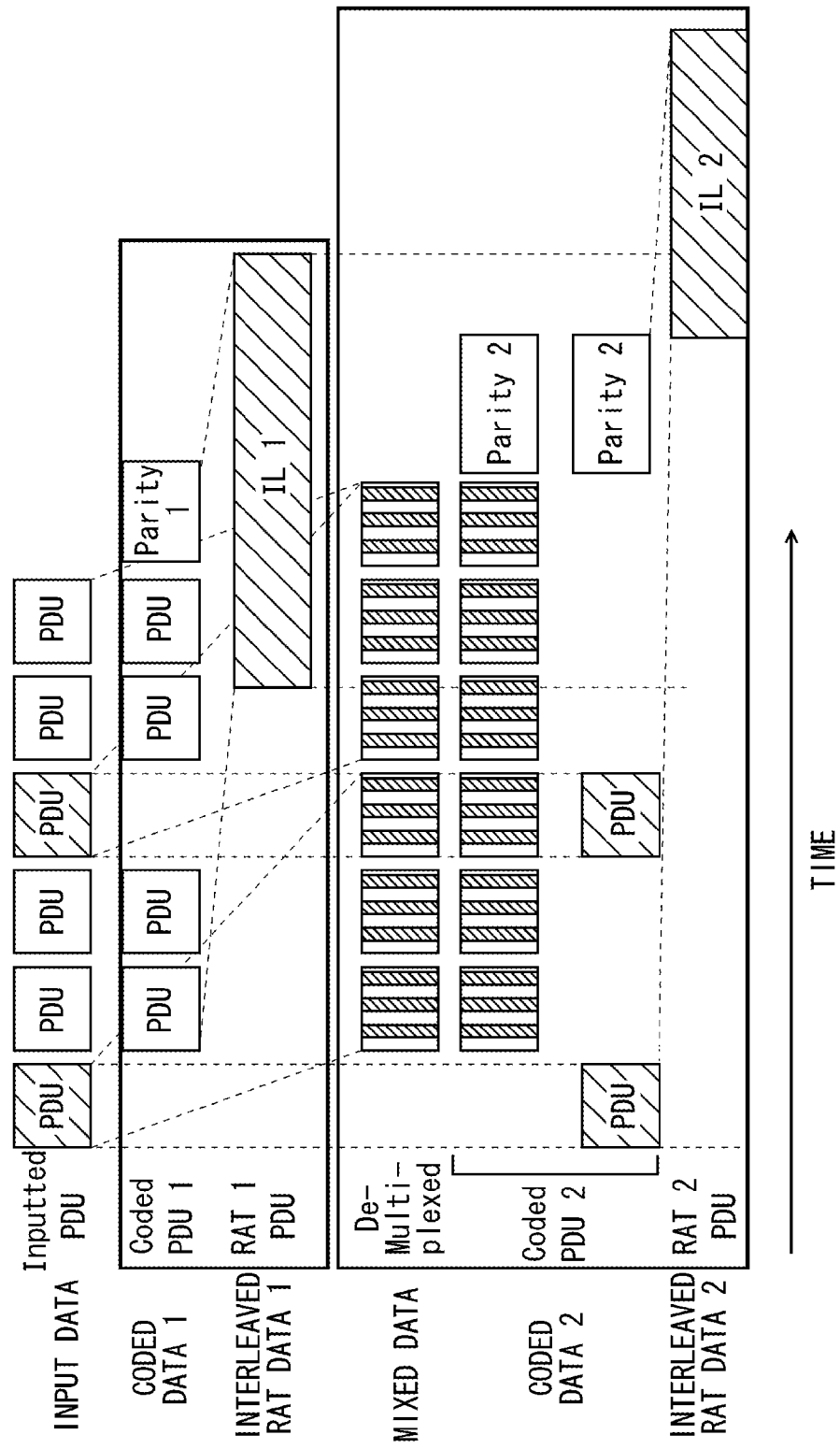
FIG. 9 is a diagram illustrating processing of a GLL according to the fourth embodiment.

FIG. 9 is a diagram illustrating processing of a GLL according to the fourth embodiment. In FIG. 9, input data (Inputted PDU), mixed data (De-Mutiplexed), coded data (Coded PDU1, Coded PDU2), and RAT data (RAT1 PDU, RAT2 PDU) that has been interleaved are illustrated on a time axis. In the transmission-processing, the multiplexer 801 first separates the input data into normal packet data (corresponding to first hierarchical data) and important packet data (corresponding to second hierarchical data).

The first encoder 803 performs FEC coding (FEC1) on the normal packet data, and the first interleaver 806 performs interleaving (IL1) on the coded data that has been coded. Then, the encoder 803 adds a header to the interleaved data to generate an RAT packet (MAC SDU), and transmits the generated RAT packet by the RAT1.

On the other hand, the mixer 802 dispersedly inserts the important packet data (PDU indicated by a heavy line in FIG. 8) into the normal packet data at given intervals to mix data of the important packets and the normal packets together. For example, the important packet data is inserted into the normal packet data thinned every given interval. The second encoder 804 performs FEC coding (FEC2) on data in which the important packet data and the normal packet data are mixed together by the systematic code. In this situation, a parity bit (Parity 2) of the encoded data includes the important packet and the normal packet as the information bit. The data selector 805 selects the data so as to output only the important packet data except for the mixed normal packet data from the information bit of the coded data. The second interleaver 807 performs interleaving (IL2) on the coded data except for the normal packet data. Then, the second interleaver 807 adds the header to the interleave data to generate the RAT packet (MAC SDU), and transmits the generated RAT packet by the RAT2.

In the reception processing, the RAT1 performs FEC1 decoding on the FEC1 coded data on the transmitter side to acquire decoded data. Also, the RAT2 performs FEC2 decoding on the FEC2 coded data on the transmitter side by using the FEC1 decoding result of the RAT1. However, even before the FEC1 decoding of the RAT1 has been completed, the FEC2 can be decoded by setting the important packet data as an erasure bit.

Thus, in the fourth embodiment, in the hierarchical coding, FEC2 coding is performed on the important packet data smaller in the amount than the normal packet data with the inclusion of the normal packet data. Also, the important packet data is dispersed in the normal packet data. That is, in the important packet data, the amount of data in a parity portion of the coded data is increased, and the normal packet data to be mixed is thinned every given interval and dispersed for insertion. As a result, even if the IL size of the interleaving processing IL2 on the important packet data is substantially identical with that in the conventional example illustrated in FIG. 37, the higher randomizing effect is obtained, thereby enabling the error correction capability to be enhanced.

MODIFIED EXAMPLE OF FOURTH EMBODIMENT

In a modified example of the above fourth embodiment, on the transmitter side, if the transmission of the packet data for the RAT1 (RAT packet of normal packet data in the above example) starts in a standby period of the packet data for the RAT2 (RAT packet of important packet data in the above example), the RAT packet within that period can be transmitted even by the RAT2. In this case, on the receiver side, when the RAT packet of the RAT2 is received, the RAT packet on which the interleaving processing (IL1, IL2) is performed is deinterleaved on the basis of permutation information included in the header to perform the FEC2 decoding. With the above processing, the resources used in the RAT2 are increased, but an increase in the delay can be suppressed. Also, when the RAT packet of the RAT2 is decoded, the decoding is enabled together with a part of the RAT packet of the RAT1, and therefore the error correction effect is enhanced.

FIFTH EMBODIMENT

A fifth embodiment is a modified example of the fourth embodiment, which shows a processing example responsive to channel qualities of the plural RATs. In the fifth embodiment, when it is assumed that a bias of the reception quality between the plural RATs is larger, the bias of the reception quality is used to improve the reception characteristic while reducing a comprehensive processing delay.

Figure 10:
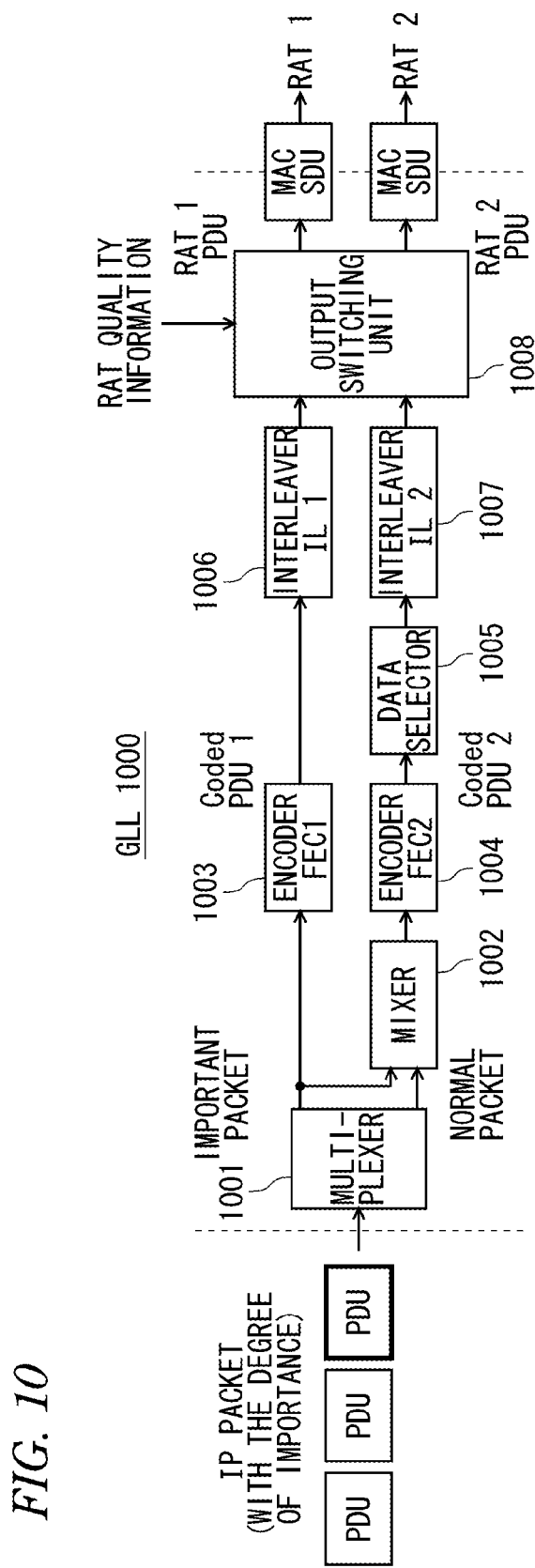
FIG. 10 is a block diagram illustrating a configuration of a wireless communication device according to a fifth embodiment of the present invention.

FIG. 10 is a block diagram illustrating a configuration of a wireless communication device according to a fifth embodiment of the present invention, which illustrates a configuration of a transmitter side when the hierarchical coding is applied to the GLL in the multi-radio. A GLL 1000 includes a multiplexer 1001, a mixer 1002, encoders 1003, 1004, a data selector 1005, interleavers 1006, 1007, and an output switching unit 1008.

Figure 11:
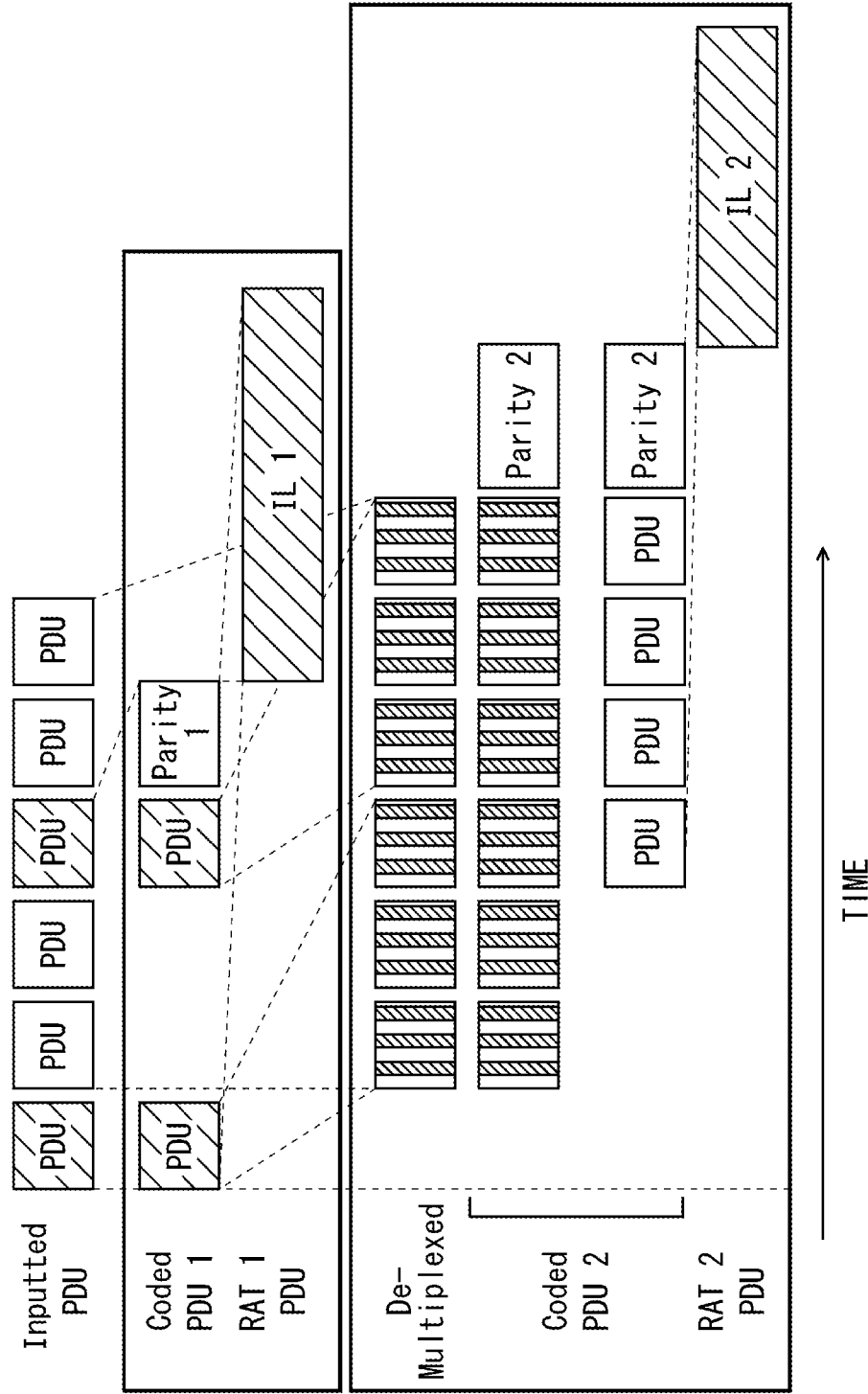
FIG. 11 is a diagram illustrating processing of a GLL according to the fifth embodiment.

FIG. 11 is a diagram illustrating processing of a GLL according to the fifth embodiment. In the transmission processing, the multiplexer 1001 first separates the input data into the normal packet data and the important packet data. In the fifth embodiment, the processing on the normal packet data and the important packet data is replaced with each other as compared with the processing of the fourth embodiment. The first encoder 1003 performs FEC coding (FEC1) on the important packet data, and the first interleaver 1006 performs interleaving processing (IL1) on the coded data that has been coded. The interleaver 1006 adds the header to the interleave data to generate the RAT packet (MAC SDU), and transmits the generated RAT packet by one RAT (for example, RAT1).

On the other hand, the mixer 1002 dispersedly inserts the important packet data (PDU indicated by a heavy line in FIG. 10) into the normal packet data at given intervals to mix data of the important packets and the normal packets together. The second encoder 1004 performs FEC coding (FEC2) on data in which the important packet data and the normal packet data are mixed together by the systematic code. The data selector 1005 selects the data so as to exclude the mixed important packet data from the information bit of the coded data. The second interleaver 1007 performs interleaving processing (IL2) on the coded data except for the important packet data. Then, the second interleaver 1007 adds the header to the interleave data to generate the RAT packet (MAC SDU), and transmits the generated RAT packet by the other RAT2.

Further, the output switching unit 1008 switches between the outputs of data interleaved by the interleavers 1006 and 1007 on the basis of the RAT quality information indicative of the channel qualities of the RAT1 and the RAT2 under the control. In this situation, the interleaved coded data (IL1 output) in which FEC coding (FEC1) is performed on the important packet data becomes the RAT packet (MAC SDU) to the RAT higher in the channel quality (reception quality). For example, if the channel quality of the RAT1 is high, the IL1 output is transmitted from the RAT1.

Thus, in the fifth embodiment, the important packet data can be enhanced in the reception quality even if the IL size is small, by selecting and transmitting the RAT higher in the reception quality. On the other hand, the normal packet data is coded with the inclusion of the important packet data by coding the FEC2. Also, the important packet data is dispersed and included into the normal packet data. As a result, even if the IL size of the interleaving processing IL2 on the normal packet data is substantially identical with that in the conventional example illustrated in FIG. 37, the higher randomizing effect is obtained, thereby enabling the error correction capability to be enhanced.

SIXTH EMBODIMENT

A sixth embodiment is a modified example of the fourth embodiment, which shows a processing example responsive to the transmission delay of the plural RATs. In the sixth embodiment, when it is assumed that a bias of the transmission delay between the plural RATs is larger, the bias of the transmission delay can be absorbed so that the reception characteristic is improved while reducing a comprehensive processing delay.

Figure 12:
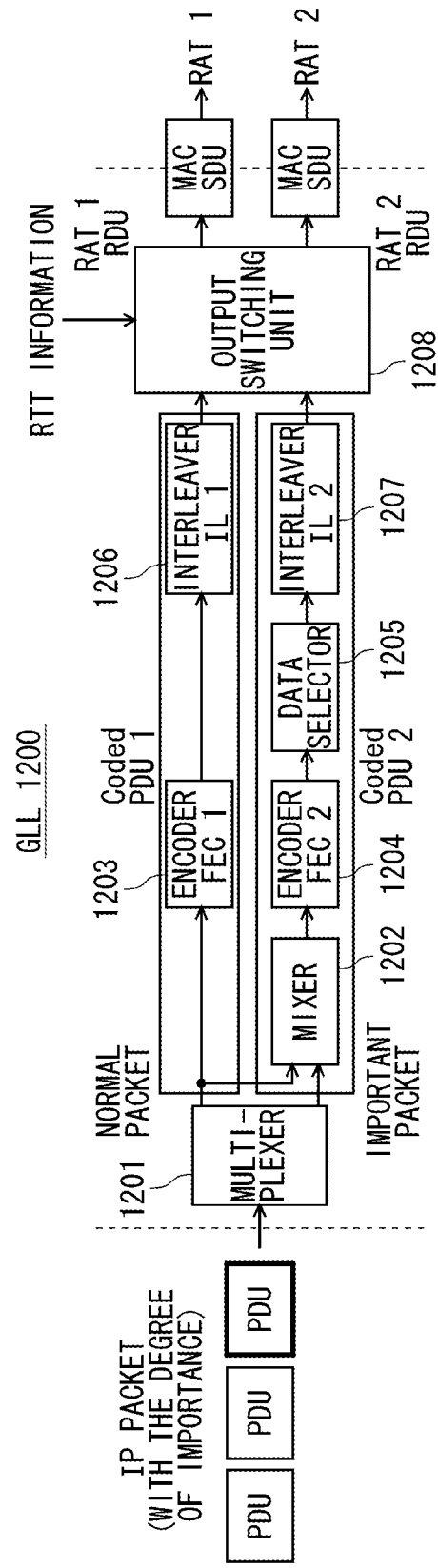
FIG. 12 is a block diagram illustrating a configuration of a wireless communication device according to a sixth embodiment of the present invention.

FIG. 12 is a block diagram illustrating a configuration of a wireless communication device according to a sixth embodiment of the present invention, which illustrates a configuration of a transmitter side when the hierarchical coding is applied to the GLL in the multi-radio. A GLL 1200 includes a multiplexer 1201, a mixer 1202, encoders 1203, 1204, a data selector 1205, interleavers 1206, 1207, and an output switching unit 1208.

Figure 13:
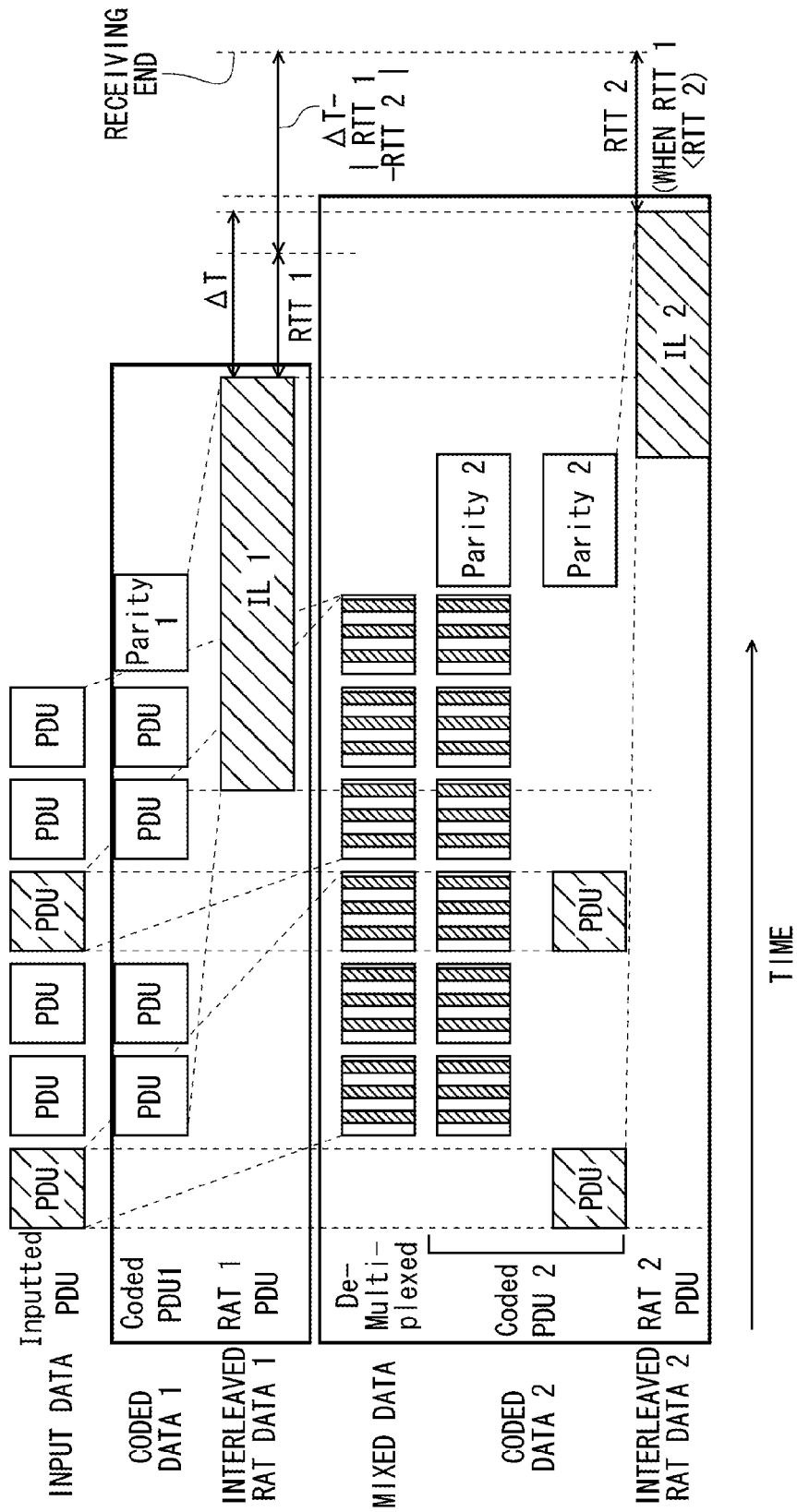
FIG. 13 is a diagram illustrating processing of a GLL according to the sixth embodiment.

FIG. 13 is a diagram illustrating processing of a GLL according to the sixth embodiment. In the transmission processing, the multiplexer 1201 first separates the input data into the normal packet data and the important packet data. In the sixth embodiment, the processing on the normal packet data and the important packet data is identical with the processing of the fourth embodiment. Accordingly, the processing from the multiplexer 1201 to the interleavers 1206, 1207 is identical with that in the fourth embodiment, and a description thereof will be omitted.

The output switching unit 1208 switches between the outputs of data interleaved by the interleavers 1206 and 1207 on the basis of the RTT information (RTT1, RTT2) indicative of the transmission delay of the RAT1 and the RAT2 under the control. In this situation, it is assumed that an input of the RAT packet (MAC SDU) to be transmitted to the RAT smaller in the RTT is the interleaved and coded data (IL2 output) in which FEC coding (FEC2) is performed on the important packet data. For example, if the RTT of the RAT2 is smaller, the IL2 output is transmitted by the RAT2. It is assumed that both the RTTs of the respective RATs fall within an allowable delay range.

Thus, in the sixth embodiment, the important packet data is coded with the inclusion of the normal packet data, and the RAT smaller in the transmission delay is selected and transmitted. As a result, on the receiver side, the transmission delay becomes a delay amount $\Delta T-|RTT1-RTT2|$ that absorbs a packet transmission time difference in the GLL, and a delay (processing delay and transmission delay) in the plural RAT transmission can be reduced.

MODIFIED EXAMPLE OF SIXTH EMBODIMENT

In a modified example of the sixth embodiment, as a result of taking the transmission delay into account, if the RAT packet transmission for one RAT is early terminated, the RAT packets for the remaining RAT can be separated. With this processing, the delay till the GLL reception processing can be further reduced.

SEVENTH EMBODIMENT

A seventh embodiment is still another modified example of the fourth embodiment, which shows a processing example responsive to the channel quality and the transmission delay of the plural RATs. In the seventh embodiment, when it is assumed that the transmission delay between the plural RATs falls within a given value, and the bias of the reception quality between the plural RATs is larger, the reception characteristic is improved while reducing a comprehensive processing delay by using the bias of the reception quality.

Figure 14:
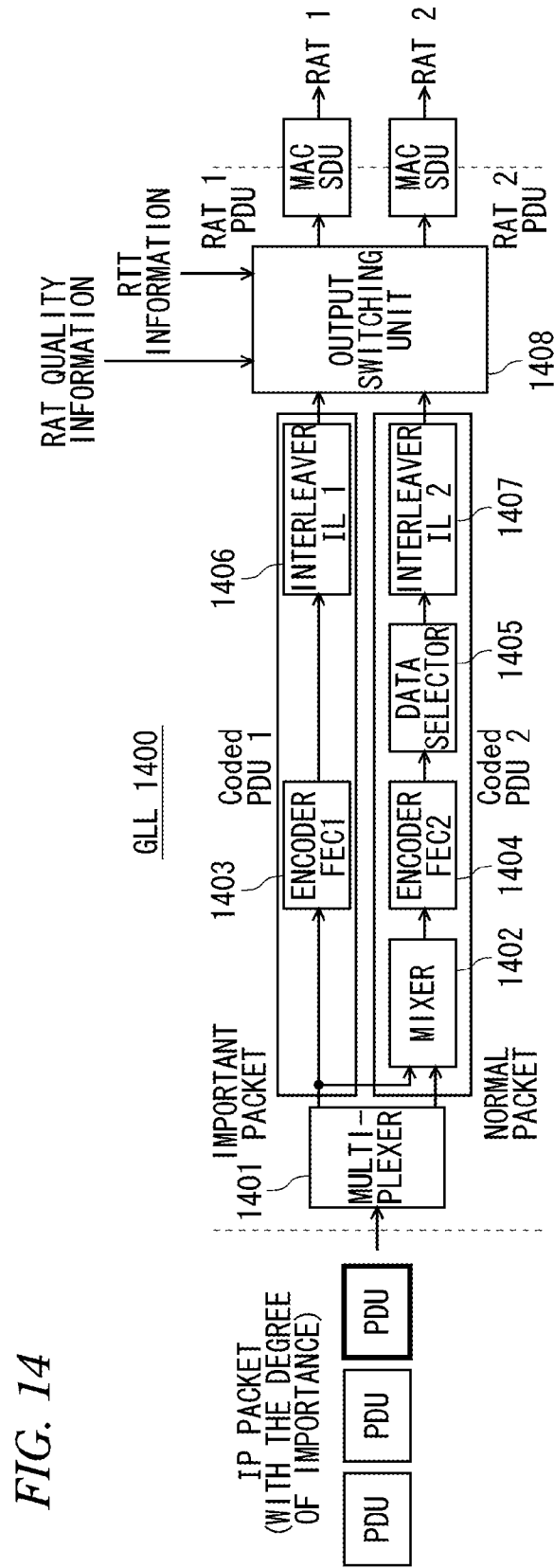
FIG. 14 is a block diagram illustrating a configuration of a wireless communication device according to a seventh embodiment of the present invention.

FIG. 14 is a block diagram illustrating a configuration of a wireless communication device according to a seventh embodiment of the present invention, which illustrates a configuration of a transmitter side when the hierarchical coding is applied to the GLL in the multi-radio. A GLL 1400 includes a multiplexer 1401, a mixer 1402, encoders 1403, 1404, a data selector 1405, interleavers 1406, 1407, and an output switching unit 1408.

Figure 15:
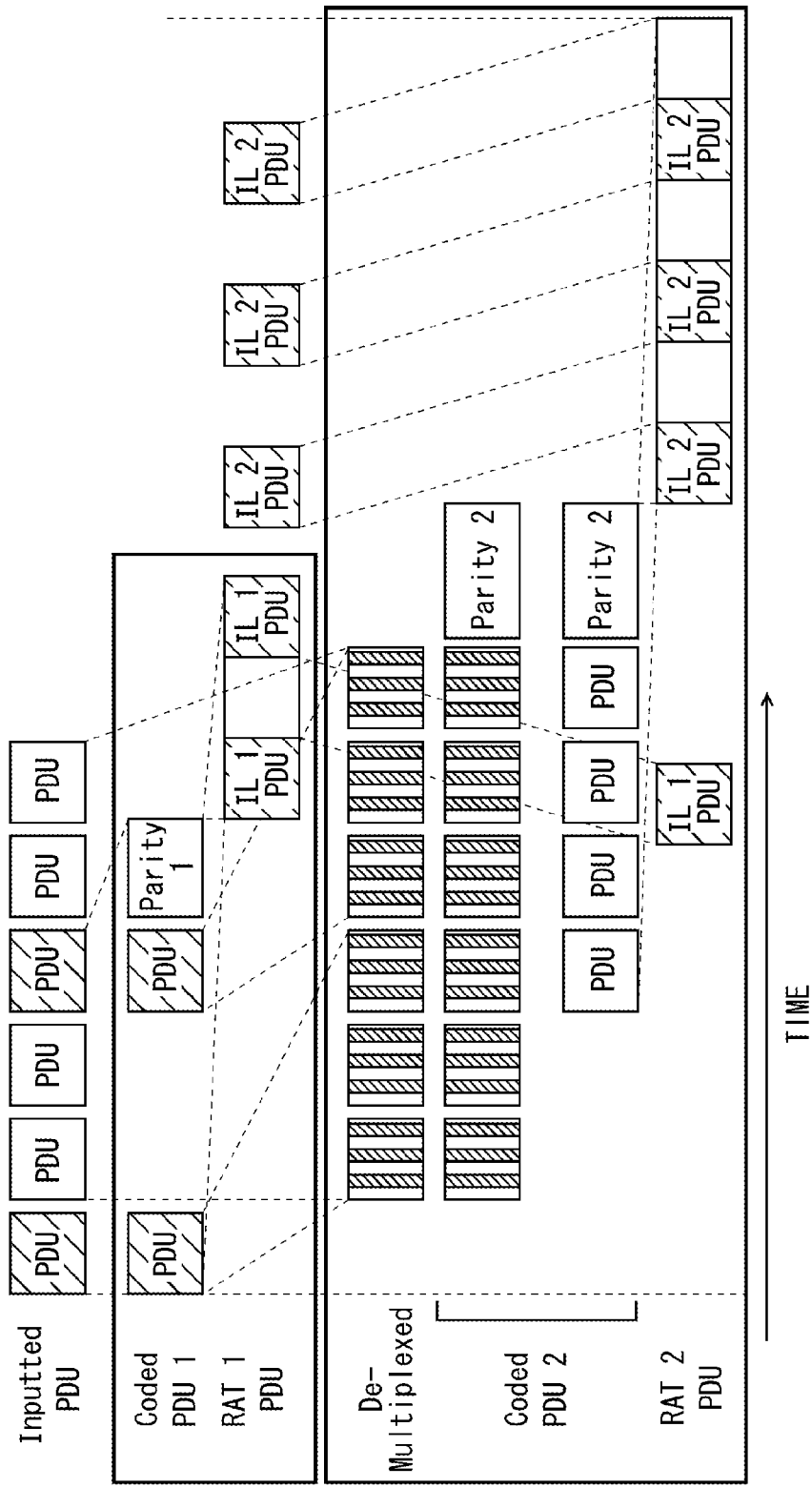
FIG. 15 is a diagram illustrating processing of a GLL according to the seventh embodiment.

FIG. 15 is a diagram illustrating processing of a GLL according to the seventh embodiment. In the transmission processing, the multiplexer 1401 first separates the input data into the normal packet data and the important packet data. In the seventh embodiment, the processing on the normal packet data and the important packet data is identical with the processing of the fifth embodiment. Accordingly, the processing from the multiplexer 1401 to the interleavers 1406, 1407 is identical with that in the fifth embodiment, and a description thereof will be omitted.

The output switching unit 1408 distributes the outputs of data interleaved by the interleavers 1406 and 1407 on the basis of the RAT quality information and the RTT information under the control. In this situation, if the transmission delay difference $\Delta RTT=|RTT1-RTT2|$ between the RAT1 and the RAT2 falls within a given value, the output switching unit 1408 distributes the packet data that has been interleaved (IL1, IL2) according to the channel qualities of the RAT1 and the RAT2 for transmission. In this situation, a larger amount of important packet data is included in the RAT higher in the channel quality.

Thus, in the seventh embodiment, because the packets are dispersed according to the channel qualities of the plural RATs for transmission, the reception quality can be improved by the transmission diversity.

MODIFIED EXAMPLE OF SECOND AND SEVENTH EMBODIMENTS

When the above-mentioned second embodiment is combined with the seventh embodiment, if the transmission delay between the plural RATs (RAT1, RAT2) falls within a given value, the RAT data that has been interleaved (IL1, 1L2) is distributed according to the channel qualities of the RAT1 and the RAT2 for transmission. In this situation, a larger amount of important packet data is included in the RAT higher in the channel quality. With this processing, the reception quality can be improved by the transmission diversity effect.

In the fourth to seventh embodiments, when the important packets and the normal packets are transmitted, the important packets may use a QoS guaranteed RAT, and the normal packet data may use a best effort RAT. For example, the important packet uses a wireless communication system accepting LTE of 3GPP or LTE-Advanced, and the normal packet uses a wireless communication system accepting WiFi (complying with IEEE802.11b, g, n) or WiMAX (complying with IEEE802.16m).

Also, the transmission delay RTT in the respective RATs may include not only the delay in the line, but also a load status (scheduling delay) of the system.

Hereinafter, a description will be given of several examples of more specific configuration and processing of a wireless transmitting device and a wireless receiving device corresponding to the wireless communication device according to the above-mentioned embodiments. The wireless transmitting device corresponds to a constituent element having a transmitting function in the wireless communication device, and the wireless receiving device corresponds to a constituent element having a receiving function in the wireless communication device.

EXAMPLE 1

An example 1 corresponds to the above first embodiment.

<Configuration and Operation of Transmitting Device>

Figure 16:
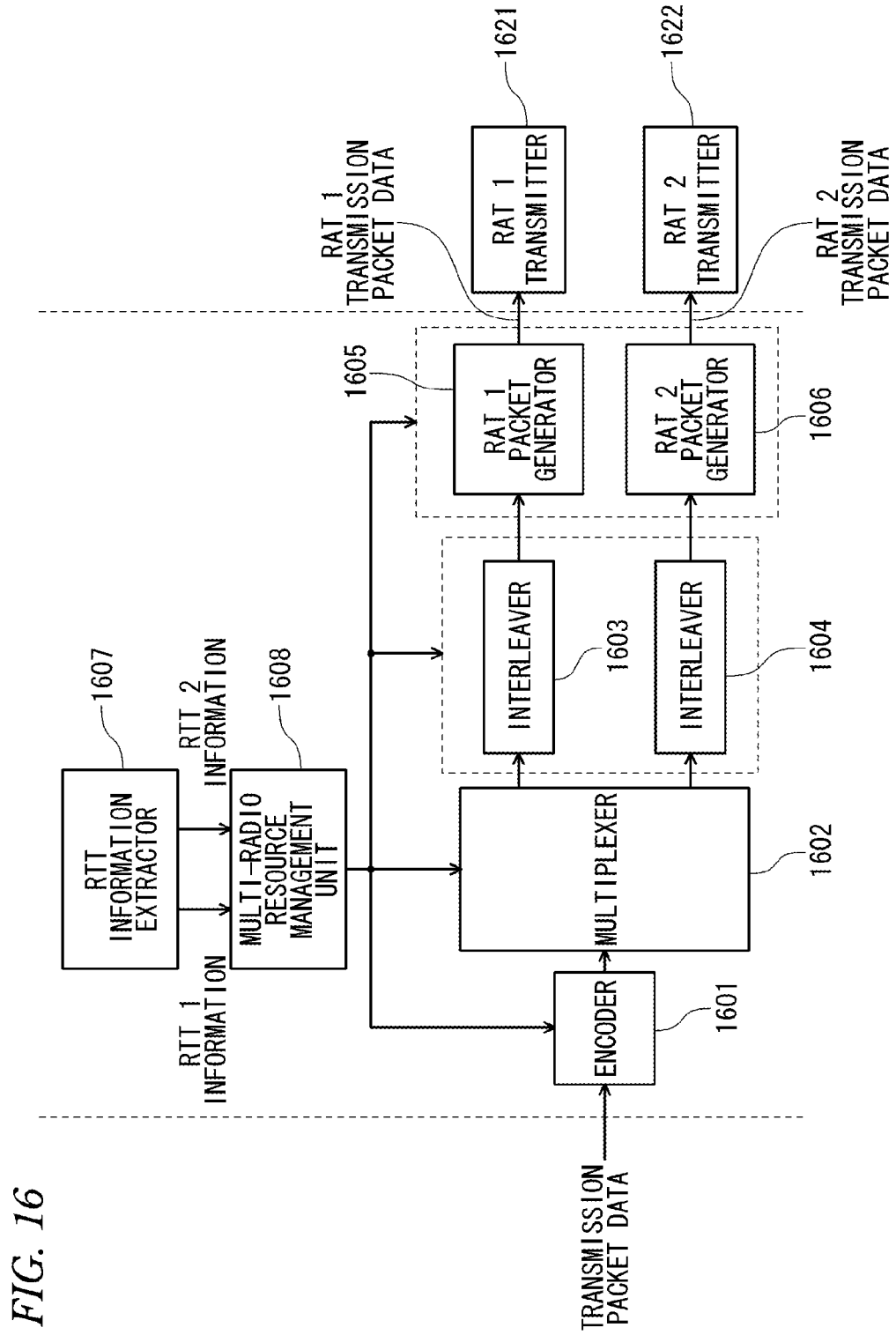
FIG. 16 is a block diagram illustrating a configuration of a wireless transmitting device according to an example 1.

FIG. 16 is a block diagram illustrating a configuration of a wireless transmitting device according to an example 1. The wireless transmitting device includes an encoder 1601, a multiplexer 1602, interleavers 1603, 1604, an RAT1 packet generator 1605, an RAT2 packet generator 1606, an RTT information extractor 1607, and a multi-radio resource management unit 1608. Also, the wireless transmitting device includes an RAT1 transmitter 1621 and an RAT2 transmitter 1622 as transmitters for performing transmitting processing of the MAC layer and the physical layer in each of the plural radio systems RAT1 and RAT2.

The RTT information extractor 1607 extracts the RTT information (RTT1, RTT2) which is the transmission delay information in the plural radio systems RAT1 and RAT2 used by the wireless communication device. The RTT information may be a value specific to the radio system to be used, or statistical information reflecting a load status of the radio system. Also, a value obtained by feeding back the RTT information to the transmitter side for each of the RAT1 and RAT2 to be used may be used. Also, a round trip time may be used as the RTT information.

The multi-radio resource management unit 1608 performs a flow control for gathering the transmission packets for each of the wireless communication devices which are destinations of the transmission packet data on the basis of identification information included in the transmission packet data input from an upper layer. Further, the multi-radio resource management unit 1608 controls an error correction code processing (ECC control) on the transmission packet data that is a common destination, and distributes the data to the multi-radio systems (RAT1, RAT2) (multi-radio resource management). In this example, the multi-radio resource management unit 1608 instructs the encoder 1601 on an information bit length (L_ECC) and a coding rate for ECC coding as the ECC control.

Also, the multi-radio resource management unit 1608 has a function of the resource controller, and sets a ratio α of the IL size according to the transmission delay difference ΔRTT=|RTT1−RTT2| between the RAT1 and the RAT2 on the basis of the RTT information. It is assumed that the IL size of the RAT data to the RAT larger in the RTT is αL (where α<0.5), and the IL size of the RAT data to the RAT smaller in the RTT is (1−α), relative to the coded data size L. The multi-radio resource management unit 1608 transmits control information β to the multiplexer 1602, the interleavers 1603, 1604, the RAT1 packet generator 1605, and the RAT2 packet generator 1606 to instruct those units on a ratio of the IL size between the RATs by using a ratio β in performing normalization by any RAT. For example, when the RAT1 is normalized by 1, the multi-radio resource management unit 1608 instructs those units on the ratio of the RAT2 by β=(1−α)/α if RTT1−RTT2>0, and β=α/(1−α) if RTT1−RTT2<0. In this case, when the IL size is set, the step size of the ratio α is restricted (for example, ⅓, ¼, ⅕, etc.) so as to reduce the amount of information for notice of the IL size information.

Figure 17:
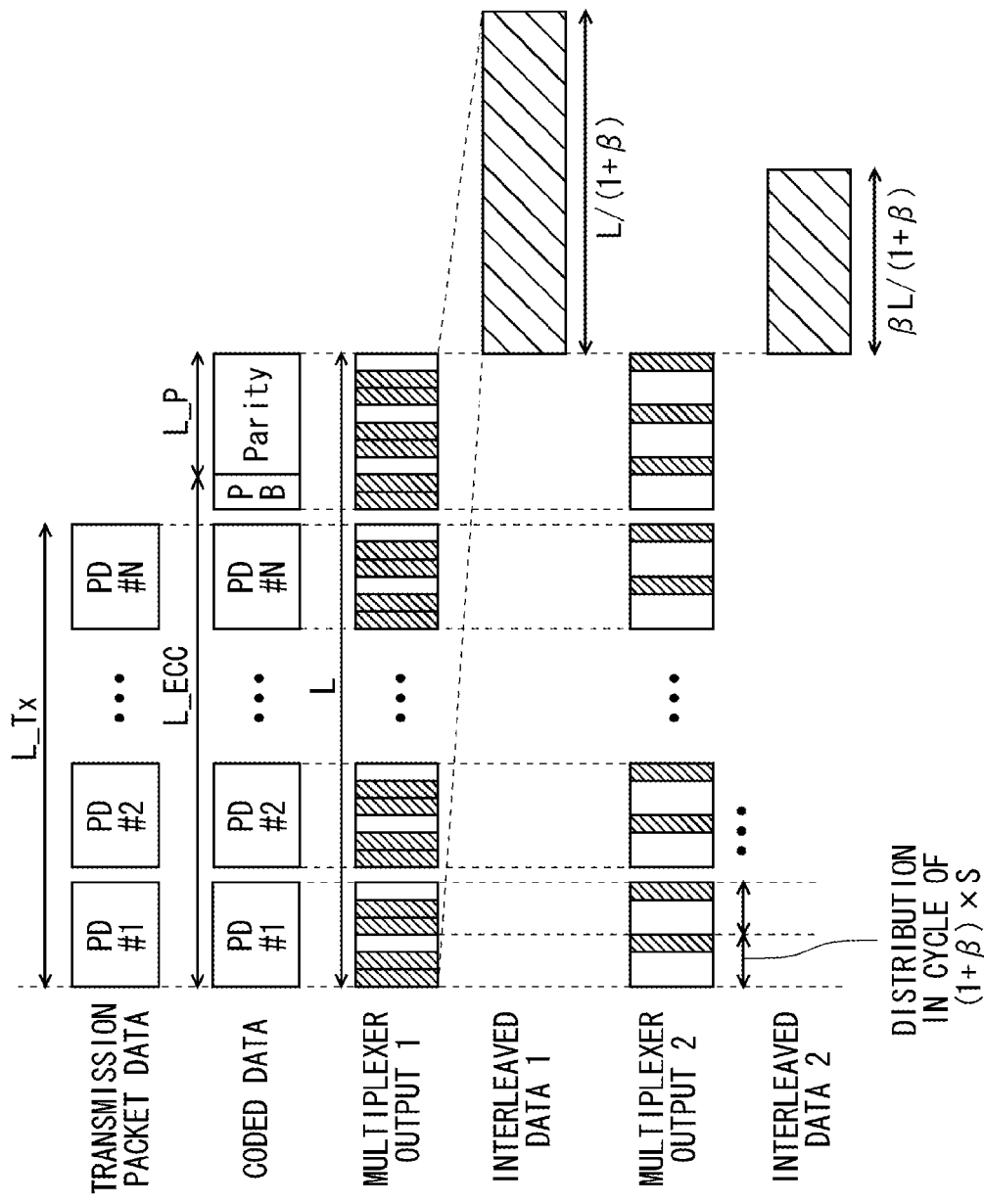
FIG. 17 is a block diagram illustrating processing of the wireless transmitting device according to the example 1.
Figure 18:
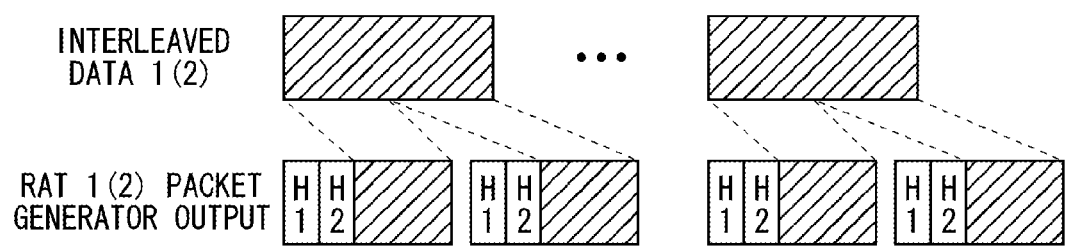
FIG. 18 is a block diagram illustrating the processing of the wireless transmitting device according to the example 1.

FIGS. 17 and 18 are diagrams illustrating processing of the wireless transmitting device according to the example 1, in which FIG. 17 illustrates processing contents since coding till the interleaving processing, and FIG. 18 illustrates the contents of the RAT packet generation processing after interleaving processing.

The encoder 1601 performs error correction code processing on a plurality of N transmission packet data PD#1 to #N (IP packets, etc.) input from the upper layer at a given coding rate, with the information bit length (L_ECC) for which ECC coding is performed designated by the multi-radio resource management unit 1608 as one unit. In this example, it is assumed that N is a maximum integer value in which a total bit size L_Tx of N transmission packet data does not exceed L_ECC. Also, when L_Tx<L_ECC is satisfied, a padding bit PB of a size (L_ECC-L_Tx) is added. Zero padding (zero padding) is used for the padding bit PB. The coded transmission packet data (coded data) includes the redundant bit. As the coding method in the encoder 1601, a systematic code or a non-systematic code can be applied. Hereinafter, a description will be given of an example in which the systematic code is applied. In this case, in the coded data, the transmission packet data is output as the systematic bit as it is, and the parity bit is added and output as the redundant bit. The size L_P of the parity bit depends on the coding rate.

The multiplexer 1602 distributes the coded data according to the IL size of each RAT, on the basis of the control information 13 instructed by the multi-radio resource management unit 1608, to generate multiplexer outputs 1 and 2. In this example, in order to enhance the randomizing effect together with the subsequent interleavers, data is distributed to the RAT1 and the RAT2 in a period of (1+β)×S bits unit. In this example, S is set so that (1+β)×S becomes an integer, and also becomes an aliquot of L.

The interleavers 1603 and 1604 perform interleaving processing with each of distribution data to the RAT1 of the size L/(1+β), and distribution data to the RAT2 of the size βL/(1+β) as one unit, through respective given methods, to generate interleave data 1 and 2.

The RAT1 packet generator 1605 and the RAT2 packet generator 1606 generate the RAT packets for the respective RATs on the basis of the interleave data 1 and the interleave data 2, respectively. The processing of the RAT1 and the RAT2 is identical with each other, and therefore, the RAT1 and the RAT2 will be described below as RAT1 (RAT2) in a lump. The RAT1 (RAT2) packet generator 1605 (1606) separates the interleave data 1 (2) into packets each having a given size smaller than the IL size, and adds header information to the respective separate packets to generate and output the RAT packets. As illustrated in FIG. 18, the header information includes specific header information H1 necessary for transmission in the RAT1 (RAT2). Further, as the decoding processing information, expansion header information H2 necessary for the ECC decoding processing is included in a subsequent different area. As a result, in the RAT1 (RAT2), only the header information H1 is referred to, and the transmission and reception processing can be performed in the respective RATs. Also, in the ECC decoding processing, the expansion header information H2 is extracted from the received packet in each of the RATs, thereby enabling the ECC decoding processing to be performed. The expansion header information H2 is added with identification number (serial number) of the ECC coded data, coded data length L, interleave size information $\beta$, and interleave data position information (allocation of serial numbers in the packer order when interleave data is separated into a plurality of packet data).

The RAT1 transmission packet data and the RAT2 transmission packet data generated by the RAT1 packet generator 1605 and the RAT2 packet generator 1606, respectively, are subjected to the transmission processing by the RAT1 transmitter 1621 and the RAT2 transmitter 1622, respectively. Then, the RAT1 transmission packet data and the RAT2 transmission packet data are transmitted to the wireless communication device that is a destination, by the radio systems RAT1 and the RAT2.

<Configuration and Operation of Receiving Device>

Figure 19:
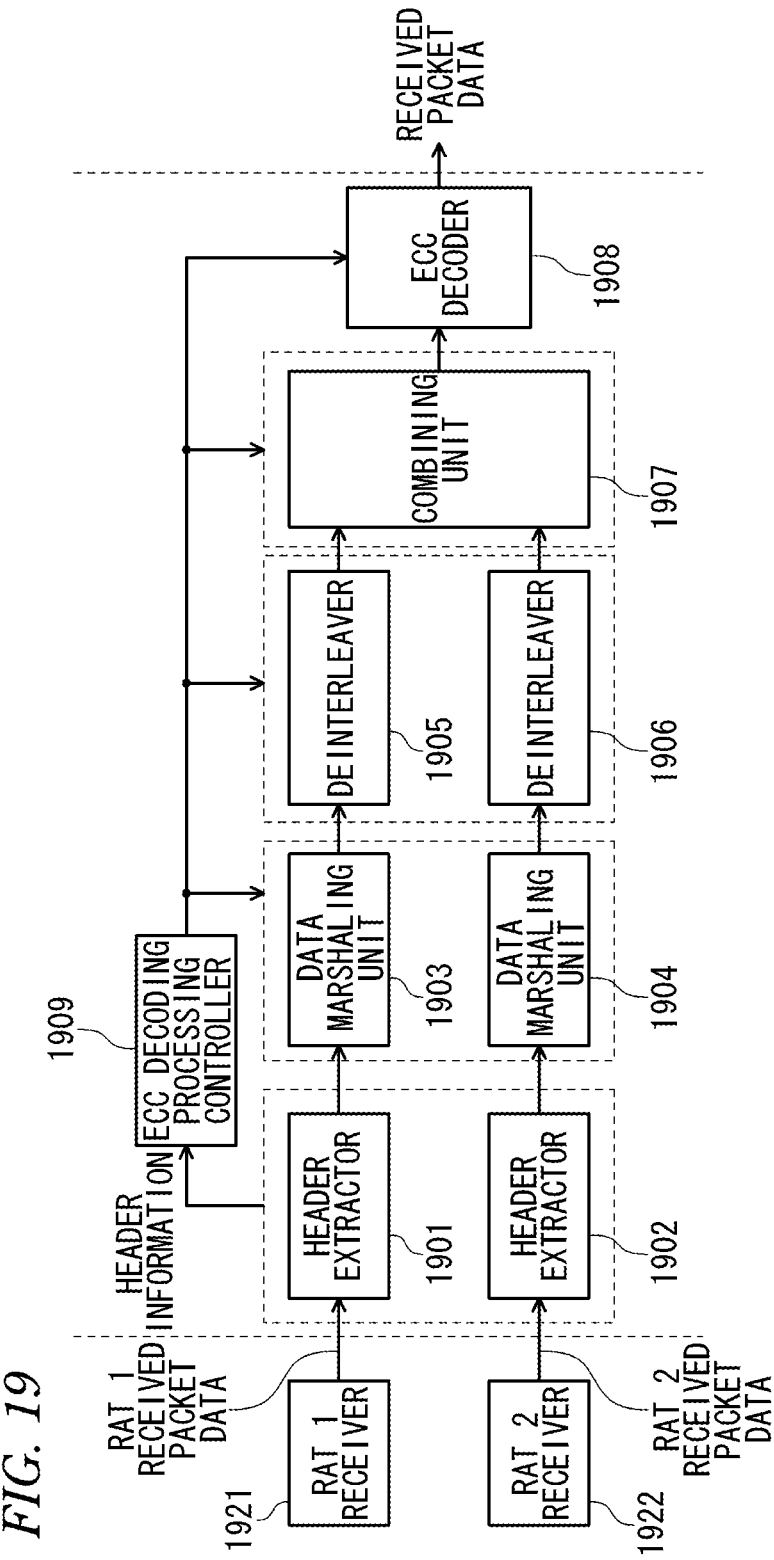
FIG. 19 is a block diagram illustrating a configuration of a wireless receiving device according to the example 1.

FIG. 19 is a block diagram illustrating a configuration of a wireless receiving device according to the example 1. The wireless receiving device includes header extractors 1901, 1902, data marshaling units 1903, 1904, deinterleavers 1905, 1906, a combining unit 1907, an ECC decoder 1908, and an ECC decoding processing controller 1909. Also, the wireless receiving device has an RAT1 receiver 1921 and an RAT2 receiver 1922 as a receiver that performs reception processing on the physical layer and the MAC layer in each of the plural radio systems RAT1 and RAT2. The processing of the RAT1 and the RAT2 is identical with each other, and therefore, the RAT1 and the RAT2 will be described below as RAT1 (RAT2) in a lump. The RAT1 (RAT2) received packet data that has been transmitted from the wireless communication device of a source by the radio systems RAT1 and RAT2, and received by the RAT1 receiver 1921 and the RAT2 receiver 1922, respectively, is input to the header extractors 1901 and 1902. The header extractors 1901 and 1902 each have a function of the decoding processing information extractor, and extract the expansion header information H2 from the RAT1 (RAT2) received packet data. The extracted expansion header information H2 is output to the ECC decoding processing controller 1909, and the data from which the header part has been removed is output to the data marshaling units 1903 and 1904.

The ECC decoding processing controller 1909 has a function of the reception processing controller, and acquires the identification number (serial number) of the ECC coded data, the coded data length L, the interleave size information $\beta$, and the interleave data position information from the acquired expansion header information H2. On the basis of those information, the ECC decoding processing controller 1909 controls the data marshaling units 1903, 1904, the deinterleavers 1905, 1906, the combining unit 1907, and the ECC decoder 1908.

The data marshaling units 1903 and 1904 restore a sequence of data common in the identification number of the ECC coded data among the RAT1 (RAT2) received packet data from which the header has been removed, on the basis of the interleave data position information, to generate data in which the sequence of data is marshaled.

The deinterleavers 1905 and 1906 deinterleave the output data of the data marshaling units 1903 and 1904 with data of a given size based on the interleave size information $\beta$ as one unit, to generate deinterleave data returned from the interleave.

The combining unit 1907 combines the outputs of the deinterleave data of the RAT1 and the RAT2 together by performing the reverse operation of the distributing operation in the multiplexer on the transmitter side on the basis of the coded data length L and the interleave size information $\beta$, to restore the coded data. In this example, when the packet data is lost due to a packet error in the RAT, or when there is an error in the packet data, a loss flag is set for data of such a packet, and the packet data is output to the ECC decoder 1908 with the coded data as an indefinite value.

The ECC decoder 1908 performs the decoding processing based on the loss correction, on the basis of data of the coded data length L and the loss flag, and outputs the decoded data as received packet data. The combining unit 1907 and the ECC decoder 1908 realize functions of the coupling and decoding processing units. In this example, the ECC by the loss correction is an error correction method in which a position of an error is allocated by the loss flag in advance so that a larger amount of data than that in the normal FEC can be corrected. This is caused by a fact that the normal FEC needs to obtain the position and size of the error whereas the loss correction has only to obtain the size of the error.

Thus, according to the example 1, the IL size of the RAT larger in the transmission delay is reduced. As a result, the processing delay until the transmission data is restored by the ECC decoding on the receiver side using the plural radio systems can be reduced while obtaining the same randomizing effect as that in the related art.

MODIFIED EXAMPLE OF EXAMPLE 1

In the above example 1, the packet data obtained after the interleaving processing is transmitted by the individual RATs. On the other hand, in a modified example of the example 1, in the RAT(k) packet generator, upon completion of the data transmission in one RAT, the packet data may be transmitted in the other RAT. RAT(k) indicates k-th RAT (k is an arbitrary integer), and is RAT1 or RAT2 in the above example. In this case, the identification information on the interleaver (identifier indicating which of plural interleavers outputs the packet) is added to the expansion header information H2 added by the RAT(k) packet generator. On the receiver side, the header extractors 1901 and 1902 further extract the identification information on the interleaver, the ECC decoding processing controller 1909 adds the following operation in the data marshaling units 1903 and 1904. That is, data is separated for each of the identification information on the interleavers. Thereafter, the header extractors 1901 and 1902 restore a sequence of data common in the identification number of the ECC coded data among the RAT received packet data from which the header has been removed, on the basis of the interleave data position information.

With the above-mentioned operation, the processing delay caused by the ECC coding can be reduced. That is effective particularly when a difference of the RTT between the RATs is small.

EXAMPLE 2

An example 2 corresponds to the above second embodiment.

<Configuration and Operation of Transmitting Device>

The configuration of the wireless communication device is identical with that of the example 1 illustrated in FIG. 16. The example 2 is different from the example 1 in the operation of the multi-radio resource management unit 1608 and the operation of the multiplexer 1602. Hereinafter, a description will be mainly given of the operation of the multi-radio resource management unit 1608 and the multiplexer 1602, which is different from that in the example 1.

The multi-radio resource management unit 1608 performs a flow control for marshaling the transmission packets for each of the wireless communication devices which are destinations of the transmission packet data, on the basis of the identification information included in the transmission packet data input from the upper layer. Further, the multi-radio resource management unit 1608 controls the error correction code processing (ECC control) on the transmission packet data having a common destination, and distributes (multi-radio resource management) the data to the multi-radio systems (RAT1, RAT2). In this example, the multi-radio resource management unit 1608 instructs the encoder 1601 on the information bit length (L_ECC) and the coding rate for ECC coding as the ECC control.

The multi-radio resource management unit 1608 sets the ratio of the IL size according to the transmission delay difference $\Delta$RTT between the RAT1 and the RAT2, on the basis of the RTT information. In this example, unlike the example 1, the multi-radio resource management unit 1608 defines 1) specific data that can be decoded in all of the packets by the single RAT; or 2) the amount of data $\gamma$ that can be decoded in all of the packets by the single RAT. The multi-radio resource management unit 1608 variably sets the distribution ratio $\alpha$ (indicative of the data redundancy in this example) according to the transmission delay difference $\Delta$RTT, for the data size to be distributed to the RAT1 and the RAT2 in a data portion other than the specific data or the amount of data which are defined in the above among the coded data.

As an example of the above 1) (setting example 1 of IL size), there is a method in which a systematic bit in the coded data is set as specific data y, and the data redundancy $\alpha$ is set as a coefficient for distributing a parity bit [L_P=(L-L_ECC) bits] in the mother code rate of the encoder having the coded data size [L bits].

As an example of the above 2) (setting example 2 of IL size), there is a method in which the amount of data $\gamma$ in the single RAT is defined at the coding rate R_RAT where the error correction is enabled by the ECC decoding even if an error occurs in the RAT(k), taking a mean packet error rate at the respective RATs into account. RAT(k) represents k-th RAT (k is an arbitrary integer), and is RAT1 or RAT2 in the above example.

Hereinafter, a description will be given in detail of the respective operation in the setting examples 1 and 2 of the IL size.

Figure 20:
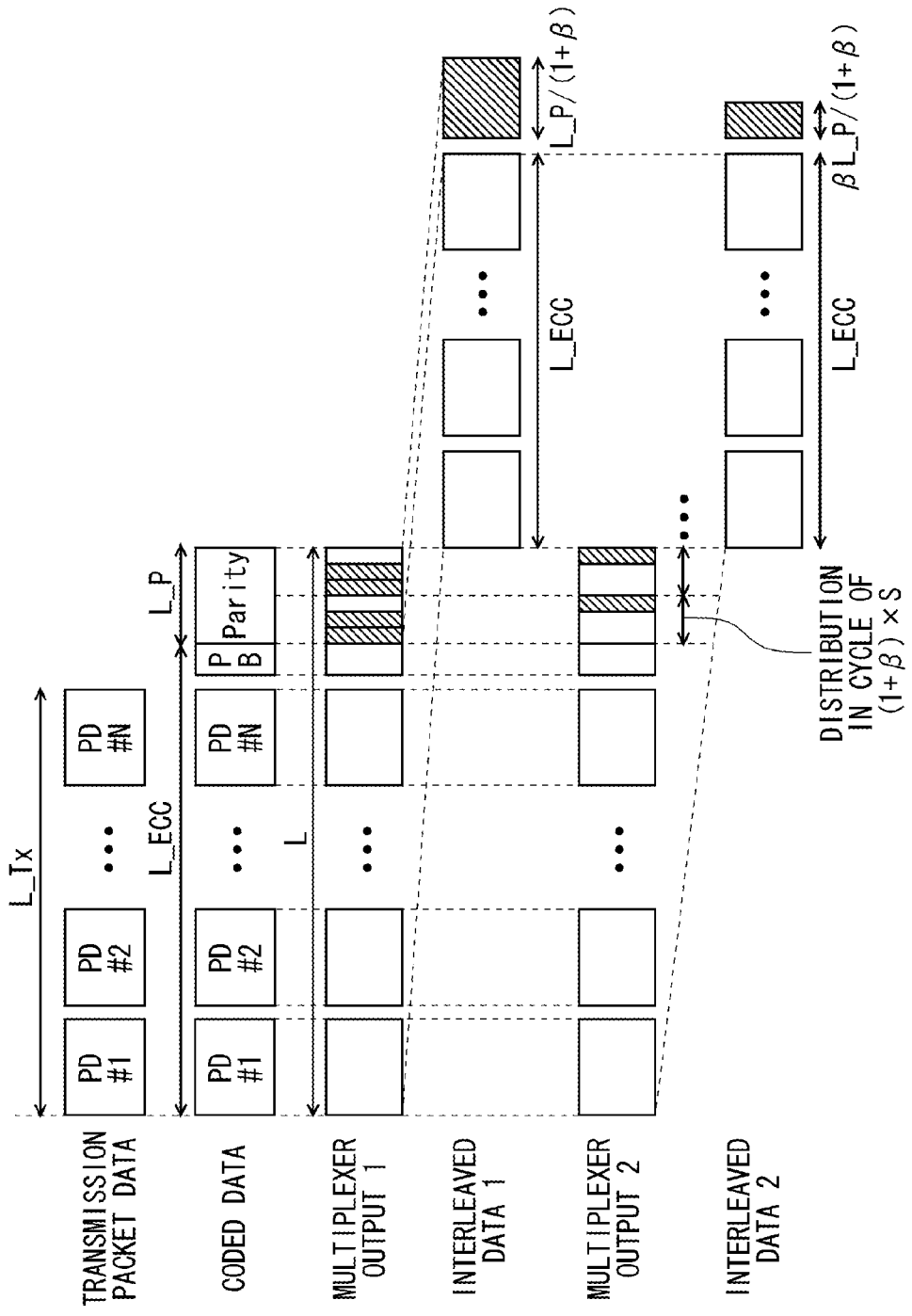
FIG. 20 is a diagram illustrating processing of a wireless transmitting device according to a first operation example of an example 2.

FIG. 20 is a diagram illustrating processing of a wireless transmitting device according to a first operation example (corresponding to the setting example 1 of the IL size) of the example 2. In the setting example 1 of the IL size, the data that can be decoded in all of the packets by the single RAT is set to a systematic bit in the coded data, and the distribution ratio can be varied according to the transmission delay difference $\Delta$RTT, for the data size to be distributed to the respective RATs in a portion of the parity bit which is a data portion other than the systematic bit.

The multi-radio resource management unit 1608 sets the IL size of the RAT data to the RAT larger in the RTT as L_ECC+ $\alpha$L_P (where $\alpha$<0.5), and sets the IL size of the RAT data to the RAT smaller in the RTT as L_ECC+(1-$\alpha$)L_P, relative to the information bit length (L_ECC) for which ECC coding is performed and the parity bit size L_P to be added after coding. The ratio of the IL size between the RATs is instructed by transmitting the control information to the multiplexer 1602, the interleavers 1603, 1604, the RAT1 packet generator 1605, and the RAT2 packet generator 1606 by using the ratio in performing normalization by any RAT. For example, when the RAT1 is normalized by 1, the ratio of the RAT2 is instructed by $\beta=(1-\alpha)/\alpha$ if RTT1-RTT2>0, and $\beta=\alpha/(1-\alpha)$ if RTT1-RTT2<0. In this case, when the IL size is set, the step size of the ratio $\alpha$ is restricted (for example, $\frac{1}{3}$, $\frac{1}{4}$, $\frac{1}{5}$, etc.) so as to reduce the amount of information for notice of the IL size information.

Figure 21:
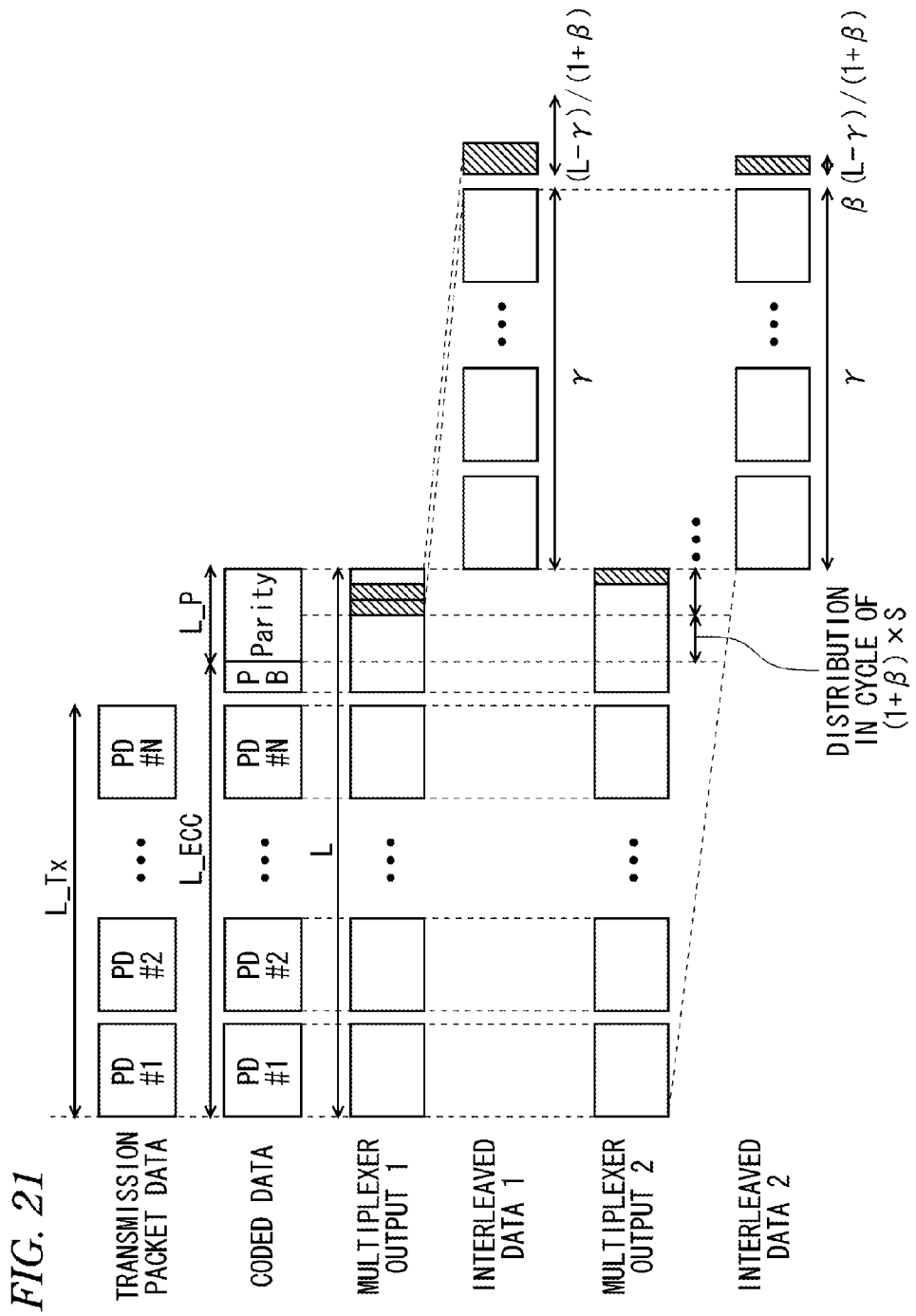
FIG. 21 is a diagram illustrating processing of a wireless transmitting device according to a second operation example of the example 2.

FIG. 21 is a diagram illustrating processing of a wireless transmitting device according to a second operation example (corresponding to the setting example 2 of the IL size) of the example 2. In the setting example 2 of the IL size, the amount of data $\gamma$ in the single RAT is defined at the coding rate where the error correction is enabled by the ECC decoding even if an error occurs in the RAT, taking a mean packet error rate at the RATs into account. The distribution ratio can be varied according to the transmission delay difference $\Delta$RTT, for the data size to be distributed to the respective RATs in a portion of the parity bit of the other data portion.

The multi-radio resource management unit 1608 sets the IL size of the RAT data to the RAT larger in the RTT as $\gamma+\alpha(L-\gamma)$ (where $\alpha$<0.5), and sets the IL size of the RAT data to the RAT smaller in the RTT as $\gamma+(1-\alpha)(L-\gamma)$, relative to the information bit length (L_ECC) for which ECC coding is performed and the parity bit size L_P to be added after coding. The ratio of a portion exceeding the $\gamma$ in the bit ratios of the IL size between the RATs is instructed by transmitting the control information to the multiplexer 1602, the interleavers 1603, 1604, the RAT1 packet generator 1605, and the RAT2 packet generator 1606 by using the ratio $\beta$ in performing normalization by any RAT. For example, when the RAT1 is normalized by 1, the ratio of the RAT2 is instructed by $\beta=(1-\alpha)/\alpha$ if RTT1-RTT2>0, and $\beta=\alpha/(1-\alpha)$ if RTT1-RTT2<0. In this case, when the IL size is set, the step size of the ratio $\alpha$ is restricted (for example, $\frac{1}{3}$, $\frac{1}{4}$, $\frac{1}{5}$, etc.) so as to reduce the amount of information for notice of the IL size information. In both of the first operation example and the second operation example, the transmission packet size of RAT1+RAT2 combining the RAT1 and the RAT2 together is larger than the coded data size L. The multiplexer 1602 distributes the coded data according to the IL size for each of the RATs on the basis of the control information $\beta$ and the distribution ratio information which are instructed by the multi-radio resource management unit 1608 to generate the multiplexer outputs 1 and 2. As the distribution ratio information, L_ECC is used in the first operation example, and $\gamma$ is used in the second operation example. Also, in order to enhance the randomizing effect together with the subsequent interleavers, the distribution data to the RAT1 and the RAT2 is performed in a cycle of (1+$\beta$)×S bits basis. In this example, S is set so that (1+$\beta$)×S becomes an integer, and also becomes an aliquot of L_P (first operation example) or (L−γ) (second operation example).

In the first operation example, the interleavers 1603 and 1604 perform interleaving processing with each of distribution data to the RAT1 of the size L_ECC+L_ECC/(1+β), and distribution data to the RAT2 of the size L_ECC+βL_ECC/(1+β) as one unit, through respective given methods, to generate the interleave data 1 and 2. Likewise, in the second operation example, the interleavers 1603 and 1604 perform interleaving processing with each of distribution data to the RAT1 of the size γ+(L−γ)/(1+β), and distribution data to the RAT2 of the size γ+(L−γ)/(1+β) as one unit.

The RAT1 packet generator 1605 and the RAT2 packet generator 1606 divide the interleave data 1 and the interleave data 2 into packets each having a given size smaller than the IL size, respectively, and add header information to the respective separate packets to generate the RAT packets for the respective RATs. The header information is added with β in which the ratio α of the IL size is normalized as well as L_ECC (first operation example) or γ (second operation example), as the interleave size information which is included in the expansion header information H2.

The RAT1 transmission packet data and the RAT2 transmission packet data generated by the RAT1 packet generator 1605 and the RAT2 packet generator 1606, respectively, are subjected to the transmission processing by the RAT1 transmitter 1621 and the RAT2 transmitter 1622, respectively. Then, the RAT1 transmission packet data and the RAT2 transmission packet data are transmitted to the wireless communication device that is a destination, by the radio systems RAT1 and the RAT2.

<Configuration and Operation of Receiving Device>

The configuration of the wireless communication device is identical with that in the example 1 illustrated in FIG. 19. The processing of the RAT1 and the RAT2 is identical with each other, and therefore, the RAT1 and the RAT2 will be described below as RAT1 (RAT2) in a lump.

The header extractors 1901 and 1902 each extract the expansion header information H2 from the RAT1 (RAT2) received packet data that has been subjected to reception processing by the RAT1 receiver 1921 and the RAT2 receiver 1922, respectively. The extracted expansion header information H2 is output to the ECC decoding processing controller 1909, and the data from which the header part has been removed is output to the data marshaling units 1903 and 1904.

The ECC decoding processing controller 1909 acquires the identification number (serial number) of the ECC coded data, the coded data length L, the interleave size information β, L_ECC (first operation example) or γ (second operation example), and the interleave data position information from the acquired expansion header information H2. On the basis of those information, the ECC decoding processing controller 1909 controls the data marshaling units 1903, 1904, the deinterleavers 1905, 1906, the combining unit 1907, and the ECC decoder 1908.

The data marshaling units 1903 and 1904 restore a sequence of data common in the identification number of the ECC coded data among the RAT1 (RAT2) received packet data from which the header has been removed, on the basis of the interleave data position information, to generate data in which the sequence of data is marshaled.

The deinterleavers 1905 and 1906 deinterleave the output data of the data marshaling units 1903 and 1904 with data of a given size based on the interleave size information β as one unit, to generate deinterleave data returned from the interleave.

The combining unit 1907 combines the outputs of the deinterleave data of the RAT1 and the RAT2 together by performing the reverse operation of the distributing operation in the multiplexer on the transmitter side on the basis of the coded data length L, the interleave size information β, and L_ECC (first operation example) or γ (second operation example), to restore the coded data. In this example, when the packet data is lost due to a packet error in the RAT, or when there is an error in the packet data, a loss flag is set for data of such a packet, and the packet data is output to the ECC decoder 1908 with the coded data as an indefinite value. Also, when there is only the received data from some RATs among the plurality of RATs, the data part of the RAT that has not obtained the received data is set with a flag (mark) of the loss data, and output to the ECC decoder 1908.

The ECC decoder 1908 performs the decoding processing based on the loss correction, on the basis of data of the coded data length L and the loss flag, and outputs the decoded data as received packet data.

In the example 1, there is a need to start the ECC decoding processing after receiving all of the data from the plurality of RATs. On the other hand, according to the example 2, the ECC decoding processing can start by using only the data from the single RAT. Hence, the ECC coding gain can be enhanced, and the means transmission delay can be reduced. Also, since the IL size between the RATs is so determined as to absorb the transmission path delay difference, a delay (transmission delay+processing delay) on the receiver side can be reduced.

EXAMPLE 3

An example 3 corresponds to the third embodiment.

<Configuration and Operation of Transmitting Device>

Figure 22:
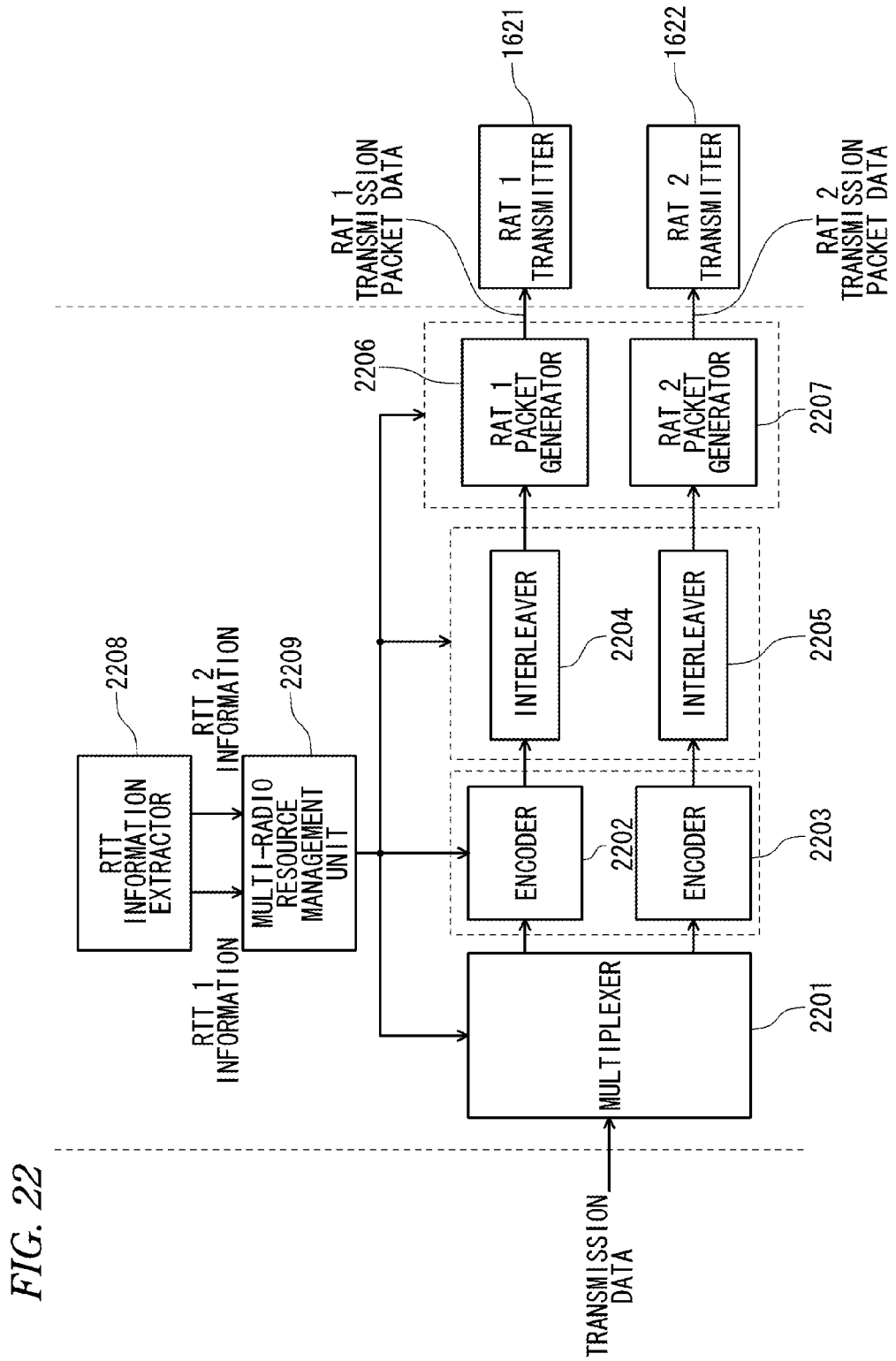
FIG. 22 is a block diagram illustrating a configuration of a wireless transmitting device according to an example 3.

FIG. 22 is a block diagram illustrating a configuration of a wireless transmitting device according to the example 3. The example 3 is different from the configuration of the example 1 in that the transmission packet data input from the upper layer is distributed into a plurality of RAT data by the multiplexer, and thereafter the ECC coding processing and the interleaving processing are performed for each of the RAT data. Hereinafter, a description will be mainly given of the configuration and the operation of portions different from those in the example 1.

The wireless communication device includes a multiplexer 2201, encoders 2202, 2203, interleavers 2204, 2205, an RAT1 packet generator 2206, an RAT2 packet generator 2207, an RTT information extractor 2208, and a multi-radio resource management unit 2209.

The multi-radio resource management unit 2209 performs a flow control for marshaling the transmission packets for each of the wireless communication devices which are destinations of the transmission packet data, on the basis of the identification information included in the transmission packet data input from the upper layer. Further, the multi-radio resource management unit 2209 controls the error correction code processing (ECC control) on the transmission packet data having a common destination, and distributes (multi-radio resource management) the data to the multi-radio systems (RAT1, RAT2). In this example, under the ECC control, the multi-radio resource management unit 2209 first sets a ratio of the RAT data to be distributed by the multiplexer 2201 on the basis of the transmission delay difference ΔRTT between the RAT1 and the RAT2, and gives an instruction on the set ratio. Further, the multi-radio resource management unit 2209 instructs the encoders 2202, 2203 on the information bit length (L_ECC(k)) and a coding rate (R_RAT(k)) for ECC encoding to the k-th RAT(k). Still further, the multi-radio resource management unit 2209 instructs the interleavers 2204 and 2205 on the IL size of the coded data.

In the respective RAT data, if the ratio of the RAT data is α, the multi-radio resource management unit 2209 sets the size of the RAT data to be distributed to the RAT larger in the RTT as αL_Tx (where α<0.5), and sets the size of the RAT data to be distributed to the RAT smaller in the RTT as (1−α)L_Tx, relative to the data size L_Tx of the transmission packet data. An instruction on the data size to be distributed to the RATs is given to the multiplexer 2201, the encoders 2202, 2203, the interleavers 2204, 2205, the RAT1 packet generator 2206, and the RAT2 packet generator 2207 of by using the ratio β in performing normalization by any RAT. For example, when the RAT1 is normalized by 1, the ratio of the RAT2 is instructed by β=(1−α)/α if RTT1−RTT2>0, and β=α/(1−α) if RTT1−RTT2<0. The ratio of the IL size is identical with the distribution ratio of the RAT data. In this case, when the RAT data is set, the step size of the ratio α is restricted (for example, ⅓, ¼, ⅕, etc.) so as to reduce the amount of information for notice of the IL size information.

Figure 23:
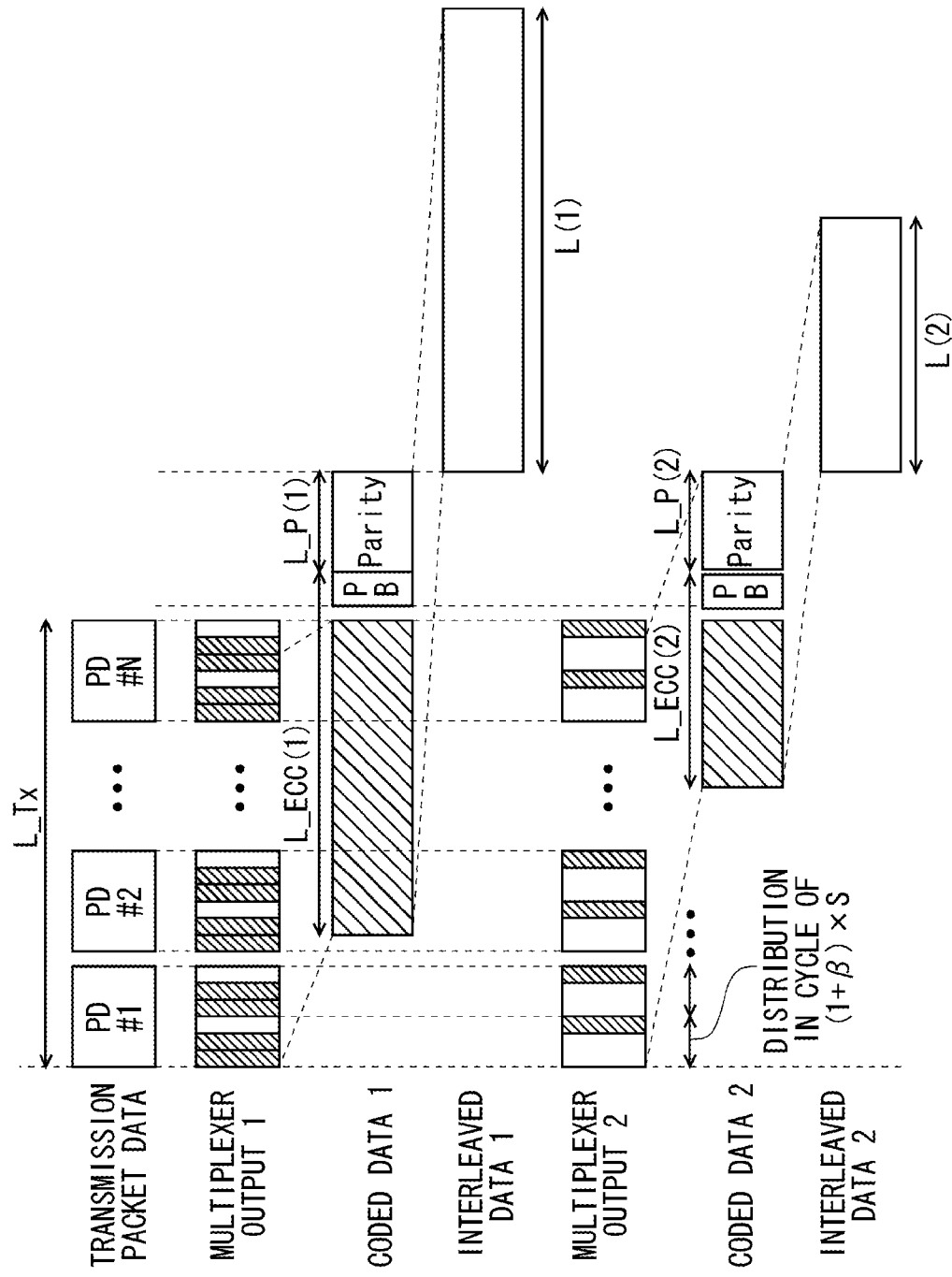
FIG. 23 is a diagram illustrating processing of the wireless transmitting device according to the example 3.

FIG. 23 is a diagram illustrating processing of the wireless transmitting device according to the example 3. The multiplexer 2201 distributes the transmission packet data according to the ratio of the data sizes between the RATs for each of the RATs on the basis of the control information β which is instructed by the multi-radio resource management unit 2209 to generate the multiplexer outputs 1 and 2. In this example, the distribution data to the RAT1 and the RAT2 is performed in a cycle of (1+β)×S bits basis. In this example, S is set so that (1+β)×S becomes an integer, and also becomes an aliquot of L_Tx. Alternatively, the multiplexer 2201 may distribute the transmission packet data to the RAT1 and the RAT2 on the transmission packet basis.

The encoders 2202 and 2203 perform the error correction code processing at a given coding rate R_RAT(k) on the RAT(k) data into which plural N transmission packet data PD#1 to #N (IP packets, etc.) input from the upper layer are distributed by the multiplexer 2201, with the information bit length (L_ECC(k)) for which ECC coding is performed, which is designated by the multi-radio resource management unit 2209, as one unit. In this example, it is assumed that N is a maximum integer value in which a total bit size (L_Tx/(1+β) in the RAT1, and βL/(1+β) in the RAT2) of the RAT data of the transmission packets distributed by the multiplexer 2201 does not exceed L_ECC(k). Also, when L_ECC(k) is not satisfied, a padding bit PB is added. Zero padding (zero padding) is used for the padding bit PB. The coded transmission packet data (coded data) includes the parity bit as the redundant bit, and a size L_P(k) thereof depends on the coding rate. Also, the coding rate R_RAT(k) is identical between the RATs, or set individually for each of the RATs, on the basis of the packet error rate or the a target error rate in the RAT(k), so that error-free operation or a given error rate can be achieved.

The interleavers 2204 and 2205 perform interleaving processing of the IL size L(k) with L_ECC(k)+L_P(k) as a unit, on the output data of the encoders 2202 and 2203, on the basis of L_ECC(k) and L_P(k) designated by the multi-radio resource management unit 2209, for the distribution data to the RAT(k). In this example, the interleavers 2204 and 2205 perform the interleaving processing with each of the distribution data to the RAT1 of the size L/(1+β), and distribution data to the RAT2 of the size βL/(1+β) as one unit, through respective given methods, to generate the interleave data 1 and 2.

The RAT1 packet generator 2206 and the RAT2 packet generator 2207 divide the interleave data 1 and the interleave data 2 into packets each having a given size smaller than the IL size, respectively, and add header information to the respective separate packets to generate the RAT packets for the respective RAT(k). The header information is added, as the expansion header information H2, with identification number (serial number) of the ECC coded data, coded data length L(k), distribution ratio information β in multiplexing, and interleave data position information (allocation of serial numbers in the packer order when interleave data is separated into a plurality of packet data).

The respective RAT(k) transmission packet data generated by the RAT1 packet generator 1605 and the RAT2 packet generator 1606 is subjected to the transmission processing by the RAT1 transmitter 1621 and the RAT2 transmitter 1622. Then, the RAT(k) transmission packet data is transmitted to the wireless communication device that is a destination, by the radio systems RAT1 and the RAT2.

<Configuration and Operation of Receiving Device>

Figure 24:
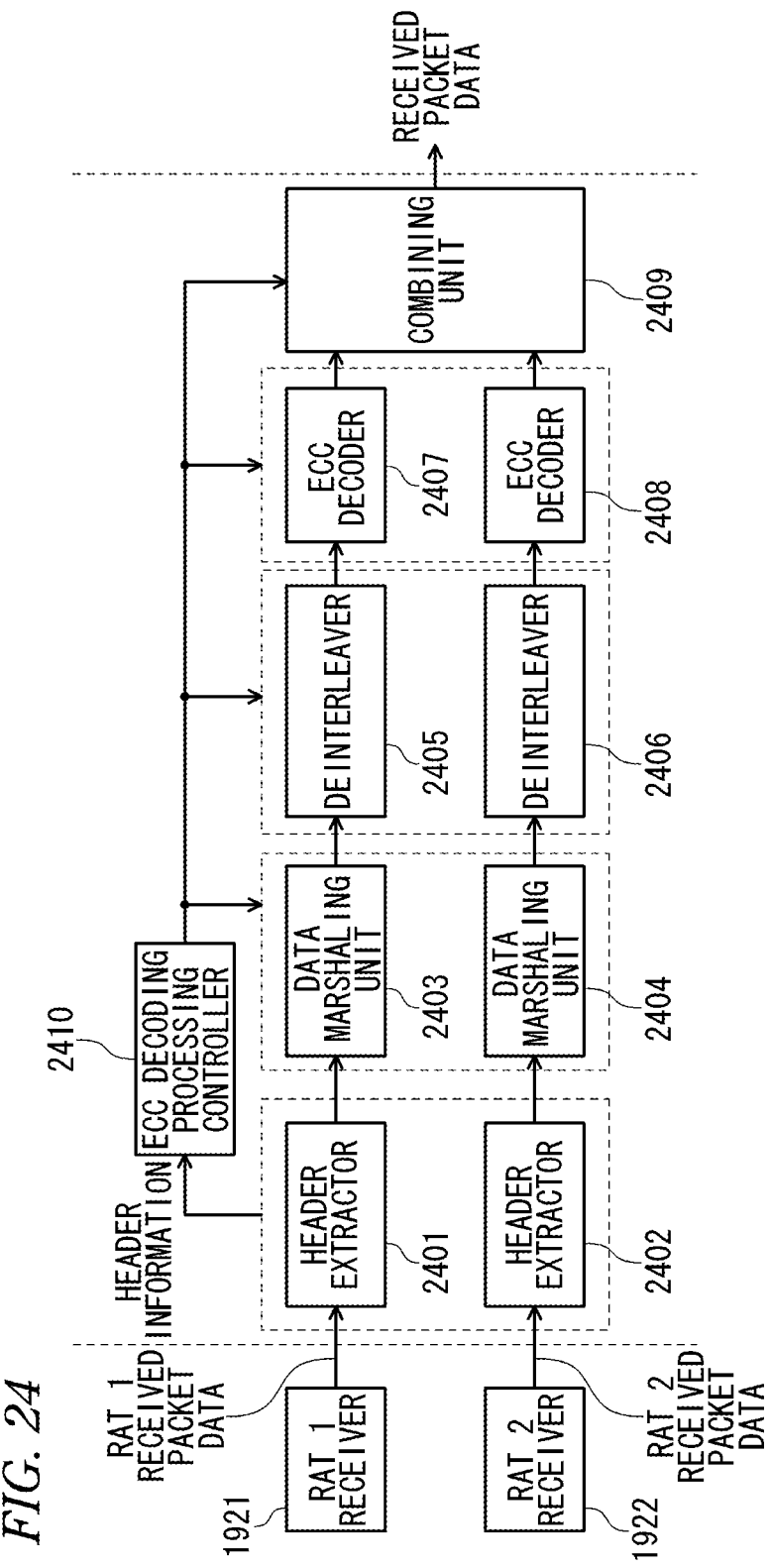
FIG. 24 is a block diagram illustrating a configuration of a wireless receiving device according to the example 3.

FIG. 24 is a block diagram illustrating a configuration of a wireless receiving device according to the example 3. The wireless communication device includes header extractors 2401, 2402, data marshaling units 2403, 2404, deinterleavers 2405, 2406, ECC decoders 2407, 2408, a combining unit 2409, and an ECC decoding processing controller 2410. Also, the wireless receiving device has an RAT1 receiver 1921 and an RAT2 receiver 1922 that perform reception processing on the physical layer and the MAC layer in each of the plural radio systems RAT1 and RAT2. The processing of the RAT1 and the RAT2 is identical with each other, and therefore, the RAT1 and the RAT2 will be described below as RAT1 (RAT2) in a lump. The header extractors 2401 and 2402 extract the expansion header information H2 from the RAT1 (RAT2) received packet data received by the RAT1 receiver 1921 and the RAT2 receiver 1922, respectively. The extracted expansion header information H2 is output to the ECC decoding processing controller 2410, and the data from which the header part has been removed is output to the data marshaling units 2403 and 2404.

The ECC decoding processing controller 2410 acquires the identification number (serial number) of the ECC coded data, the coded data length L(k), the distribution ratio information in multiplexing, and the interleave data position information from the acquired expansion header information H2. On the basis of those information, the ECC decoding processing controller 2410 controls the data marshaling units 2403, 2404, the deinterleavers 2405, 2406, the deinterleavers 2405, 2406, the ECC decoders 2407, 2408, and the combining unit 2409.

The data marshaling units 2403 and 2404 restore a sequence of data common in the identification number of the ECC coded data among the RAT1 (RAT2) received packet data from which the header has been removed, on the basis of the interleave data position information, to generate data in which the sequence of data is marshaled. In this example, when the packet data is lost due to a packet error in the RAT, or when there is an error in the packet data, a loss flag is set for data of such a packet, and the packet data is output to the deinterleavers 2405 and 2406 with the coded data as an indefinite value.

The deinterleavers 2405 and 2406 deinterleave the output data of the data marshaling units 2403 and 2404 with data of a given size based on the coded data length L(k) as one unit, to generate deinterleave data returned from the interleave. The deinterleavers 2405 and 2406 outputs the data for which the loss flag has been set to the ECC decoders 2407 and 2408 with the coded data as the indefinite value.

The ECC decoders 2407 and 2408 perform the decoding processing based on the loss correction, on the basis of data of the coded data length L(k) and the hiss flag, and outputs the data that has been decoded as the decoded data.

The combining unit 2409 combines the outputs of the decoded data of the RAT1 and the RAT2 from the ECC decoders 2407 and 2408 together by performing the reverse operation of the distributing operation in the multiplexer on the transmitter side on the basis of the distribution ratio information β in multiplexing to restore the transmitted data. Then, the combining unit 2409 outputs the restored data as the received packet data. The ECC decoders 2407, 2408, and the combining unit 2409 realize a function of the combining and decoding processor.

Thus, according to the example 3, the RAT data size of the RAT larger in the transmission delay, and the IL size are reduced, thereby enabling the processing delay until the transmission data is restored by the ECC decoding on the receiver side using the plurality of radio systems to be reduced.

MODIFIED EXAMPLE OF EXAMPLE 3

Figure 25:
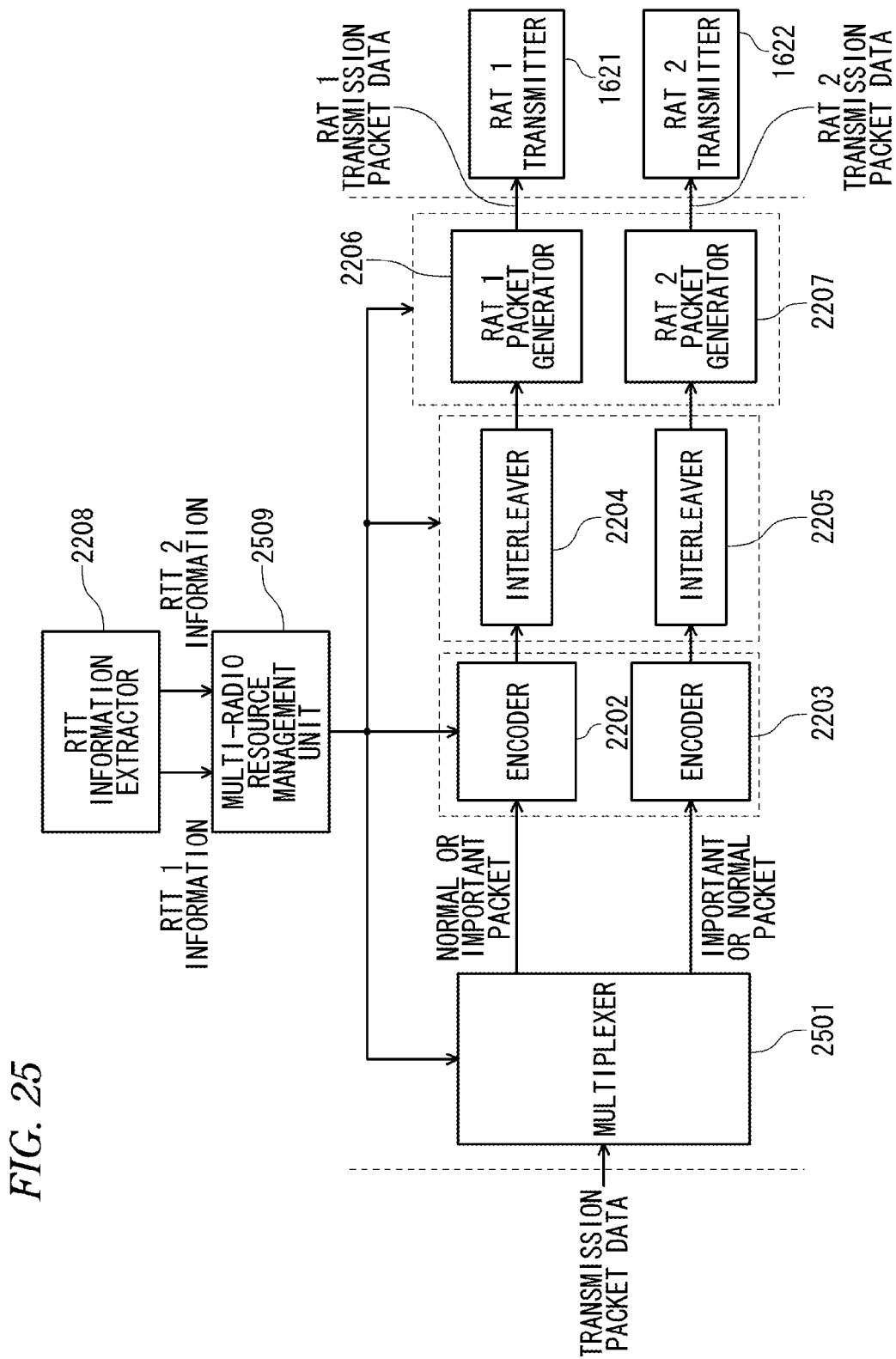
FIG. 25 is a block diagram illustrating a configuration of a wireless transmitting device according to a modified example of the example 3.

As a modified example of the example 3, hierarchical coding used in the above fourth to seventh embodiments can be applied. FIG. 25 is a block diagram illustrating a configuration of a wireless transmitting device according to a modified example of the example 3. The basic configuration is identical with that in the example 3 of FIG. 22, and only different portions will be described. In the modified example of the example 3, as another operation of the multiplexer, when the transmission packet data is packet data separate for each hierarchy, a multiplexer 2501 employs a technique for separating and distributing the packets for each hierarchy. As the hierarchized data, there are used a basic layer and an enhancement layer, important packets and normal packets, or standard definition packets and high definition packets.

In this case, the packet data for each hierarchy is encoded by the encoders 2202 and 2203 as different RAT data, and interleaved by the interleavers 2204 and 2205. Like the above-mentioned examples, in this case, because of parallel processing, the processing delay for the same number of IP packets can be reduced as compared with the configuration example illustrated in FIG. 38. Also, when the distribution data to the RAT larger in the transmission delay is reduced, the processing delay until the transmission data is restored by the ECC decoding on the receiver side using the plurality of radio systems to be reduced.

Also, in this case, the ECC control in a multi-radio resource management unit 2509 gives an instruction of the type for each hierarchy distributed by the multiplexer 2501 on the basis of the transmission delay difference ΔRTT between the RAT1 and the RAT2. That is, it is assumed that the RAT data distributed to the RAT larger in the RTT is the hierarchical data smaller in the number of packet data. In general, in each of the hierarchies, the basic layer is smaller in the amount of packet data if the basic layer is compared with the enhancement layer, the important packet is smaller if the important packet is compared with the normal packet, and the standard definition packet is smaller if the standard definition packet is compared with the high definition packet. For that reason, it is assumed that the hierarchical data smaller in the amount of data is the RAT data to be distributed to the RAT larger in the RTT. The multi-radio resource management unit 2509 instructs the encoders 2202 and 2203 on the information bit length (L_ECC(k)) and the coding rate R_RAT(k) for ECC coding with respect to the k-th RAT(k) according to the amount of packet data for each of hierarchies. Also, the multi-radio resource management unit 2509 instructs the interleavers 2204 and 2205 on the IL size of the coding data.

Under the ECC control in the multi-radio resource management unit 2509, the multi-radio resource management unit 2509 may give an instruction of the type for each of the hierarchies to be distributed by the multiplexer 2501, including the transmission quality information of the RAT1 and the RAT2 in addition of the RTT information on the transmission delay difference ΔRTT between the RAT1 and the RAT2. In this case, if the transmission delay difference between the RAT1 and the RAT2 falls with a given value, the RAT data to be distributed to the RAT larger in the RTT is set as the hierarchical data smaller in the number of packet data on the basis of the transmission delay difference ΔRTT. Also, if the transmission quality difference between the RAT1 and the RAT2 is the given value or more, the basic layer in comparison between the basic layer and the enhancement layer, the important packet in comparison between the important packet and the normal packet, and the standard definition packet in comparison between the standard definition packet and the high definition packet, are set as the hierarchical data to be distributed to the RAT higher in the transmission quality. As a result, if the transmission quality difference between the RAT1 and the RAT2 is larger, the transmission quality using the multi-radio can be ensured without remarkably deteriorating the transmission quality of the important packet data.

EXAMPLE 4

An example 4 corresponds to the fourth embodiment.

<Configuration and Operation of Transmitting Device>

Figure 26:
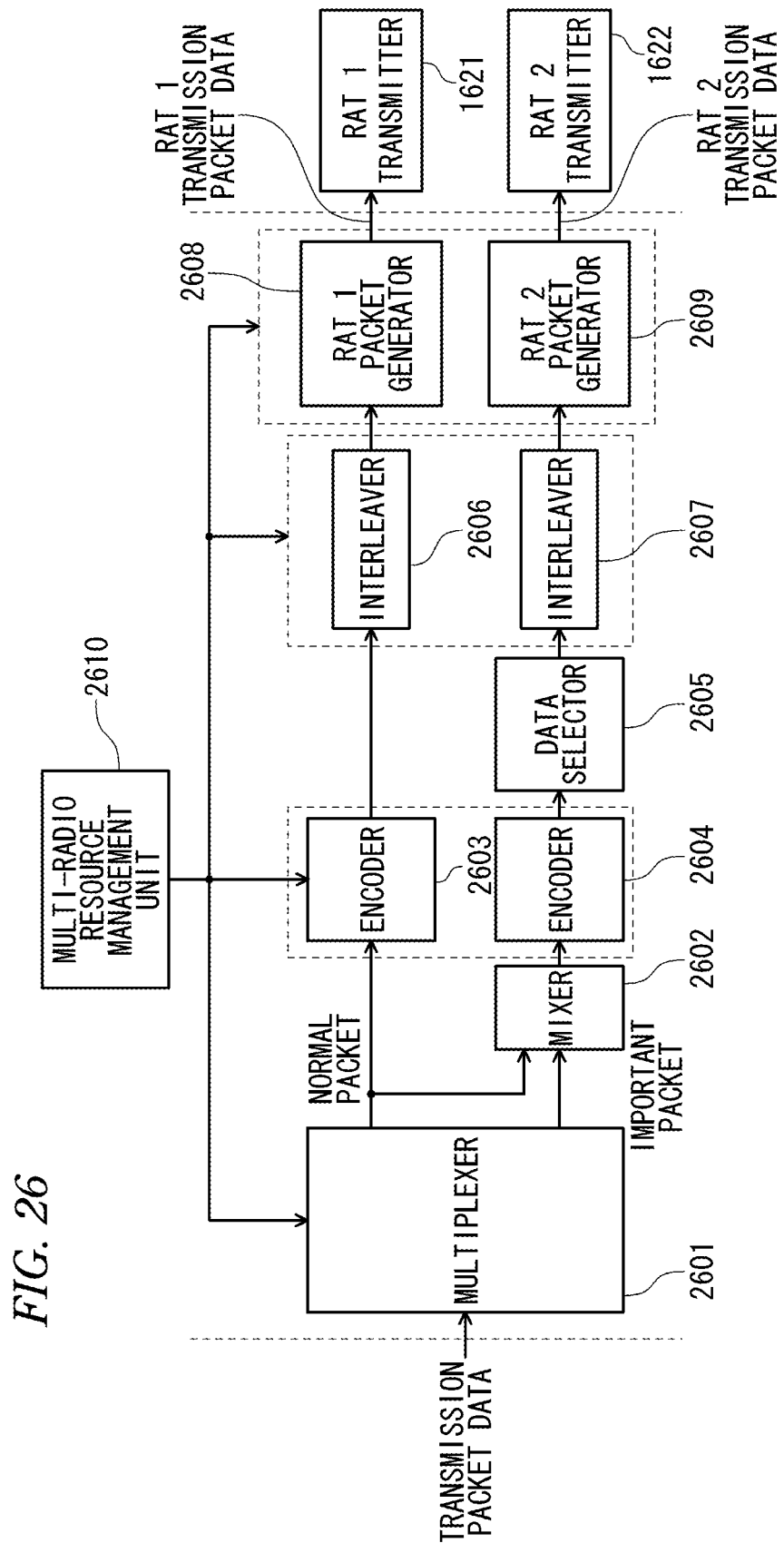
FIG. 26 is a block diagram illustrating a configuration of a wireless transmitting device according to an example 4.

FIG. 26 is a block diagram illustrating a configuration of a wireless transmitting device according to the example 4. In this example, it is assumed that the wireless communication device is applied to the data transmission hierarchized into a plurality of hierarchies such as the basic layer and the enhancement layer, the important packet and the normal packet, or the standard definition packet and the high definition packet.

The wireless communication device includes a multiplexer 2601, a mixer 2602, encoders 2603, 2604, a data selector 2605, interleavers 2606, 2607, an RAT1 packet generator 2608, an RAT2 packet generator 2609, and a multi-radio resource management unit 2610. Also, the wireless communication device includes the RAT1 transmitter 1621 and the RAT2 transmitter 1622 that perform the transmission processing of the MAC layer and the physical layer in each of the plural wireless systems RAT1 and the RAT2.

The multi-radio resource management unit 2610 performs a flow control for marshaling the transmission packets for each of the wireless communication devices which are destinations of the transmission packet data, on the basis of the identification information included in the transmission packet data input from the upper layer. Further, the multi-radio resource management unit 2610 controls the error correction code processing (ECC control) on the transmission packet data having a common destination, and distributes (multi-radio resource management) the data to the multi-radio systems (RAT1, RAT2). In this example, under the ECC control, the multi-radio resource management unit 2610 first distributes the RAT1 and the RAT2 for each of the hierarchical data in the transmission packet data. In this example, the multi-radio resource management unit 2610 instructs the multiplexer 2601 to input the normal packet data to the first encoder 2603 and the mixer 2602, and the important packet data to the mixer 2602. The multi-radio resource management unit 2610 instructs the encoders 2603 and 2604 on the information bit length (L_ECC(k)) and the coding rate R_RAT(k) for ECC coding of the k-th RAT(k) according to the amount of packet data for each of the hierarchies. Also, the multi-radio resource management unit 2610 instructs the interleavers 2606 and 2607 on the IL size of the coding data.

Figure 27:
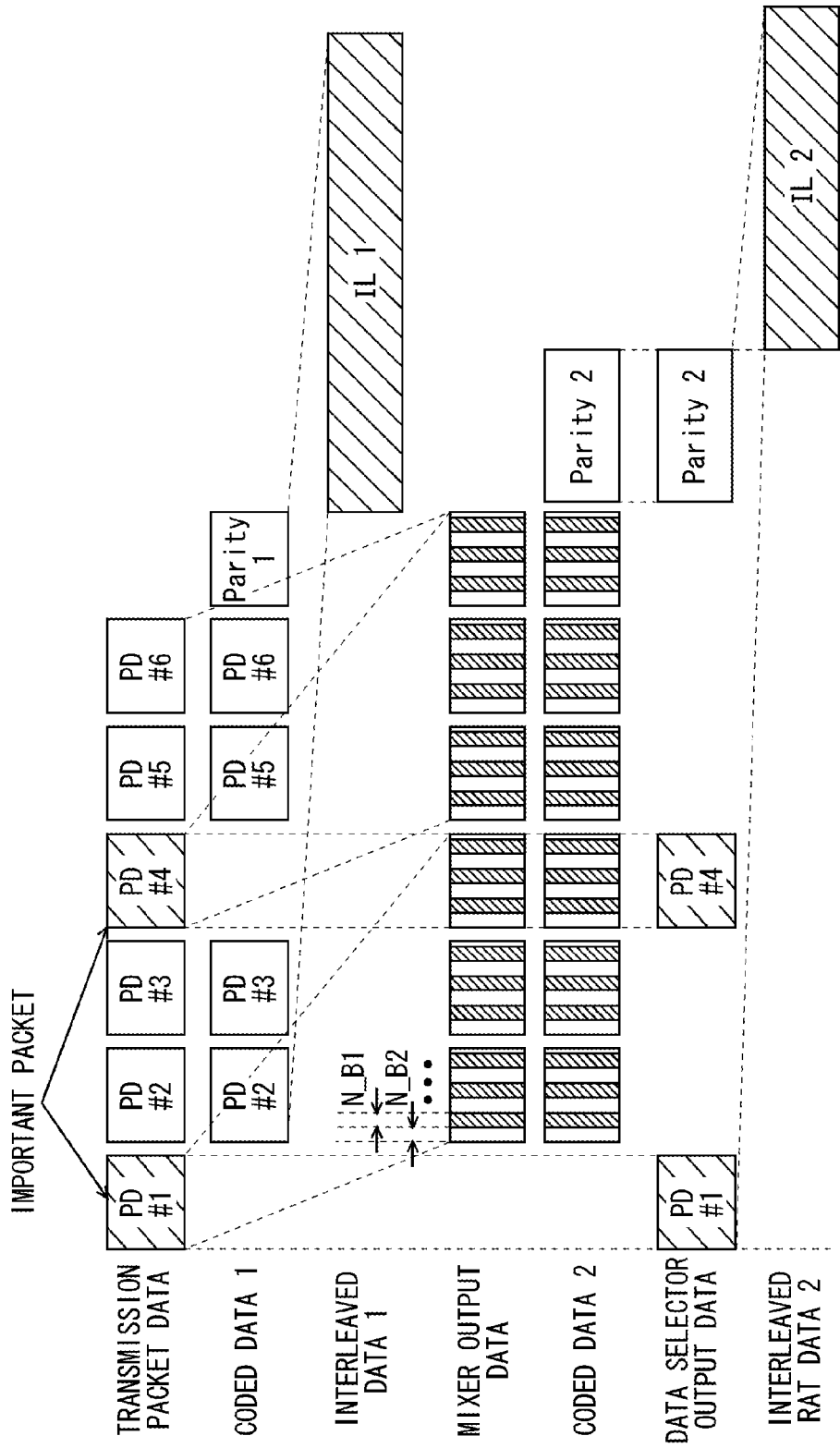
FIG. 27 is a block diagram illustrating processing of the wireless transmitting device according to the example 4.

FIG. 27 is a diagram illustrating processing of the wireless transmitting device according to the example 4.

The mixer 2602 mixes the normal packet data with the important packet data to output the mixed data to the second encoder 2604. In this example, the data mixing techniques includes the following two techniques (1) and (2). In the technique (2), because the RAT1 data and the RAT2 data are more sparsely arranged, the randomizing effect is more increased so that the error correction effect by the ECC decoding processing can be enhanced.

Technique (1) packet basis: The important packet data and the normal packet data are mixed together on the important back or normal packet basis.

Technique (2) Given packet basis: The important packet data (PDU indicated by hatching in FIG. 27) is separated at given N_B1 bit intervals, and the separate important packet data is mixed together every given N_B2 bits of the normal packet data.

The first encoder 2603 performs the error correction code processing using the systematic code at a given coding rate R_RAT(1) on the normal packet data, with the information bit length (L_ECC(1)) for which ECC coding is performed, which is designated by the multi-radio resource management unit 2610, as one unit. The encoded transmission packet data (coded data 1) includes the parity data as the redundant bit, and a size L_P(1) thereof depends on the coding rate.

The second encoder 2604 performs the error correction code processing using the systematic code at a given coding rate R_RAT(2) on the output data of the mixer 2602, with the information bit length (L_ECC(2)) for which ECC coding is performed, which is designated by the multi-radio resource management unit 2610, as one unit. The encoded transmission packet data (coded data 2) includes the parity data as the redundant bit, and a size L_P(2) thereof depends on the coding rate. The encoded size L_ECC(2) includes the normal packet data of L_ECC(1), and the size of the important packet data is L_ECC(2)–L_ECC(1). The data selector 2605 selectively outputs only the important packet data and the parity bit included in the systematic bit, from the output of the second encoder 2604.

The first interleaver 2606 for the distribution data to the RAT(i) performs the interleaving processing of the IL size L(1) with L_ECC(1)+L_P(1) as a unit, on the output data of the encoder 2603, on the basis of L_ECC(1) and L_P(1) designated by the multi-radio resource management unit 2610. The first interleaver 2606 outputs the interleave data 1 that has been interleaved to the RAT1 packet generator 2608. The second interleaver 2607 for the distribution data to the RAT(2) performs the interleaving processing of the IL size L(2) with L_ECC(2)–L_ECC(1)+L_P(2) as a unit, on the output data of the data selector 2605, on the basis of L_ECC (1), L_ECC(2), and L_P(2) designated by the multi-radio resource management unit 2610. The second interleaver 2607 outputs the interleave data 2 that has been interleaved to the RAT2 packet generator 2609.

The RAT1 packet generator 2608 and the RAT2 packet generator 2609 divide the interleave data 1 and the interleave data 2 into packets each having a given size smaller than the IL size, and add the header information to the respective separate packets to generate the RAT packets for the respective RAT(k). In this example, the header information includes specific header information H1 necessary for transmission in the RAT(k), and also the expansion header information H2 necessary for the ECC decoding processing in a subsequent different area. As a result, the RAT(k) refers to only the header information H1, and can perform transmission and reception processing in the respective RATs. Also, in the ECC decoding processing, the expansion header information H2 is extracted from the received packet in each of the RATs so as to perform the ECC decoding processing. The expansion header information H2 is added with identification number (serial number) of the ECC coded data, the interleave size length L(k), the coding rate R_RAT(k) information, data mixture information in the mixer, the interleave data position information (allocation of serial numbers in the packer order when interleave data is separated into a plurality of packet data).

The respective RAT(k) transmission packet data generated by the RAT1 packet generator 2608 and the RAT2 packet generator 2609 is subjected to the transmission processing by the RAT1 transmitter 1621 and the RAT2 transmitter 1622. Then, the RAT(k) transmission packet data is transmitted to the wireless communication device that is a destination, by the radio systems RAT1 and the RAT2.

<Configuration and Operation of Receiving Device>

Figure 28:
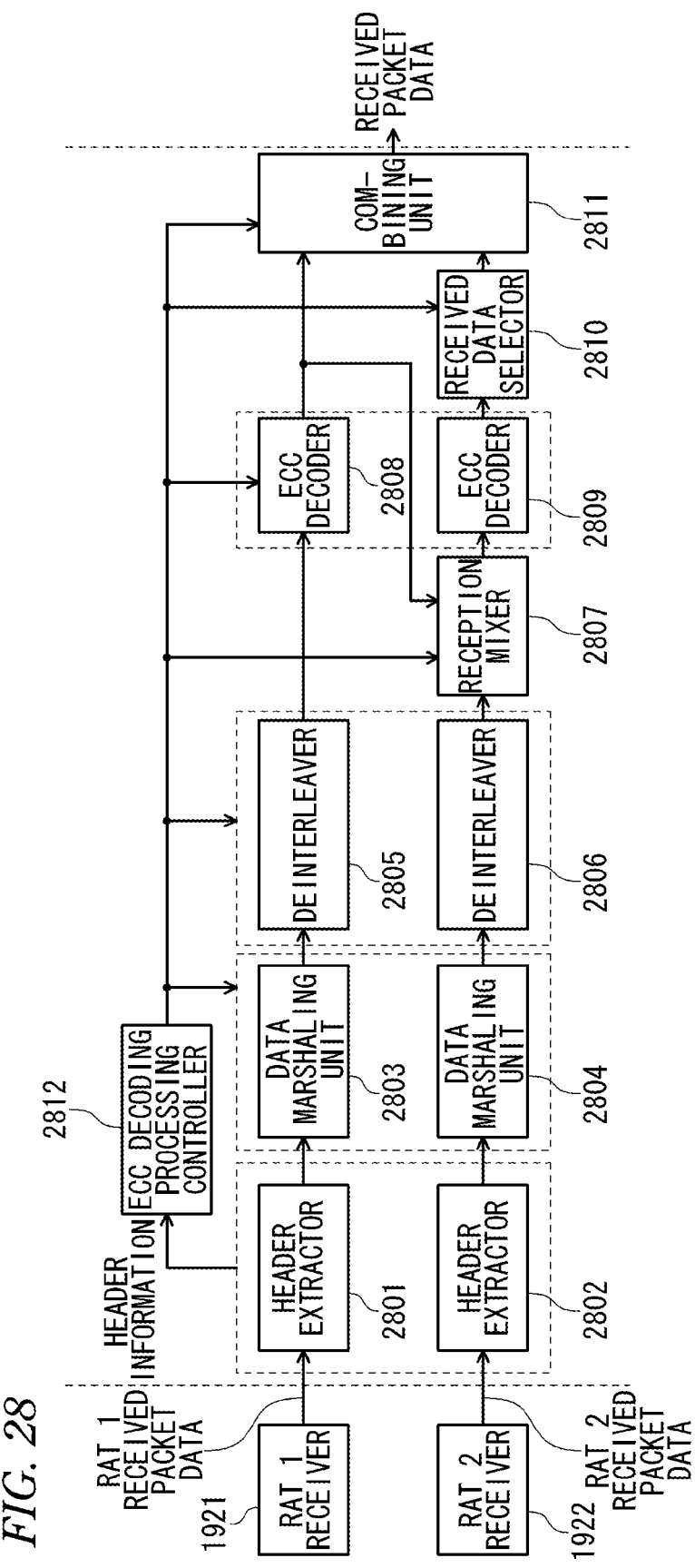
FIG. 28 is a block diagram illustrating a configuration of a wireless receiving device according to the example 4.

FIG. 28 is a block diagram illustrating a configuration of a wireless receiving device according to the example 4. The wireless communication device includes header extractors 2801, 2802, data marshaling units 2803, 2804, deinterleavers 2805, 2806, a reception mixer 2807, ECC decoders 2808, 2809, a received data selector 2810, a combining unit 2811, and an ECC decoding processing controller 2812. Also, the wireless receiving device has an RAT1 receiver 1921 and an RAT2 receiver 1922 that perform reception processing on the physical layer and the MAC layer in each of the plural radio systems RAT1 and RAT2.

The header extractors 2801 and 2802 extract the expansion header information H2 from the RAT1 (RAT2) received packet data received by the RAT1 receiver 1921 and the RAT2 receiver 1922, respectively. The extracted expansion header information H2 is output to the ECC decoding processing controller 2812, and the data from which the header part has been removed is output to the data marshaling units 2803 and 2804.

The ECC decoding processing controller 2812 acquires the identification number (serial number) of the ECC coded data, the interleave size length L(k), the coding rate R_RAT(k) information, the data mixture information in the mixer, and the interleave data position information from the acquired expansion header information H2. On the basis of those information, the ECC decoding processing controller 2812 controls the data marshaling units 2803, 2804, the deinterleavers 2805, 2806, the reception mixer 2807, the ECC decoders 2808, 2809, the received data selector 2810, and the combining unit 2811.

The data marshaling units 2803 and 2804 restore a sequence of data common in the identification number of the ECC coded data among the RAT1 (RAT2) received packet data from which the header has been removed, on the basis of the interleave data position information. In this example, when the packet data is lost due to a packet error in the RAT, or when there is an error in the packet data, a loss flag is set for data of such a packet, and the packet data is output to the deinterleavers 2805 and 2806 with the coded data as an indefinite value.

The deinterleavers 2805 and 2806 deinterleave the output data of the data marshaling units 2803 and 2804 with data of a given size based on the interleave size length L(k) as one unit. The deinterleavers 2805 and 2806 outputs the data for which the loss flag has been set to the ECC decoders 2808, 2809, and the reception mixer 2807 with the coded data as the indefinite value.

The first ECC decoders 2808 performs the decoding processing based on the loss correction, on the basis of data of the interleave length L(1) and the loss flag, and outputs the data that has been decoded as the decoded data 1.

The reception mixer 2807 mixes an output of the deinterleaver 2806 and an output of the first ECC decoder 2808 into the received data in the same manner as the mixing manner performed during the transmission on the basis of the data mixture information generated by the mixer 2602 during the transmission. The reception mixer 2807 outputs the data for which the loss flag has been set to the second ECC decoder 2809 with the coded data as the indefinite value.

The second ECC decoders 2809 performs the decoding processing based on the loss correction, on the basis of the output of the reception mixer 2807 and the loss flag, and outputs the data that has been decoded as the decoded data 2.

The received data selector 2810 separates the output of the second ECC decoder 2809 into the normal packet data that is the RAT1 data and the important packet data that is the RAT2 data, which have been mixed in the reception mixer 2807, on the basis of the data mixture information generated by the mixer during the transmission, and outputs the separate data.

The combining unit 2811 combines an output of the decoded data of the RAT1 from the ECC decoder 2808 and an output of the decoded data of the RAT2 from the received data selector 2810, that is, the normal packet data and the important packet data which could be correctly received, together by performing the reverse operation of the distributing operation of the multiplexer on the transmitter side, to restore the transmitted data. Then, the combining unit 2811 outputs the restored data as the received packet data.

Thus, in the example 4, the important packet data smaller in the amount of data than the normal packet data is encoded by the encoder for the RAT2 with the inclusion of the normal packet data. Therefore, because the parity bit data that is redundant data is increased, the substantial coding rate can be reduced. As a result, the error correction capability by the ECC decoding processing on the important packet data can be enhanced. Also, when the important packet data and the normal packet data are dispersed by the mixer, the randomizing effect can be enhanced, and the error correction capability by the ECC decoding processing on the important packet data can be further enhanced. Also, in the decoding processing, the important packet data can be generally decoded by using the receiving result of the normal packet data larger in the interleave size. For that reason, even if the packet is lost in the RAT1 and the RAT2, the decoding processing is performed by using the received data in both of the RAT1 and the RAT2 so that the error correction capability by the ECC decoding processing can be further improved. Also, in the decoding processing, the decoding processing of the important packet data can be generally performed by using the receiving result of the normal packet data larger in the interleave size. For that reason, even if the packet is lost in the RAT1 and the RAT2, the decoding processing is performed by using the received data in both of the RAT1 and the RAT2 so that the error correction capability by the ECC decoding processing can be further enhanced.

FIRST MODIFIED EXAMPLE OF EXAMPLE 4

The example 4 shows a configuration in which the packet data of the different hierarchy in each of the RATs is transmitted, individually. Alternatively, as a first modified example of the example 4, in the RAT(k) packet generator, before the data transmission in one RAT starts, the transmission of the packet data in the other RAT may have already started. RAT (k) represents k-th RAT (k is an arbitrary integer), and is RAT1 or RAT2 in the above example. In this case, the type information (flag indicative of the important packet data or the normal packet data) of the hierarchical data is added to the expansion header information H2 added by the RAT(k) packet generator. Then, the following operation is added in the data marshaling units 2803 and 2804 on the receiver side. That is, data is separated for each type information of the hierarchical data, and thereafter a sequence of data common in the identification number of the ECC coded data among the RAT received packet data from which the header has been removed, is restored on the basis of the interleave data position information.

With the above operation, the processing delay by the ECC encoding can be reduced. This is particularly effective if the RTT difference between the RATs is smaller.

Second Modified Example of Example 4

Also, as a second modified example of the example 4, in the RAT(k) packet generator, in the case where the transmission of the packet data in the other RAT has already started before the data transmission in one RAT starts, the same packet data may be redundantly transmitted. In this case, the type information (flag indicative of the important packet data or the normal packet data) of the hierarchical data is added to the expansion header information H2 added by the RAT(k) packet generator. Then, the following operation is added in the data marshaling units 2803 and 2804 on the receiver side. That is, data is separated for each type information of the hierarchical data, and thereafter a sequence of data common in the identification number of the ECC coded data among the RAT received packet data from which the header has been removed, is restored on the basis of the interleave data position information.

With the above operation, the data is redundantly transmitted without increasing the processing delay by the ECC coding so that the receiving performance can be improved by the diversity effect.

EXAMPLE 5

Figure 29:
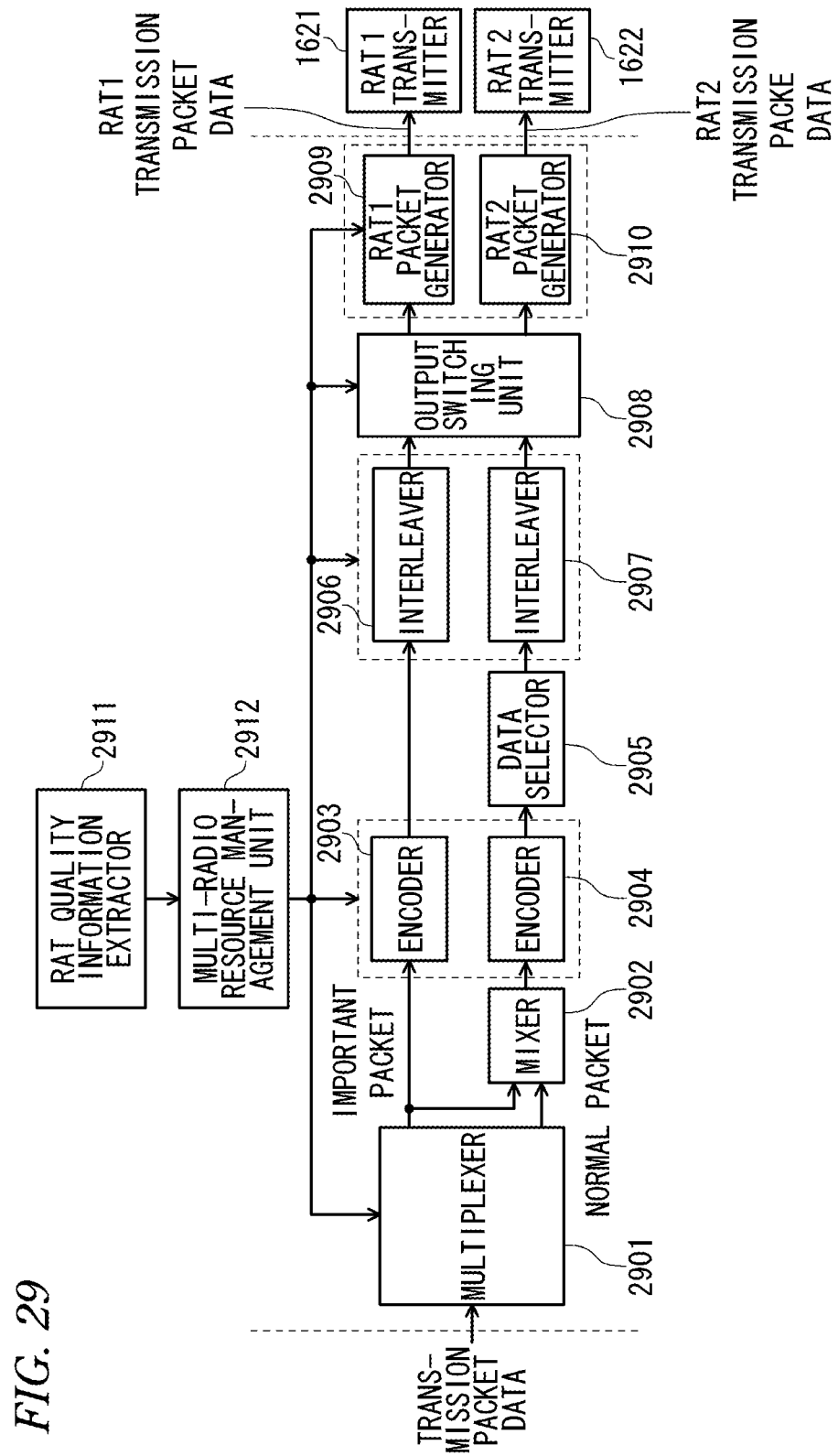
FIG. 29 is a block diagram illustrating a configuration of a wireless transmitting device according to an example 5.

An example 5 corresponds to the fifth embodiment.
<Configuration and Operation of Transmitting Device>
FIG. 29 is a block diagram illustrating a configuration of a wireless transmitting device according to the example 5. The example 5 shows one example in which the transmission packet data includes the packet data for each of the hierarchies as in the example 4. In the example 4, it is assumed that a bias of the transmission quality is relatively small between the RATs. On the other hand, in the example 5, it is assumed that the bias of the transmission quality is relatively large between the RATs. When the transmission packet data includes the packet data for each of the hierarchies, if the interleaving processing is performed for each of the hierarchies, the interleaving processing becomes parallel processing, to thereby reduce the comprehensive processing delay. Together with this configuration, the reception quality of the important packet data is ensured by selecting the RAT high in the transmission quality, and the method of encoding the normal packet data is devised to ensure the quality.

The wireless communication device includes a multiplexer 2901, a mixer 2902, encoders 2903, 2904, a data selector 2905, interleavers 2906, 2907, an output switching unit 2908, an RAT1 packet generator 2909, an RAT2 packet generator 2910, an RAT quality information extractor 2911, and a multi-radio resource management unit 2912. Also, the wireless communication device includes the RAT1 transmitter 1621 and the RAT2 transmitter 1622 that perform the transmission processing of the MAC layer and the physical layer in each of the plural wireless systems RAT1 and the RAT2.

The RAT quality information extractor 2911 extracts transmission quality information RQ1 and RQ2 as the RAT quality information for each of the RAT1 and the RAT2 which are the plurality of RATs used for transmission. As the transmission quality information, SINR (signal to interference and noise power ratio) information, or RSSI (received signal strength indicator) information are used. Also, the transmission quality information, information such that QoS guarantee is present or absent (best-effort type) may be used. Also, as the transmission quality information RQ1 and RQ2, a system name (3GPP system, WiMAX, WiFi, etc.) of the RATs may be used. In this case, the transmission quality information RQ1 and RQ2 fixed in advance may be provided according to the degree of QoS guarantee specific to each system. For example, as a system high in the transmission quality, 3GPP system may be defined and used, and as a system low in the transmission quality information, that is, a system close to the best-effort type, a WiMAX or WiFi system may be defined and used. The multi-radio resource management unit 2912 controls the output switching unit 2908 on the basis of the transmission quality information RQ1 and RQ2 for each of the RAT1 and the RAT2, which are obtained from the RAT quality information extractor 2911. In this example, the multi-radio resource management unit 2912 controls the switching of the output data so that the interleaver output including the important packet data is input to the RAT higher in the transmission quality, and the interleaver output including the normal packet data is input to the RAT lower in the transmission quality.

Also, the multi-radio resource management unit 2912 performs a flow control for marshaling the transmission packets for each of the wireless communication devices which are destinations of the transmission packet data, on the basis of the identification information included in the transmission packet data input from the upper layer. Further, the multi-radio resource management unit 2912 controls the error correction code processing (ECC control) on the transmission packet data having a common destination, and distributes (multi-radio resource management) the data to the multi-radio systems (RAT1, RAT2). In this example, under the ECC control, the multi-radio resource management unit 2912 first distributes the RAT1 and the RAT2 for each of the hierarchical data in the transmission packet data. In this example, unlike the example 4, the multi-radio resource management unit 2912 instructs the multiplexer 2901 to input the important packet data to the first encoder 2903 and the mixer 2902, and the normal packet data to the mixer 2902. The multi-radio resource management unit 2912 instructs the encoders 2903 and 2904 on the information bit length (L_ECC(k)) and the coding rate R_RAT(k) for ECC coding of the k-th RAT(k) according to the amount of packet data for each of the hierarchies. Also, the multi-radio resource management unit 2912 instructs the interleavers 2906 and 2907 on the IL size of the coding data.

Figure 30:
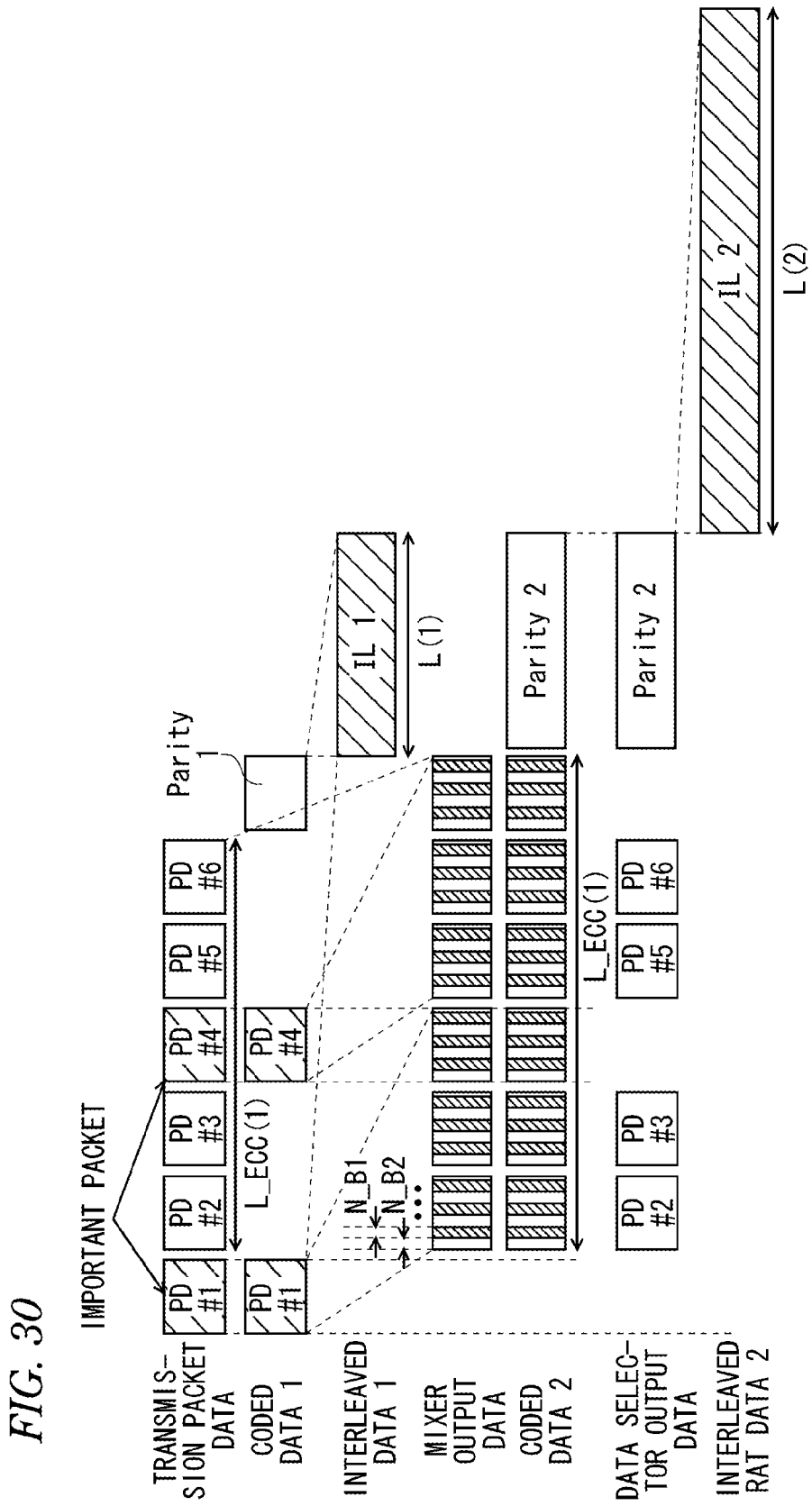
FIG. 30 is a block diagram illustrating processing of the wireless transmitting device according to the example 5.

FIG. 30 is a diagram illustrating processing of the wireless transmitting device according to the example 5.

The mixer 2902 mixes the normal packet data with the important packet data to output the mixed data to the second encoder 2904. In this example, the data mixing techniques enable the following two techniques (1) and (2) as in the example 4.

The first encoder 2903 performs the error correction code processing using the systematic code at a given coding rate R_RAT(1) on the important packet data, with the information bit length (L_ECC(1)) for which ECC coding is performed, which is designated by the multi-radio resource management unit 2912, as one unit. The encoded transmission packet data (coded data 1) includes the parity data as the redundant bit, and a size L_P(1) thereof depends on the coding rate.

The second encoder 2904 performs the error correction code processing using the systematic code at a given coding rate R_RAT(2) on the output data of the mixer 2902, with the information bit length (L_ECC(2)) for which ECC coding is performed, which is designated by the multi-radio resource management unit 2912, as one unit. The encoded transmission packet data (coded data 2) includes the parity data as the redundant bit, and a size L_P(2) thereof depends on the coding rate. The encoded size L_ECC(2) includes the important packet data of L_ECC(1), and the size of the normal packet data is L_ECC(2)–L_ECC(1). The data selector 2905 selectively outputs only the normal packet data and the parity bit included in the systematic bit, from the output of the second encoder 2904.

The first interleaver 2906 for the distribution data to the RAT(i) performs the interleaving processing of the IL size L(1) with L_ECC(1)+L_P(1) as a unit, on the output data of the encoder 2903, on the basis of L_ECC(1) and L_P(1) designated by the multi-radio resource management unit 2912. The first interleaver 2906 outputs the interleave data 1 that has been interleaved to the output switching unit 2908.

The second interleaver 2907 for the distribution data to the RAT(2) performs the interleaving processing of the IL size L(2) with L_ECC(2)–L_ECC(1)+L_P(2) as a unit, on the output data of the data selector 2905, on the basis of L_ECC (1), L_ECC(2), and L_P(2) designated by the multi-radio resource management unit 2912. The second interleaver 2907 outputs the interleave data 2 that has been interleaved to the output switching unit 2908.

The output switching unit 2908 performs the switching operation on the basis of an instruction from the multi-radio resource management unit 2912 so that the interleaver output including the important packet data is input to the RAT higher in the transmission quality, and the interleaver output including the normal packet data is input to the RAT lower in the transmission quality.

The RAT1 packet generator 2909 and the RAT2 packet generator 2910 divide the interleave data 1 and the interleave data 2 into packets each having a given size smaller than the IL size, respectively, and add the header information to the respective separate packets to generate the RAT packets for the respective RATs(k). The expansion header information H2 of the header information is added with the output data selected by the output switching unit 2908 and the following information related to the ECC coding. That is, the expansion header information H2 is added with identification number (serial number) of the ECC coded data, the interleave size length L(1) or L(2), the coding rate R_RAT(k) information in ECC coding, data mixture information in the mixer, and the interleave data position information (allocation of serial numbers in the packer order when interleave data is separated into a plurality of packet data). Further, the expansion header information H2 is added with selection information (flag information indicative of the important packet data or the normal packet data) by the output switching unit 2908.

The respective RAT(k) transmission packet data generated by the RAT1 packet generator 2909 and the RAT2 packet generator 2910 is subjected to the transmission processing by the RAT1 transmitter 1621 and the RAT2 transmitter 1622. Then, the RAT(k) transmission packet data is transmitted to the wireless communication device that is a destination, by the radio systems RAT1 and the RAT2.

<Configuration and Operation of Receiving Device>

Figure 31:
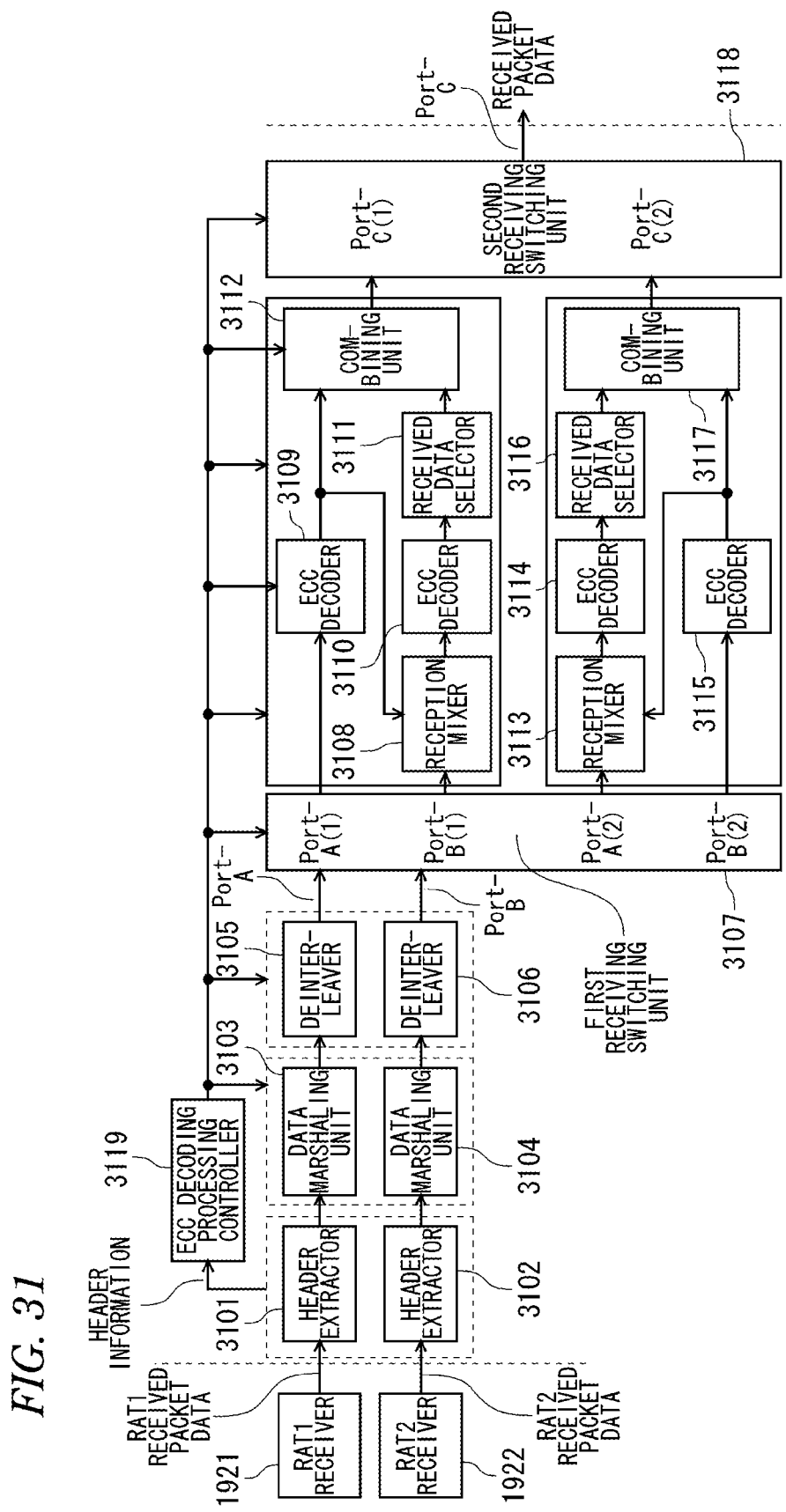
FIG. 31 is a block diagram illustrating a configuration of a wireless receiving device according to the example 5.

FIG. 31 is a block diagram illustrating a configuration of a wireless receiving device according to the example 5. The wireless communication device includes header extractors 3101, 3102, data marshaling units 3103, 3104, deinterleavers 3105, 3106, a first receiving switching unit 3107, reception mixers 3108, 3113, ECC decoders 3109, 3110, 3114, 3115, received data selectors 3111, 3116, combining units 3112, 3117, a second receiving switching unit 3118, and an ECC decoding processing controller 3119. Also, the wireless receiving device has an RAT1 receiver 1921 and an RAT2 receiver 1922 that perform reception processing on the physical layer and the MAC layer in each of the plural radio systems RAT1 and RAT2.

The header extractors 3101 and 3102 extract the expansion header information H2 from the RAT1 (RAT2) received packet data received by the RAT1 receiver 1921 and the RAT2 receiver 1922, respectively. The extracted expansion header information H2 is output to the ECC decoding processing controller 3119, and the data from which the header part has been removed is output to the data marshaling units 3103 and 3104.

The ECC decoding processing controller 3119 acquires the identification number (serial number) of the ECC coded data, the interleave size length L(k), the coding rate R_RAT(k) information, the data mixture information in the mixer, the interleave data position information, and selection information by the output switching unit, from the acquired expansion header information H2. On the basis of those information, the ECC decoding processing controller 3119 controls the data marshaling units 3103, 3104, the deinterleavers 3105, 3106, the first receiving switching unit 3107, the reception mixers 3108, 3113, the ECC decoders 3109, 3110, 3114, 3115, the received data selectors 3111, 3116, the combining units 3112, 3117, and the second receiving switching unit 3118.

The data marshaling units 3103 and 3104 restore a sequence of data common in the identification number of the ECC coded data among the RAT1 (RAT2) received packet data from which the header has been removed, on the basis of the interleave data position information. In this example, when the packet data is lost due to a packet error in the RAT, or when there is an error in the packet data, a loss flag is set for data of such a packet, and the packet data is output to the deinterleavers 3105 and 3106 with the coded data as an indefinite value.

The deinterleavers 3105 and 3106 deinterleave the output data of the data marshaling units 3103 and 3104 with data of a given size based on the interleave size length L(k) as one unit. The deinterleavers 3105 and 3106 outputs the data for which the loss flag has been set to the first receiving switching unit 3107 with the coded data as the indefinite value. The first receiving switching unit 3107 performs switching operation so that outputs (Port-A, Port-B) of the deinterleavers 3105 and 3106 are input to any one of Port-A(1), Port-B(1) and Port-A(2), Port-B(2), on the basis of the selection information (flag information indicative of the important packet data or the normal packet data) by the output switching unit 2908 on the transmitter side. That is, when the RAT1 includes the important packet data, and the RAT2 includes the normal packet data, the first receiving switching unit 3107 inputs the outputs (Port-A, Port-B) of the deinterleavers 3105 and 3106 to the Port-A(1) and the Port-B(1). In the reverse situation, the first receiving switching unit 3107 inputs the outputs (Port-A, Port-B) of the deinterleavers 3105 and 3106 to the Port-A(2) and the Port-B(2). If the Port-A(1) and the Port-B(1) are selected, the outputs of the deinterleavers 3105 and 3106 are supplied to one set of the ECC decoders 3109, 3110, and the reception mixer 3108. On the other hand, if the Port-A(2) and the Port-B(2) are selected, the outputs of the deinterleavers 3105 and 3106 are supplied to the other set of the reception mixer 3113, and the ECC decoders 3114, 3115.

With the operation of the first receiving switching unit 3107, the second receiving switching unit 3118 switchingly inputs any one of the output Port-C(1) of the combining unit. 3112 and the output Port-C(2) of the combining unit 3117 to the Port-C. That is, when the RAT1 includes the important packet data, and the RAT2 includes the normal packet data, the second receiving switching unit 3118 inputs the output Port-C(1) from the combining unit 3112 to the Port-C. In the reverse situation, the second receiving switching unit 3118 inputs the output Port-C(2) from the combining unit 3117 to the Port-C.

First, the operation when the RAT1 includes the important packet data, and the RAT2 includes the normal packet data will be described. In this case, the ECC decoder 3109 performs the decoding processing based on the loss correction, on the basis of the data of the interleave size length L(1) and the loss flag, and outputs the data that has been decoded as the decoded data 1.

The reception mixer 3108 mixes an output of the deinterleaver 3106 and an output of the ECC decoder 3109 into the received data on the basis of the data mixture information generated by the mixer 2902 during the transmission in the same manner as the mixing manner performed during the transmission. The reception mixer 3107 outputs the data for which the loss flag has been set to the ECC decoder 3110 with the coded data as the indefinite value.

The ECC decoder 3110 performs the decoding processing based on the loss correction, on the basis of the output of the reception mixer 3108 and the lens flag, and outputs the decoded data as a decode data 2. The received data selector 3111 separates the output of the ECC decoder 3110 into the important packet data that is the RAT1 data and the normal packet data that is the RAT2 data, which have been mixed in the reception mixer 3108, on the basis of the data mixture information generated by the mixer during the transmission, and outputs the separate data.

The combining unit 3112 combines an output of the decoded data of the RAT1 from the ECC decoder 3109 and an output of the decoded data of the RAT2 from the received data selector 3111, that is, the normal packet data and the important packet data which could be correctly received, together by performing the reverse operation of the distributing operation of the multiplexer on the transmitter side, to restore the transmitted data. Then, the combining unit 3112 outputs the restored data to the second receiving switching unit 3118, and the second receiving switching unit 3118 outputs the restored data as the received packet data from Port-C thereof.

Also, second, the operation when the RAT2 includes the important packet data, and the RAT1 includes the normal packet data will be described. In this case, the ECC decoder 3115 performs the decoding processing based on the loss correction, on the basis of the data of the interleave size length L(2) and the loss flag, and outputs the data that has been decoded as the decoded data 1.

The reception mixer 3113 mixes an output of the deinterleaver 3105 and an output of the ECC decoder 3115 into the received data on the basis of the data mixture information generated by the mixer 2902 during the transmission in the same manner as the mixing manner performed during the transmission. The reception mixer 3113 outputs the data for which the loss flag has been set to the ECC decoder 3114 with the coded data as the indefinite value.

The ECC decoder 3114 performs the decoding processing based on the loss correction, on the basis of the output of the reception mixer 3113 and the loss flag, and outputs the data that has been decoded as the decoded data 2.

The received data selector 3116 separates the output of the ECC decoder 3114 into the important packet data that is the RAT2 data and the normal packet data that is the RAT1 data, which have been mixed in the reception mixer 3113, on the basis of the data mixture information generated by the mixer during the transmission, and outputs the separate data.

The combining unit 3117 combines an output of the decoded data of the RAT1 from the received data selector 3116 and an output of the decoded data of the RAT2 from the ECC decoder 3115, that is, the normal packet data and the important packet data which could be correctly received, together by performing the reverse operation of the distributing operation of the multiplexer on the transmitter side, to restore the transmitted data. Then, the combining unit 3117 outputs the restored data to the second receiving switching unit 3118, and the second receiving switching unit 3118 outputs the restored data as the received packet data from Port-C thereof.

Thus, in the example 5, the important packet data is transmitted by using the RAT higher in the reception quality so that the reception quality can be enhanced even if the IL is small. On the other hand, the normal packet data is encoded by the encoder with the inclusion of the important packet data. Therefore, because the parity bit data that is redundant data is increased, the substantial coding rate can be reduced. As a result, the error correction capability by the ECC decoding processing on the normal packet data can be enhanced. Also, when the important packet data and the normal packet data are dispersed by the mixer, the randomizing effect can be enhanced, and the error correction capability by the ECC decoding processing on the important packet data can be further enhanced. Also, in the decoding processing, the normal packet data can be decoded by using the receiving result of the important packet data transmitted by the RAT higher in the transmission quality. For that reason, even if the packet is lost in the RAT lower in the transmission quality, the decoding processing is performed by using the received data in both of the RAT1 and the RAT2 so that the error correction capability by the ECC decoding processing can be further improved.

FIRST MODIFIED EXAMPLE OF EXAMPLE 5

The example 5 shows a configuration in which the packet data of the different hierarchy in each of the RATs is transmitted, individually. Alternatively, as a first modified example of the example 5, in the RAT(k) packet generator, when the data transmission in one RAT has been completed, the packet data in the other RAT may be transmitted. In this case, the expansion header information H2 added by the RAT(k) packet generator is added with the type information (flag indicative of the important packet data or the normal packet data) on the hierarchical data. In the data marshaling units 3103 and 3104 on the receiver side, the following operation is added. That is, data is separated for each type information of the hierarchical data. Thereafter, a sequence of data common in the identification number of the ECC coded data among the RAT received packet data from which the header has been removed, is restored on the basis of the interleave data position information.

With the above operation, the processing delay by the ECC encoding can be reduced. This is particularly effective if the RTT difference between the RATs is smaller. Also, because the amount of important packet data is generally small, a part of the normal packet data is transmitted by the RAT that transmits the important packet data. As a result, the effect of enhancing the reception quality of the normal packet data is also obtained.

Second Modified Example of Example 5

Also, as a second modified example of the example 5, in the case where the transmission of the packet data in the other RAT has started before the data transmission in one RAT starts, the same packet data may be redundantly transmitted. In this case, the type information (flag indicative of the important packet data or the normal packet data) of the hierarchical data is added to the expansion header information H2 added by the RAT(k) packet generator. Then, the following operation is added in the data marshaling units 3103 and 3104 on the receiver side. That is, data is separated for each type information of the hierarchical data, and thereafter a sequence of data common in the identification number of the ECC coded data among the RAT received packet data from which the header has been removed, is restored on the basis of the interleave data position information.

With the above operation, the data is redundantly transmitted without increasing the processing delay by the ECC coding so that the receiving performance can be improved by the diversity effect.

THIRD MODIFIED EXAMPLE OF EXAMPLE 5

Figure 32:
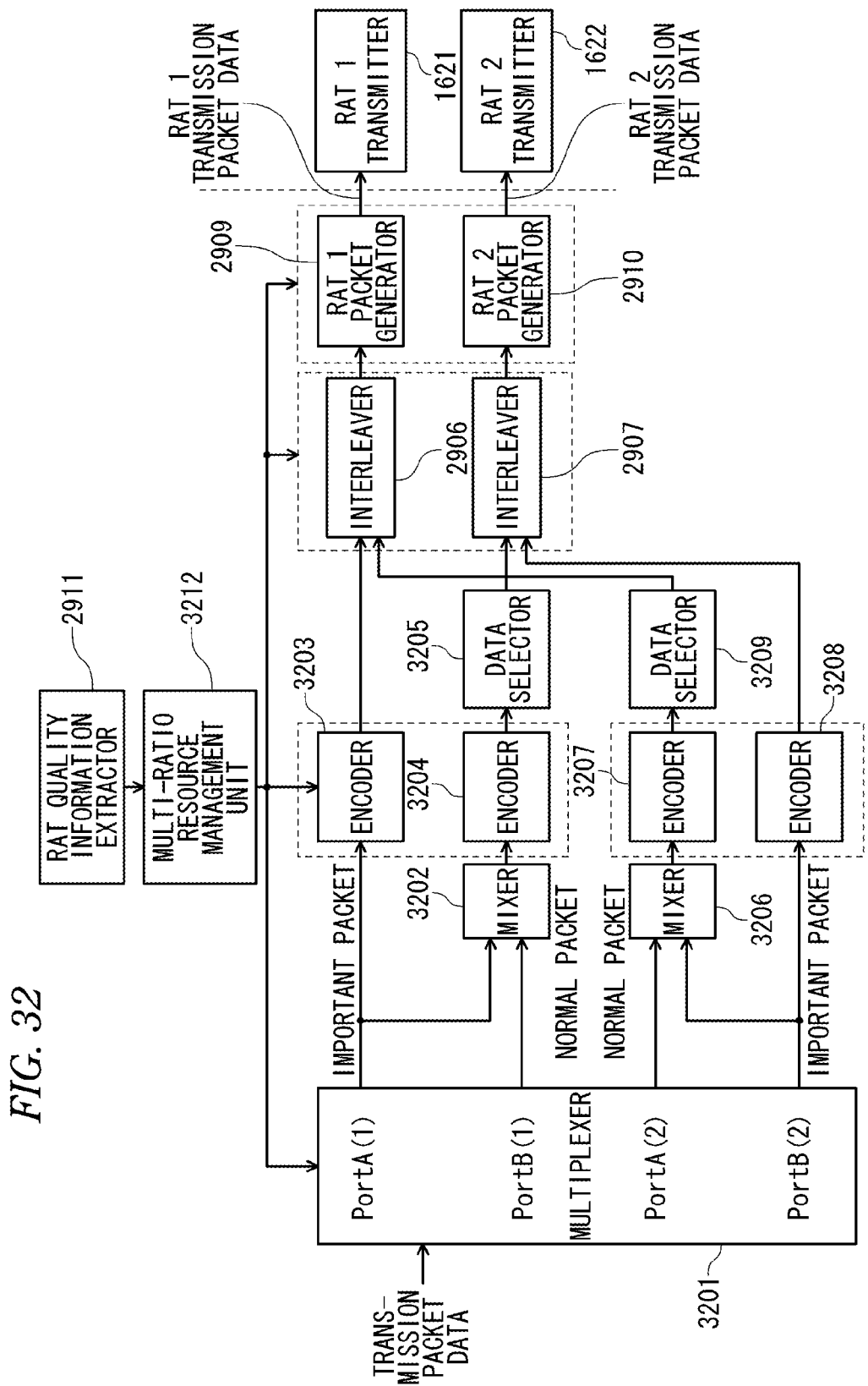
FIG. 32 is a block diagram illustrating a configuration of a wireless transmitting device according to a third modified example of the example 5.

FIG. 32 is a block diagram illustrating a configuration of a wireless transmitting device according to a third modified example of the example 5. In the third modified example of the example 5, instead of the output switching unit 2908, in a multiplexer 3201, the important packet data and the normal packet data are switchingly transmitted on the basis of the RAT quality information. When dividing and outputting the important packet data and the normal packet data, the multiplexer 3201 switches the Output between Port-A(1), Port-B(1), and Port-A(2), Port-B(2) on the basis of an instruction from a multi-ratio resource management unit 3212. For that reason, this wireless communication device has two systems of processors such as mixers 3202, 3206, encoders 3203, 3204, 3207, 3208, and data selectors 3205, 3209.

If the transmission quality of the RAT1 is higher, the multiplexer 3201 separates the important packet data and the normal packet data from each other, and outputs the separate packet data by using the Port-A(1) and the Port-B(1). On the other hand, if the transmission quality of the RAT2 is higher, the multiplexer 3201 separates the important packet data and the normal packet data from each other, and outputs the separate packet data by using the Port-A(2) and the Port-B(2). In the respective subsequent mixers 3202, 3206, encoders 3203, 3204, 3207, 3208, and data selectors 3205, 3209, the same coding processing as the above processing is performed. Even with the above configuration, the same effect as that in the example 5 can be obtained.

EXAMPLE 6

An example 6 corresponds to the sixth embodiment.

<Configuration and Operation of Transmitting Device>

Figure 33:
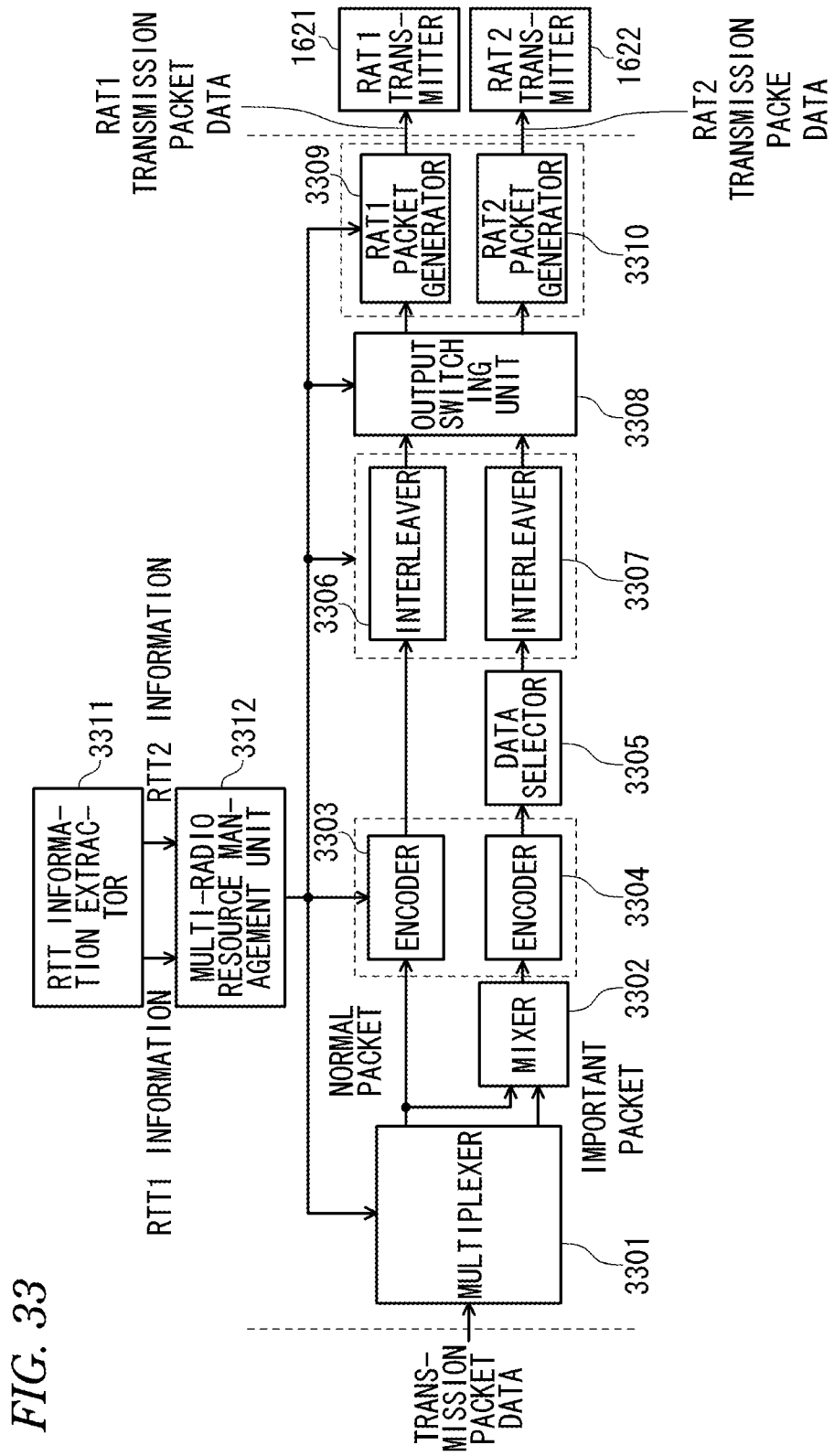
FIG. 33 is a block diagram illustrating a configuration of a wireless transmitting device according to an example 6.

FIG. 33 is a block diagram illustrating a configuration of a wireless transmitting device according to the example 6. The example 6 shows another example in which the transmission packet data includes the packet data for each of the hierarchies as in the example 4.

The wireless communication device includes a multiplexer 3301, a mixer 3302, encoders 3303, 3304, a data selector 3305, interleavers 3306, 3307, an output switching unit 3308, an RAT1 packet generator 3309, an RAT2 packet generator 3310, an RTT information extractor 3311, and a multi-radio resource management unit 3312. The operation from the multiplexer 3301 to the interleavers 3306 and 3307 is identical with the operation from the multiplexer 2601 to the first interleaver 2606 and 2607 in the example 4 illustrated in FIG. 26. In this example, portions different from those in the example 4 will be mainly described.

The multi-radio resource management unit 3312 controls the output switching unit 3308 on the basis of the transmission quality information RTT1 and RTT2 for each of the RAT1 and the RAT2, which are obtained from the RTT information extractor 3311, under the ECC control. In this example, the multi-radio resource management unit 3312 gives an instruction of switching the output on the basis of the transmission delay difference ΔRTT between the RAT1 and the RAT2 so that the interleaver output including the hierarchical data smaller in the number of packet data is input to the RAT larger in the transmission delay, and the interleaver output including the hierarchical data larger in the number of packet data is input to the RAT smaller in the transmission delay. In general, in each of the hierarchies, the basic layer is smaller in the amount of packet data if the basic layer is compared with the enhancement layer, the important packet is smaller if the important packet is compared with the normal packet, and the standard definition packet is smaller if the standard definition packet is compared with the high definition packet. For that reason, the multi-radio resource management unit 3312 controls the output switching unit 3308 so that the hierarchical data smaller in the amount of data becomes the RAT data which is distributed to the RAT larger in the RTT.

Also, the multi-radio resource management unit 3312 instructs the encoders 3303 and 3304 on the information bit length (L_ECC(k)) and the coding rate R_RAT(k) for ECC coding of the k-th RAT(k) according to the amount of packet data for each of the hierarchies. Also, the multi-radio resource management unit 3312 instructs the interleavers 3306 and 3307 on the interleave size of the coding data.

Hereinafter, a description will be given of an instruction of switching the output so that the output of the interleaver 3307 including the important packet data is input to the RAT larger in the transmission delay, and the output of the interleaver 3306 including the normal packet data is input to the RAT smaller in the transmission delay.

The output switching unit 3308 performs the switching operation on the basis of an instruction from the multi-radio resource management unit 3312 so that the interleaver output including the important packet data is input to the RAT higher in the transmission quality, and the interleaver output including the normal packet data is input to the RAT lower in the transmission quality.

The RAT1 packet generator 3309 and the RAT2 packet generator 3310 divide the interleave data 1 and the interleave data 2 into packets each having a given size smaller than the IL size, respectively, and add the header information to the respective separate packets to generate the RAT packets for the respective RATA). The expansion header information H2 of the header information is added with the output data selected by the output switching unit 3308 and the following information related to the ECC coding. That is, the expansion header information H2 is added with identification number (serial number) of the ECC coded data, the interleave size length L(1) or L(2), the coding rate R_RAT(k) information in ECC coding, data mixture information in the mixer, and the interleave data position information (allocation of serial numbers in the packer order when interleave data is separated into a plurality of packet data). Further, the expansion header information H2 is added with selection information (flag information indicative of the important packet data or the normal packet data) by the output switching unit 3308.

The respective RAT(k) transmission packet data generated by the RAT1 packet generator 3309 and the RAT2 packet generator 3310 is subjected to the transmission processing by the RAT1 transmitter 1621 and the RAT2 transmitter 1622. Then, the RAT(k) transmission packet data is transmitted to the wireless communication device that is a destination, by the radio systems RAT1 and the RAT2.

<Configuration and Operation of Receiving Device>

Figure 34:
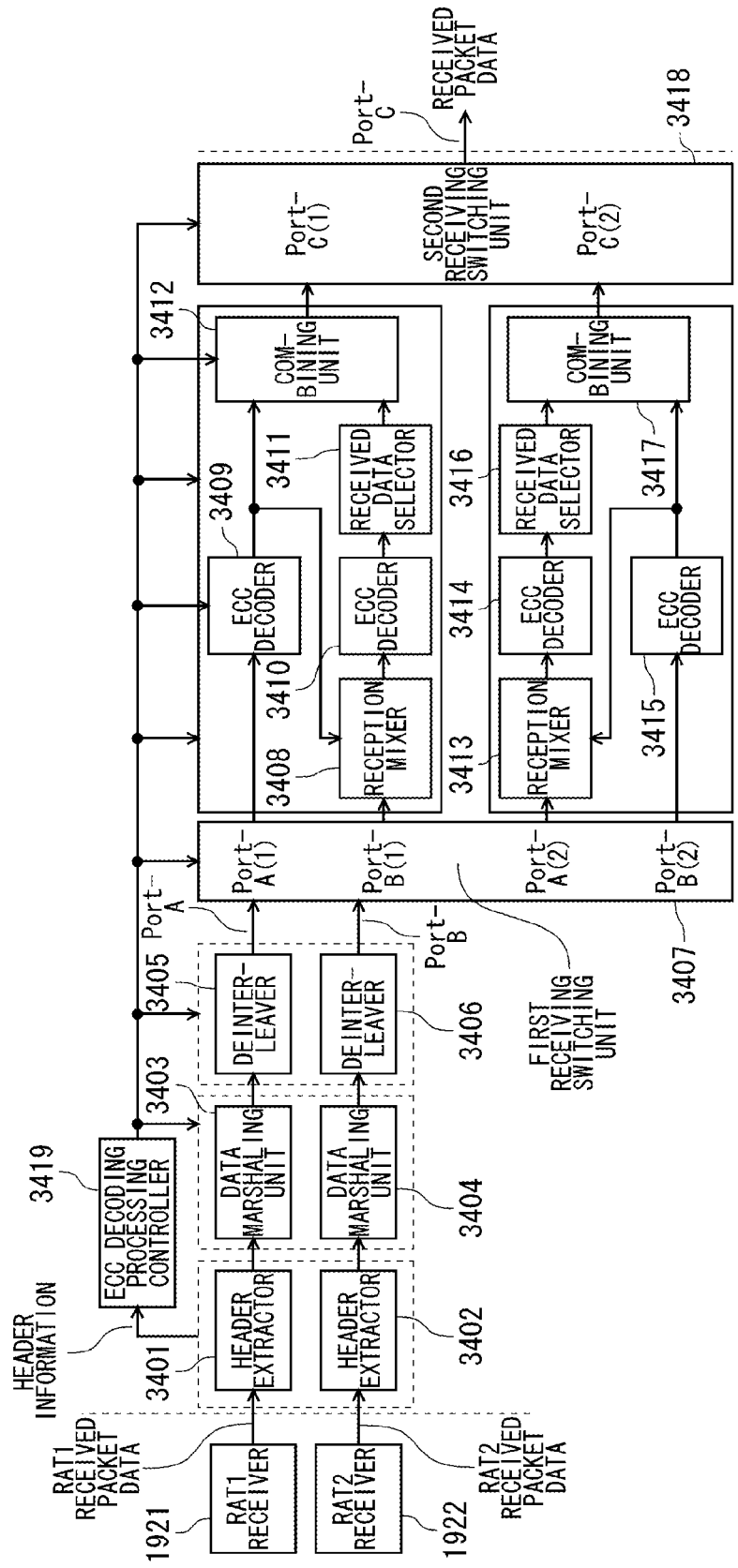
FIG. 34 is a block diagram illustrating a configuration of a wireless receiving device according to the example 6.

FIG. 34 is a block diagram illustrating a configuration of a wireless receiving device according to the example 6. The wireless communication device includes header extractors 3401, 3402, data marshaling units 3403, 3404, deinterleavers 3405, 3406, a first receiving switching unit 3407, reception mixers 3408, 3413, ECC decoders 3409, 3410, 3414, 3415, received data selectors 3411, 3416, combining units 3412, 3417, a second receiving switching unit 3418, and an ECC decoding processing controller 3419. Also, the wireless receiving device has an RAT1 receiver 1921 and an RAT2 receiver 1922 that perform reception processing on the physical layer and the MAC layer in each of the plural radio systems RAT1 and RAT2.

The header extractors 3401 and 3402 extract the expansion header information H2 from the RAT1 (RAT2) received packet data received by the RAT1 receiver 1921 and the RAT2 receiver 1922, respectively. The extracted expansion header information H2 is output to the ECC decoding processing controller 3419, and the data from which the header part has been removed is output to the data marshaling units 3403 and 3404.

The ECC decoding processing controller 3419 acquires the identification number (serial number) of the ECC coded data, the interleave size length L(k), the coding rate R_RAT(k) information, the data mixture information in the mixer, the interleave data position information, and selection information by the output switching unit, from the acquired expansion header information H2. On the basis of those information, the ECC decoding processing controller 3419 controls the data marshaling units 3403, 3404, the deinterleavers 3405, 3406, the first receiving switching unit 3407, the reception mixers 3408, 3413, the ECC decoders 3409, 3410, 3414, 3415, the received data selectors 3411, 3416, the combining units 3412, 3417, and the second receiving switching unit 3418.

The operation of the data marshaling units 3403, 3404 and the deinterleavers 3405, 3406 is identical with that in the above-mentioned examples 4 and 5.

The first receiving switching unit 3407 performs switching operation so that outputs (Port-A, Port-B) of the deinterleavers 3405 and 3406 are input to any one of Port-A(1), Port-B(1) and Port-A(2), Port-B(2), on the basis of the selection information (flag information indicative of the important packet data or the normal packet data) by the output switching unit 3308 on the transmitter side. That is, when the RAT1 includes the normal packet data, and the RAT2 includes the important packet data, the first receiving switching unit 3407 inputs the outputs (Port-A, Port-B) of the deinterleavers 3405 and 3406 to the Port-A(1) and the Port-B(1). In the reverse situation, the first receiving switching unit 3407 inputs the outputs (Port-A, Port-B) of the deinterleavers 3405 and 3406 to the Port-A(2) and the Port-B(2). If the Port-A(1) and the Port-B(1) are selected, the outputs of the deinterleavers 3405 and 3406 are supplied to one set of the ECC decoders 3409, 3410, and the reception mixer 3408. On the other hand, if the Port-A(2) and the Port-B(2) are selected, the outputs of the deinterleavers 3405 and 3406 are supplied to the other set of the reception mixer 3413, and the ECC decoders 3414, 3415.

With the operation of the first receiving switching unit 3407, the second receiving switching unit 3418 switchingly inputs any one of the output Port-C(1) of the combining unit 3412 and the output Port-C(2) of the combining unit 3417 to the Port-C. That is, when the RAT1 includes the normal packet data, and the RAT2 includes the important packet data, the second receiving switching unit 3418 inputs the output Port-C(1) from the combining unit 3412 to the Port-C. In the reverse situation, the second receiving switching unit 3418 inputs the output Port-C(2) from the combining unit 3417 to the Port-C.

First, the operation when the RAT1 includes the normal packet data, and the RAT2 includes the important packet data will be described. In this case, the ECC decoder 3409 performs the decoding processing based on the loss correction, on the basis of the data of the interleave size length L(1) and the loss flag, and outputs the data that has been decoded as the decoded data 1.

The reception mixer 3408 mixes an output of the deinterleaver 3406 and an output of the ECC decoder 3409 into the received data on the basis of the data mixture information generated by the mixer 3302 during the transmission in the same manner as the mixing manner performed during the transmission. The reception mixer 3408 outputs the data for which the loss flag has been set to the ECC decoder 3410 with the coded data as the indefinite value.

The ECC decoder 3410 performs the decoding processing based on the loss correction, on the basis of the output of the reception mixer 3408 and the loss flag, and outputs the data that has been decoded as the decoded data 2.

The received data selector 3411 separates the output of the ECC decoder 3410 into the normal packet data that is the RAT1 data and the important packet data that is the RAT2 data, which have been mixed in the reception mixer 3408, on the basis of the data mixture information generated by the mixer during the transmission, and outputs the separate data.

The combining unit 3412 combines an output of the decoded data of the RAT1 from the ECC decoder 3409 and an output of the decoded data of the RAT2 from the received data selector 3411, that is, the normal packet data and the important packet data which could be correctly received, together by performing the reverse operation of the distributing operation of the multiplexer on the transmitter side, to restore the transmitted data. Then, the combining unit 3412 outputs the restored data to the second receiving switching unit 3418, and the second receiving switching unit 3418 outputs the restored data as the received packet data from Port-C thereof. Also, second, the operation when the RAT2 includes the normal packet data, and the RAT1 includes the important packet data will be described. In this case, the ECC decoder 3415 performs the decoding processing based on the loss correction, on the basis of the data of the interleave size length L(2) and the loss flag, and outputs the data that has been decoded as the decoded data 1.

The reception mixer 3413 mixes an output of the deinterleaver 3405 and an output of the ECC decoder 3415 into the received data on the basis of the data mixture information generated by the mixer 3302 during the transmission in the same manner as the mixing manner performed during the transmission. The reception mixer 3413 outputs the data for which the loss flag has been set to the ECC decoder 3414 with the coded data as the indefinite value.

The ECC decoder 3414 performs the decoding processing based on the loss correction, on the basis of the output of the reception mixer 3413 and the loss flag, and outputs the data that has been decoded as the decoded data 2.

The received data selector 3416 separates the output of the ECC decoder 3414 into the normal packet data that is the RAT2 data and the important packet data that is the RAT1 data, which have been mixed in the reception mixer 3413, on the basis of the data mixture information generated by the mixer during the transmission, and outputs the separate data.

The combining unit 3417 combines an output of the decoded data of the RAT1 from the received data selector 3416 and an output of the decoded data of the RAT2 from the ECC decoder 3415, that is, the normal packet data and the important packet data which could be correctly received, together by performing the reverse operation of the distributing operation of the multiplexer on the transmitter side, to restore the transmitted data. Then, the combining unit 3417 outputs the restored data to the second receiving switching unit 3418, and the second receiving switching unit 3418 outputs the restored data as the received packet data from Port-C thereof.

Thus, in the example 6, since the IL size of the RAT larger in the transmission delay is reduced, the processing delay until the transmission data is restored by the ECC decoding on the receiver side using the plurality of radio systems can be reduced.

EXAMPLE 7

An example 7 shows a configuration example in which the fifth embodiment and the sixth embodiment are integrated together.

<Configuration and Operation of Transmitting Device>

Figure 35:
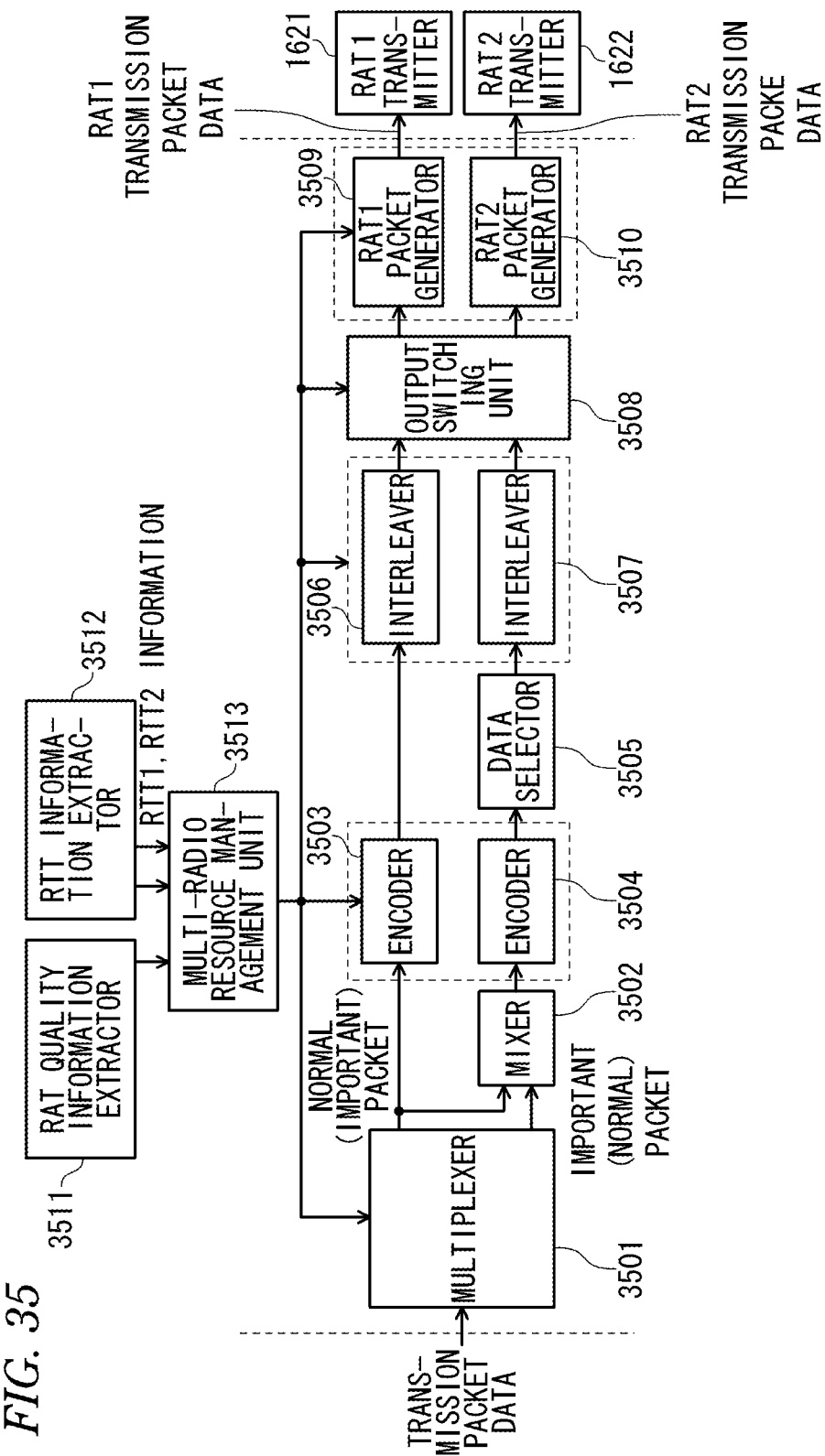
FIG. 35 is a block diagram illustrating a configuration of a wireless transmitting device according to an example 7.
Figure 36:
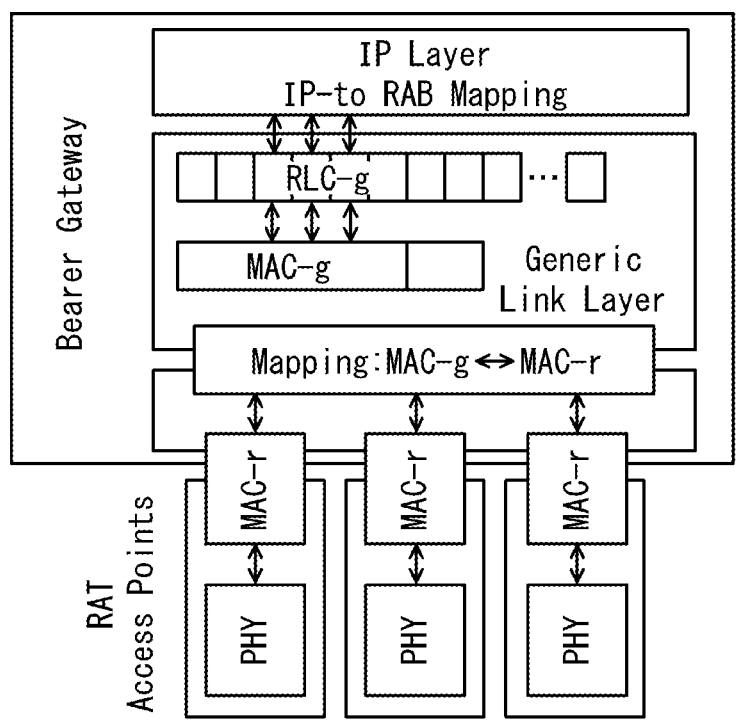
FIG. 36 is a conceptual diagram illustrating a functional configuration of the GLL.

FIG. 35 is a block diagram illustrating a configuration of a wireless transmitting device according to the example 7. The example 7 shows a configuration in which the operation is switched to the operation illustrated in the example 5 or the example 6 on the basis of the RAT quality information. Hereinafter, the operation different from that in the example 5 or 6 will be described.

The wireless communication device includes a multiplexer 3501, a mixer 3502, encoders 3503, 3504, a data selector 3505, interleavers 3506, 3507, an output switching unit 3508, an RAT1 packet generator 3509, an RAT2 packet generator 3510, an RAT quality information extractor 3511, an RTT information extractor 3512, and a multi-radio resource management unit 3513.

The multi-radio resource management unit 3513 selects any coding method on the basis of the transmission quality information RQ1 and RQ2 for each of the RAT1 and the RAT2, which are obtained from the RAT quality information extractor 3511. That is, if the transmission quality information RQ1 and RQ2 falls within a given quality, the multi-radio resource management unit 3513 performs the coding method described in the example 5 under the control, as coding control information ENC(1). On the other hand, if the transmission quality information RQ1 and RQ2 falls outside the given quality, the multi-radio resource management unit 3513 selects the coding method described in the example 6 as coding control information ENC(2). The operation from the multiplexer 3501 to the output switching unit 3508 is identical with that in the example 5 or 6.

The RAT1 packet generator 3509 and the RAT2 packet generator 3510 divide the interleave data into packets each having a given size smaller than the IL size, and add the header information to the respective separate packets to generate the RAT packets for the respective RATA). The expansion header information H2 of the header information further includes coding control information ENC.

On the receiver side, the ECC decoding processing controller further extracts the coding control information ENC from the acquired expansion header information H2. Then, the ECC decoding processing controller controls the data marshaling unit, the deinterleaver, the first receiving switching unit, the reception mixer, the ECC decoder, the received data selector, the combining unit, and the second receiving switching unit, on the basis of the coding control information ENC. That is, in the case of the coding control information ENC(1), the ECC decoding processing controller controls the respective units so as to perform the decoding processing described in the example 5. On the other hand, in the case of the coding control information ENC(2), the ECC decoding processing controller controls the respective units so as to perform the decoding processing described in the example 6.

Thus, in the example 7, the ECC coding is adaptively changed according to the channel quality of the RAT1 and the RAT2 so as to obtain the stable reception characteristic not depending on the propagation status of the RAT.

The above respective embodiments show, as the application of the wireless communication device to the link layer, an example of the configurations and processing in which the ECC is applied to the GLL, and the RAT1 transmitter and the RAT2 transmitter are provided which perform the transmission processing of the MAC layer and the physical layer in each of the plurality of radio systems RAT1 and RAT2. However, the present invention is not limited to this configuration. For example, the ECC can be applied to the layers such as a network layer or an application layer. In this case, the plurality of radio systems RAT1 and RAT2 has the RAT1 transmitter and the RT2 transmitter that perform the transmission processing in a layer lower than the layer to which the ECC is applied. With this configuration, the same advantages as those in the above embodiments can be obtained.

Also, the above respective embodiments show an example in which the data transmission is performed by using the two radio systems as the plurality of radio systems. However, the same is applicable even if three or more radio systems are used.

According to the present invention, modifications and applications by an ordinary skilled person on the basis of the disclosure of the present specification and known techniques without departing from the subject matter and scope of the present invention are also intended by the present invention, and included in a scope to be protected. Also, the respective components in the above embodiments may be arbitrarily combined together without departing from the subject matter of the present invention.

In the above respective embodiments, the present invention is configured by hardware, however the present invention can be realized by software.

Also, the respective functional blocks used for description of the above respective embodiments are typically realized by an LSI which is an integrated circuit. Those functional blocks may be integrated into respective chips, individually, or parts or all of the functional blocks may be integrated into one chip. In the present specification, the above configuration is called "LSI", but may be called "IC", "system LSI", "super LSI", or "ultra LSI" depending on the integration.

Also, the technique for circuit integration is not limited to the LSI, but may be realized by a dedicated circuit or a general-purpose processor. After manufacturing the LSI, a programmable FPGA (field programmable gate array), or a reconfigurable processor that can reconfigure the connection or setting of circuit cells within the LSI may be employed.

Further, if an integrated circuit technology instead of the LSI appears with the advance of the semiperformor technology or other technology derived from the semiperformor technology, the functional blocks may be integrated by using such a technology. The biotechnology may be adapted thereto.

The present invention is based on Japanese Patent Application No. 2010-019232 filed on Jan. 29, 2010, and content thereof is incorporated herein by reference.

INDUSTRIAL APPLICABILITY

The present invention has advantages that the high error correction capability can be kept while reducing the processing delay in application of the ECC in a multi-radio. For example, the present invention is useful as a wireless communication device and a wireless communication method which can be applied to the GLL when data transmission using a plurality of radio systems is performed, such as a wireless communication system or a wireless LAN (IEEE802.16n, etc.) that are supported by an LTE or an LTE-Advanced of 3GPP, and IEEE 802.16m.

REFERENCE SIGNS LIST 101, 301, 602, 603, 803, 804, 1003, 1004, 1203, 1204, 1403, 1404, 1601, 2202, 2203, 2603, 2604, 2903, 2904, 3203, 3204, 3207, 3208, 3303, 3304, 3503, 3504: encoder 102, 302, 601, 801, 1001, 1201, 1401, 1602, 2201, 2501, 2601, 2901, 3201, 3301, 3501: multiplexer 103, 104, 303, 304, 604, 605, 806, 807, 1006, 1007, 1206, 1207, 1406, 1407, 1603, 1604, 2204, 2205, 2606, 2607, 2906, 2907, 3306, 3307, 3506, 3507: interleaver 305, 606: resource controller 802, 1002, 1202, 1402, 2602, 2902, 3202, 3206, 3302, 3502: mixer 805, 1005, 1205, 1405, 2605, 2905, 3205, 3209, 3305, 3505: data selector 1008, 1208, 2908, 3308, 3508: output switching unit 1408: output distributing unit 1605, 2206, 2608, 2909, 3309, 3509: RAT1 packet generator 1606, 2207, 2609, 2910, 3310, 3510: RAT2 packet generator 1607, 2208, 3311, 3512: RTT information extractor 1608, 2209, 2509, 2610, 2912, 3212, 3312, 3513: multi-radio resource management unit 1621: RAT1 transmitter 1622: RAT2 transmitter 1901, 1902, 2401, 2402, 2801, 2802, 3101, 3102, 3401, 3402: header extractor 1903, 1904, 2403, 2404, 2803, 2804, 3103, 3104, 3403, 3404: data marshaling unit 1905, 1906, 2405, 2406, 2805, 2806, 3105, 3106, 3405, 3406: deinterleaver
1907, 2409, 2811, 3112, 3117, 3412, 3417: combining unit
1908, 2407, 2408, 2808, 2809, 3109, 3110, 3114, 3115, 3409, 3410, 3414, 3415: ECC decoder
1909, 2410, 2812, 3119, 3419: ECC decoding processing controller
1921: RAT1 receiver
1922: RAT2 receiver
2807, 3108, 3113, 3408, 3413: reception mixer
2810, 3111, 3116, 3411, 3416: received data selector
2911, 3511: RAT quality information extractor
3107, 3407: first receiving switching unit
3118, 3418: second receiving switching unit

The invention claimed is:

1. A wireless communication device for performing data transmission using a plurality of radio systems, the device comprising:
an encoder configured to encode a plurality of transmission data in correspondence with each of the plurality of radio systems;
an interleaver configured to interleave the plurality of encoded transmission data; and
a controller configured to set an interleaving size of each interleaving processing in the interleaver based on a transmission delay difference between the plurality of radio systems.

2. The wireless communication device according to claim 1, further comprising
a multiplexer configured to distribute the encoded data to the plurality of radio systems, wherein
the controller sets the interleaving size of data corresponding to the radio system having a larger transmission delay to be smaller, and sets the interleaving size of data corresponding to the radio system having a smaller transmission delay to be larger, based on the transmission delay difference.

3. The wireless communication device according to claim 2, wherein
the controller defines specific data or an amount of data which can be decoded on a receiver side in a single radio system when setting the interleaving size, and the controller sets the interleaving size of each data corresponding to the plurality of radio systems based on the transmission delay difference for a portion beyond the specific data or a portion exceeding the amount of data.

4. The wireless communication device according to claim 1, further comprising
a multiplexer configured to distribute the plurality of transmission data to the plurality of radio systems, wherein
the encoder encodes the respective distributed transmission data, and
the controller sets the interleaving size of data corresponding to the radio system having a larger transmission delay to be smaller, and sets the interleaving size of data corresponding to the radio system having a smaller transmission delay to be larger, based on the transmission delay difference.

5. The wireless communication device according to claim 4, wherein
the multiplexer distributes first hierarchical data and second hierarchical data to the radio systems for each hierarchy as data to be distributed to the plurality of radio systems,
the encoder includes
a first encoder configured to encode the first hierarchical data, and
a second encoder configured to encode data in which a given amount of the first hierarchical data is mixed with the second hierarchical data,
the wireless communication device further includes
a mixer configured to mix the given amount of the first hierarchical data with the second hierarchical data, and
a data selector configured to select only the second hierarchical data from the coded data by the second encoder, and
the interleaver includes
a first interleaver configured to interleave an output corresponding to the first hierarchical data by the first encoder, and
a second interleaver configured to interleave an output corresponding to the second hierarchical data by the data selector.

6. The wireless communication device according to claim 5 wherein
the mixer inserts by distributing the first hierarchical data to the second hierarchical data at given intervals.

7. The wireless communication device according to claim 5, wherein
the multiplexer distributes the first hierarchical data having a larger amount of data and the second hierarchical data having a smaller amount of data to the radio systems, respectively as the hierarchized data.

8. The wireless communication device according to claim 5, further comprising
an output switching unit configured to switch an output of the interleaver, wherein
the multiplexer distributes the first hierarchical data having a higher importance and the second hierarchical data other than the first hierarchical data to the radio systems, respectively as the hierarchized data, and
the output switching unit switches the output of the interleaver so as to output an output of the first interleaver corresponding to the first hierarchical data to a first radio system having a higher channel quality, and to output an output of the second interleaver corresponding to the second hierarchical data to a second radio system different from the first radio system, respectively, based on channel quality information on the plurality of radio systems.

9. The wireless communication device according to claim 5, further comprising
an output switching unit configured to switch an output of the interleaver based on transmission delay information on the plurality of radio systems so as to output an output of the first interleaver corresponding to the first hierarchical data to a first radio system having a larger transmission delay, and to output an output of the second interleaver corresponding to the second hierarchical data to a second radio system having a smaller transmission delay, respectively.

10. The wireless communication device according to claim 5, further comprising
an output distributing unit configured to output by distributing an output of the first interleaver and an output of the second interleaver, wherein
the multiplexer distributes first hierarchical data having a higher importance and the second hierarchical data other than the first hierarchical data to the radio systems, respectively as the hierarchized data, and
the output distributing unit outputs by distributing the output of the first interleaver and the output of the second interleaver so that the output of the first interleaver corresponding to the first hierarchical data is largely included into the output to the first radio system having the higher the channel quality according to the channel qualities of the plurality of radio systems, when the transmission delay difference between the plurality of radio systems fall within a given value, based on channel quality information and transmission delay information on the plurality of radio systems.

11. A wireless communication device for performing data transmission using a plurality of radio systems, the device comprising:
 a receiver configured to receive a plurality of data by the plurality of radio systems, respectively;
 a deinterleaver configured to deinterleave the plurality of data respectively received by the plurality of radio systems; and
 a reception controller configured to set an interleaving size of each deinterleaving processing in the deinterleaver based on a transmission delay difference between the plurality of radio systems.

12. A wireless communication method in a wireless communication device for performing data transmission using a plurality of radio systems, the method comprising:
 encoding a plurality of transmission data in correspondence with the plurality of radio systems; and
 interleaving the plurality of encoded transmission data based on a transmission delay difference between the plurality of radio systems.

13. A wireless communication method in a wireless communication device for performing data transmission using a plurality of radio systems, the method comprising:
 receiving a plurality of data by the plurality of radio systems; and
 deinterleaving the data respectively received by the plurality of radio systems based on a transmission delay difference between the plurality of radio systems.

* * * * *